Feb. 12, 1946.　　　　E. A. FORD　　　　2,394,604
PERFORATING APPARATUS
Filed June 22, 1944　　　21 Sheets-Sheet 1
FIG.1.
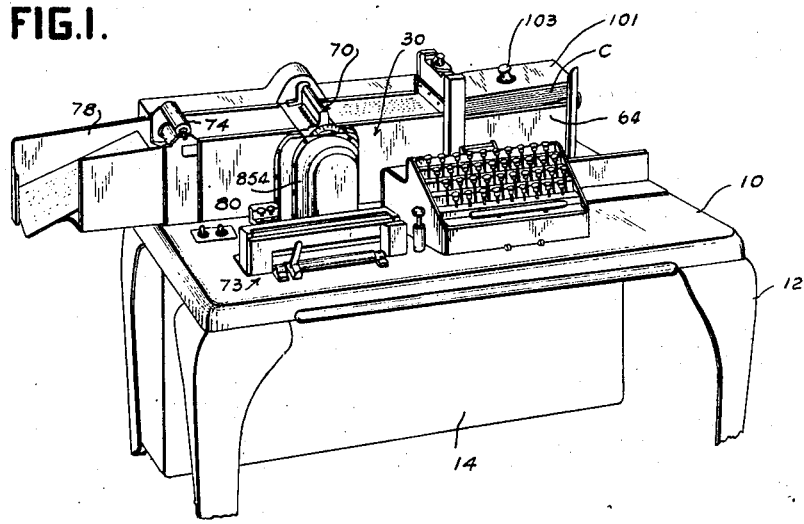
FIG.3.ᵃ
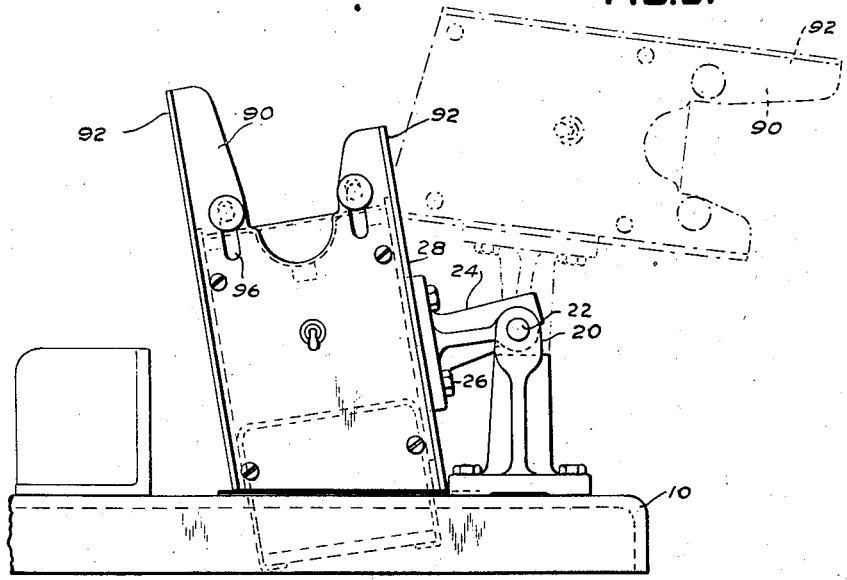
INVENTOR
Eugene A. Ford
BY
W. M. Wilson
ATTORNEY Feb. 12, 1946.    E. A. FORD    2,394,604
PERFORATING APPARATUS
Filed June 22, 1944    21 Sheets-Sheet 2

INVENTOR
Eugene A. Ford
BY
ATTORNEY

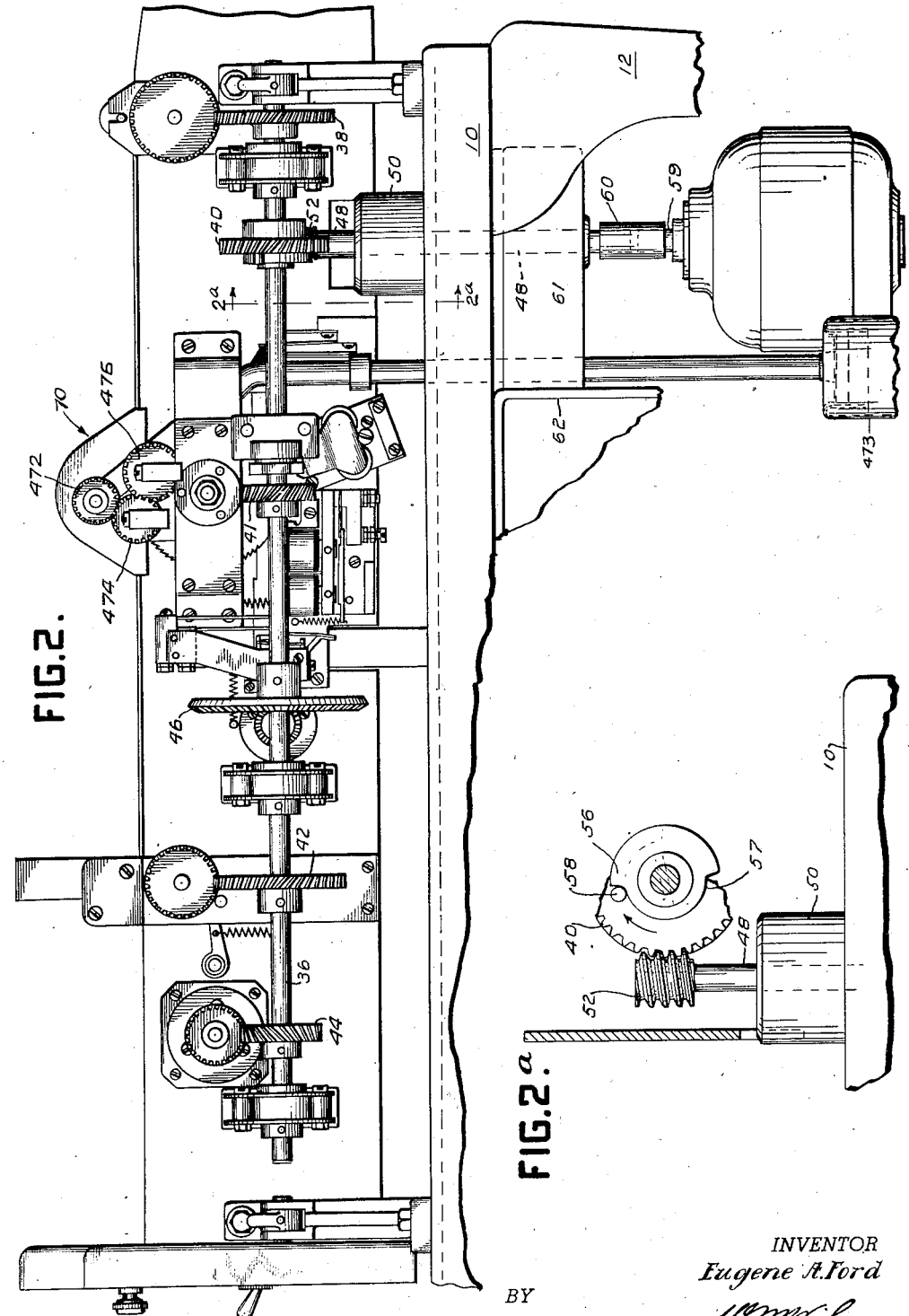

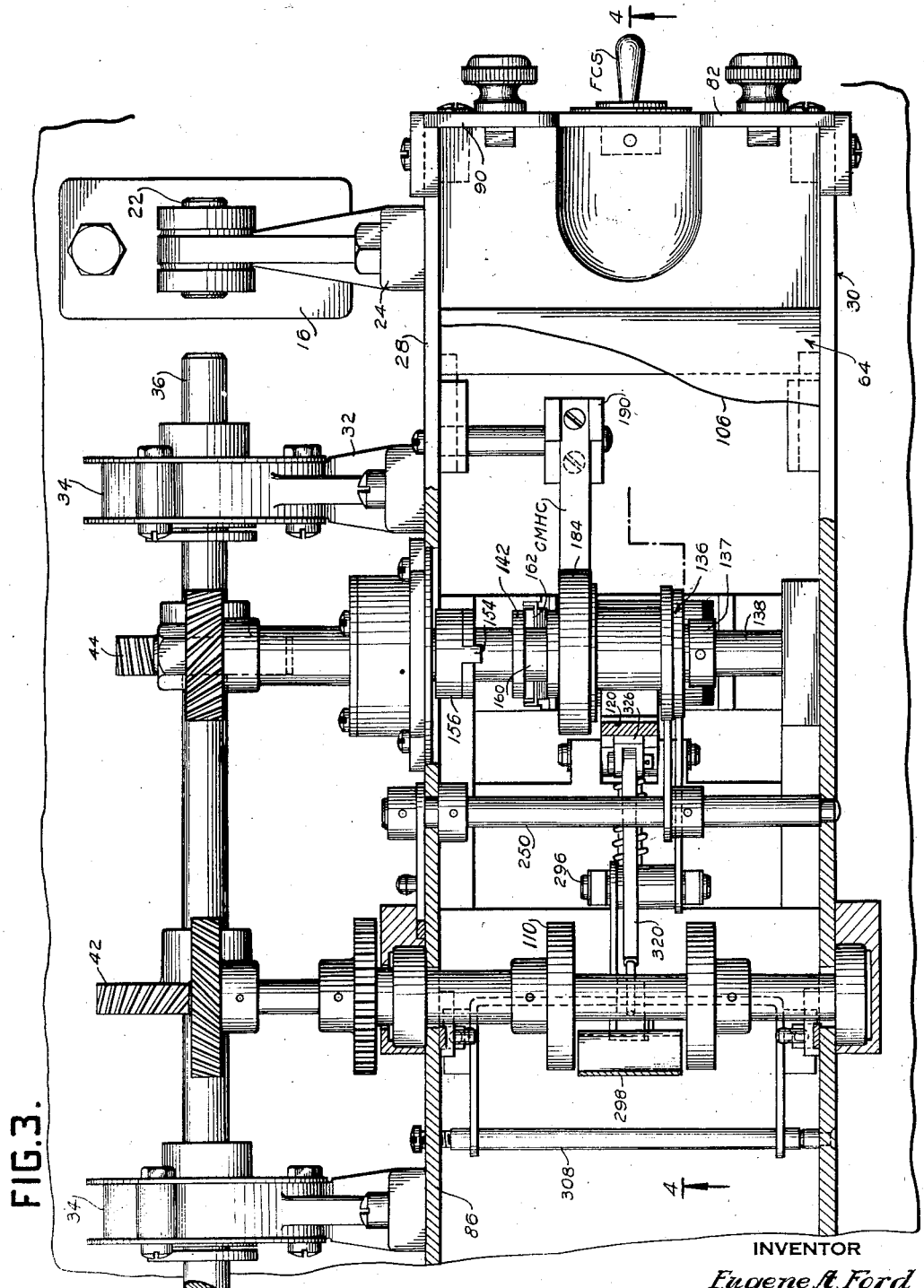

Feb. 12, 1946.   E. A. FORD   2,394,604
PERFORATING APPARATUS
Filed June 22, 1944   21 Sheets-Sheet 5

INVENTOR
Eugene A. Ford
BY
ATTORNEY

Feb. 12, 1946.  E. A. FORD  2,394,604
PERFORATING APPARATUS
Filed June 22, 1944   21 Sheets-Sheet 6
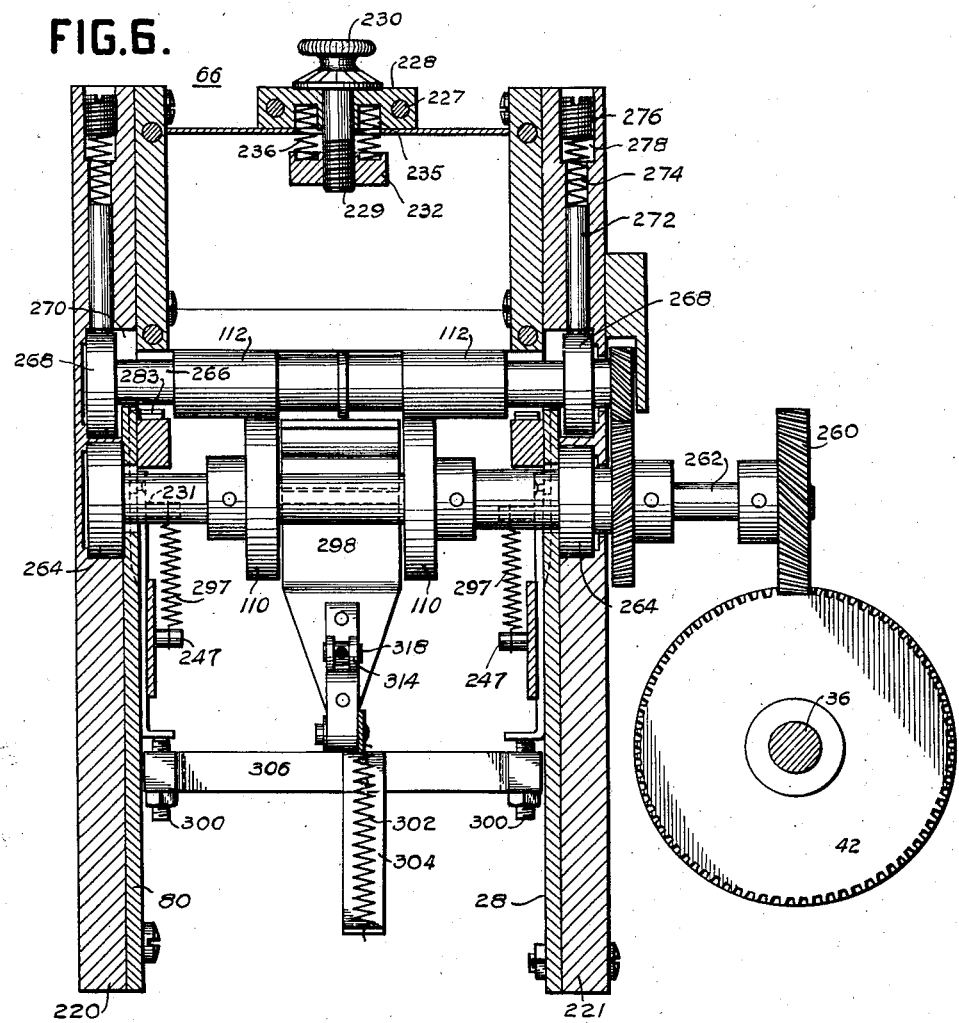
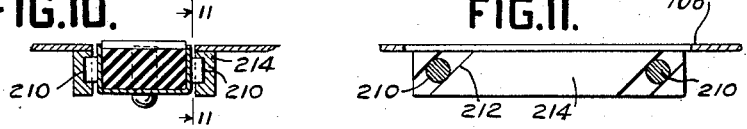
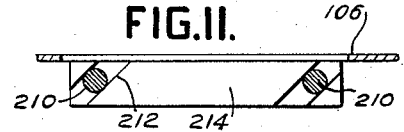
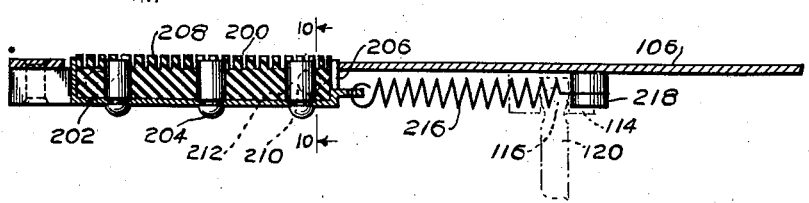
INVENTOR
*Eugene A. Ford*
BY
ATTORNEY Feb. 12, 1946.   E. A. FORD   2,394,604
PERFORATING APPARATUS
Filed June 22, 1944   21 Sheets-Sheet 7

INVENTOR
Eugene A. Ford
BY
ATTORNEY

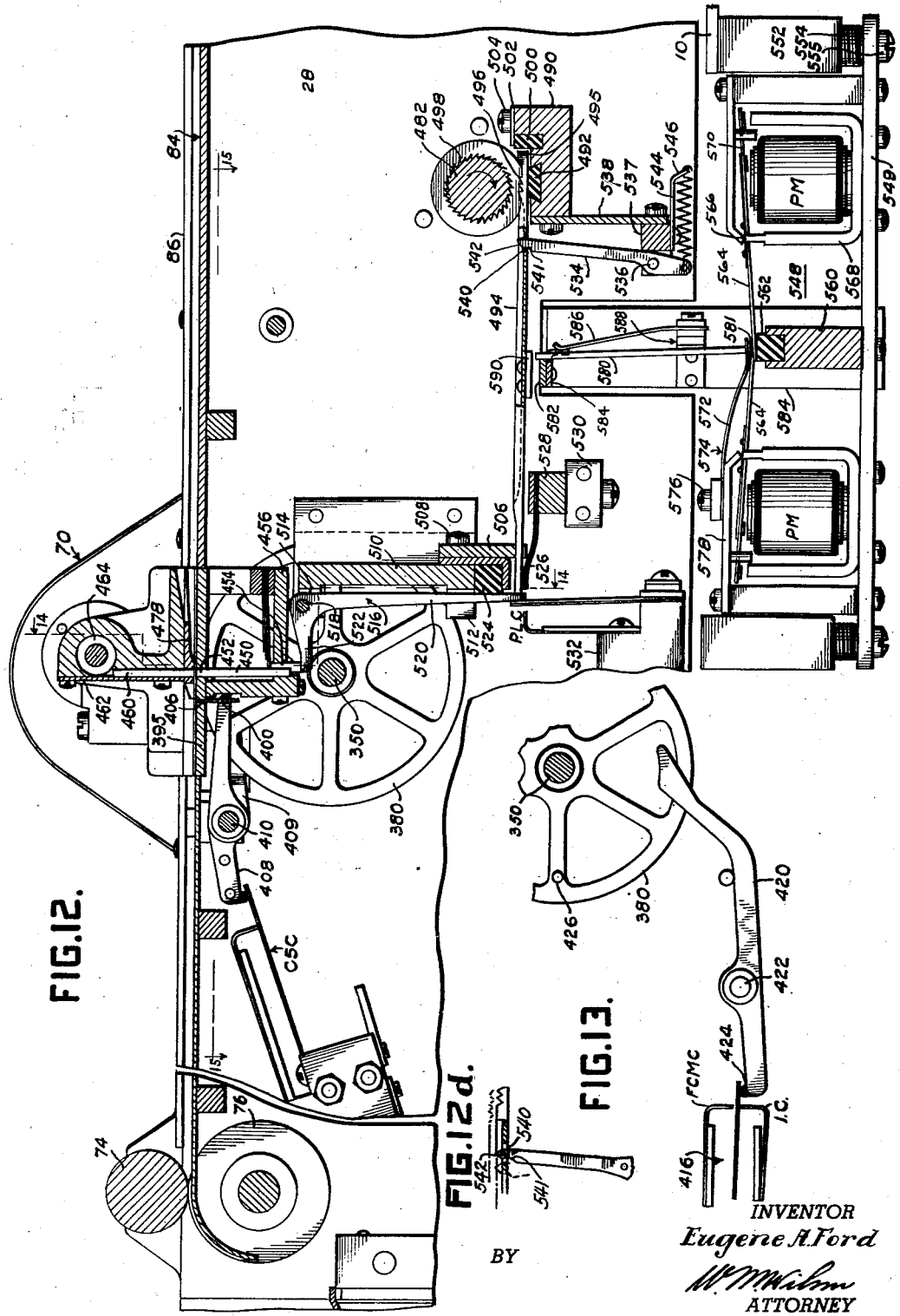

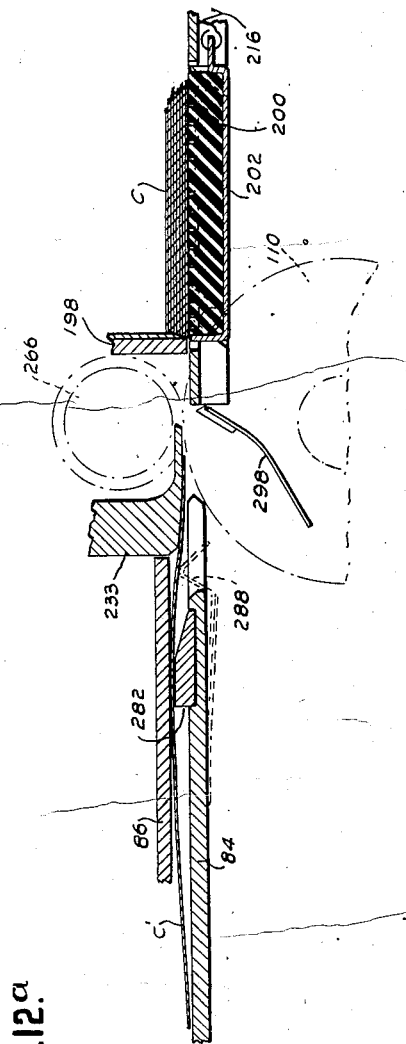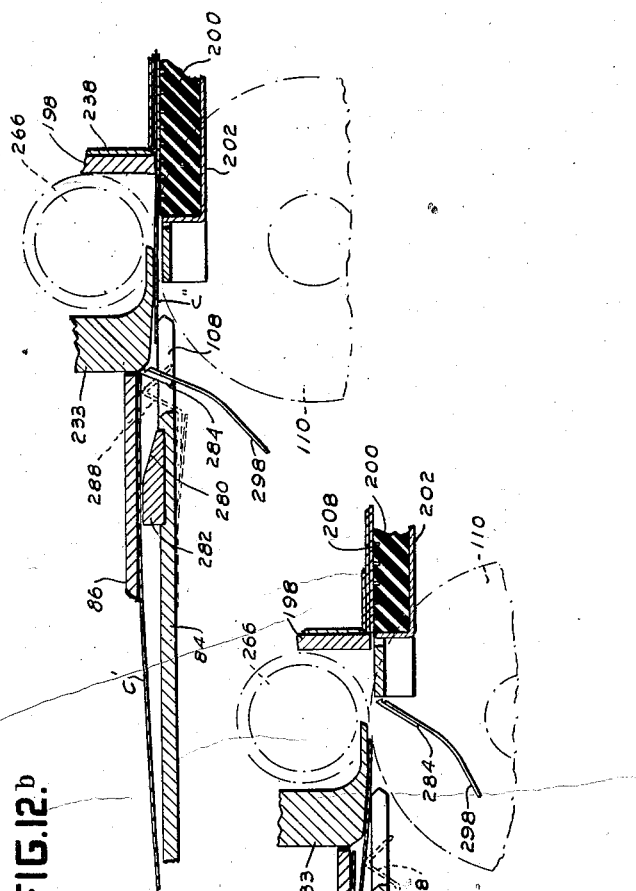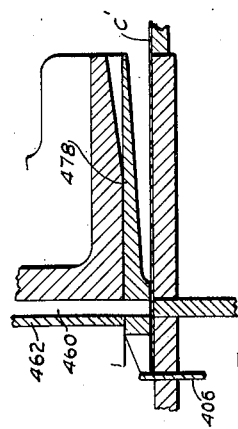

Feb. 12, 1946.   E. A. FORD   2,394,604
PERFORATING APPARATUS
Filed June 22, 1944   21 Sheets-Sheet 10
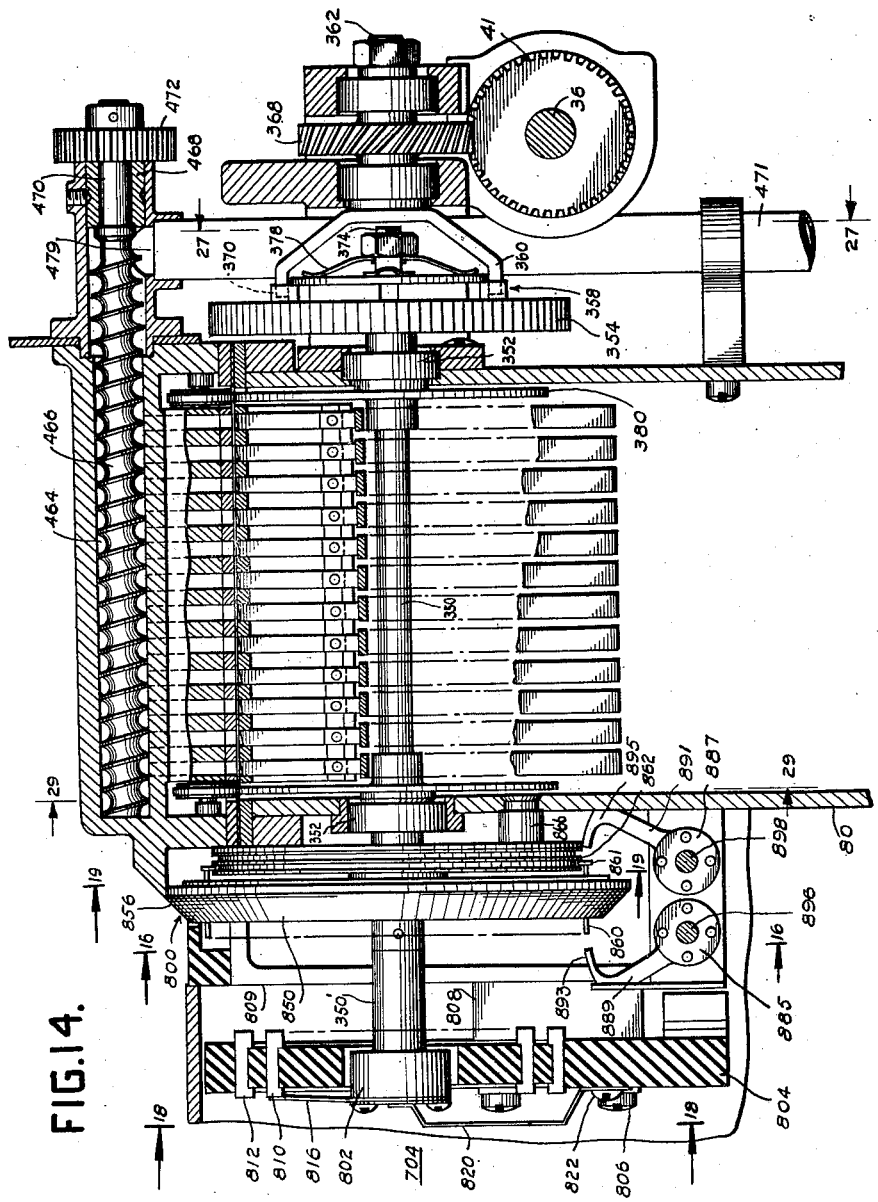
INVENTOR
Eugene A. Ford
BY
ATTORNEY

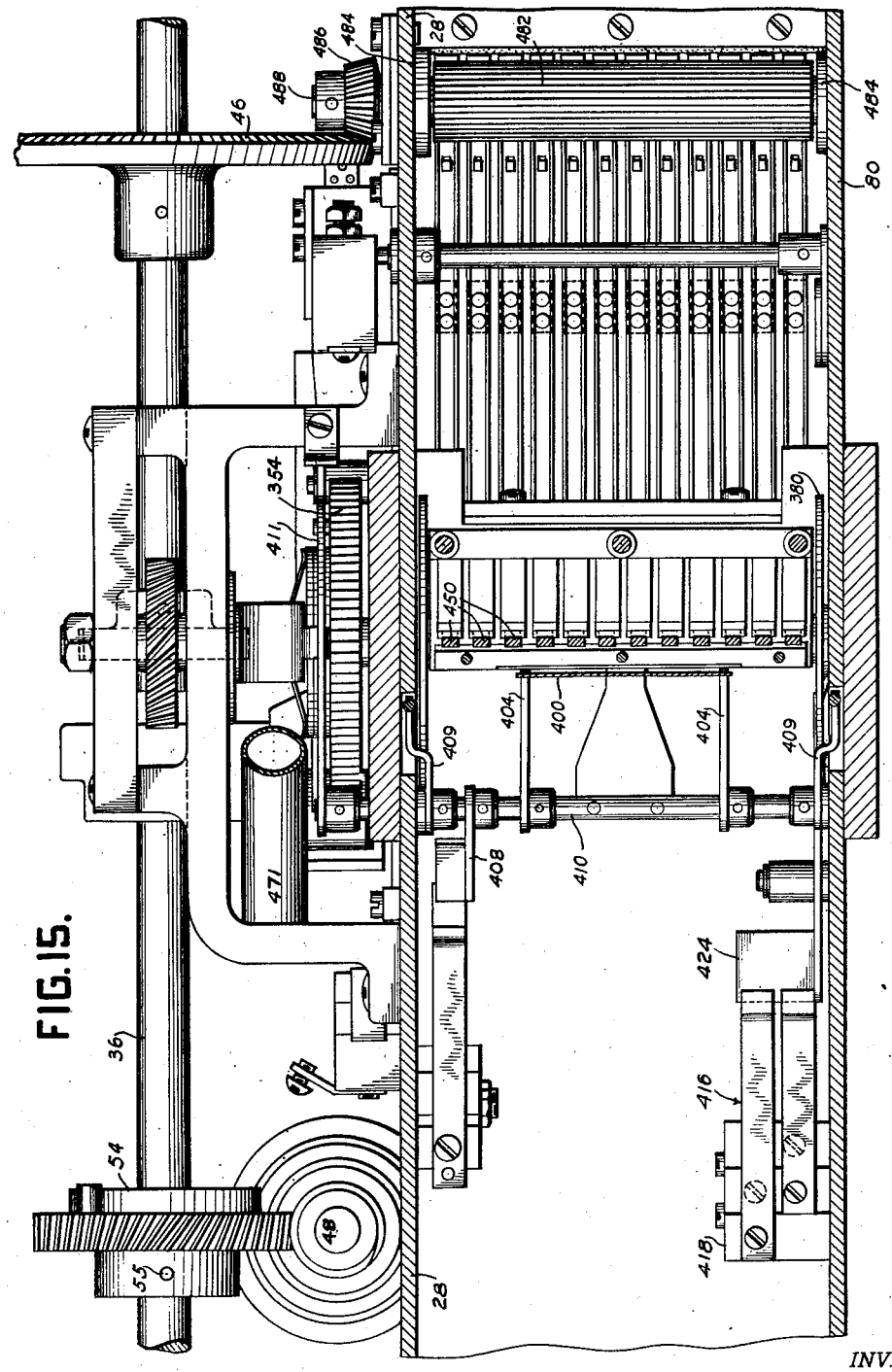

INVENTOR
Eugene A. Ford
ATTORNEY

Feb. 12, 1946.  E. A. FORD  2,394,604
PERFORATING APPARATUS
Filed June 22, 1944  21 Sheets-Sheet 13
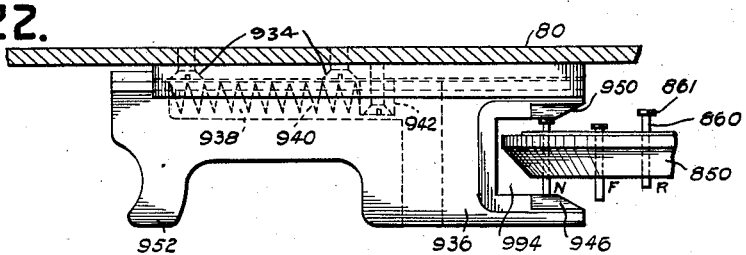
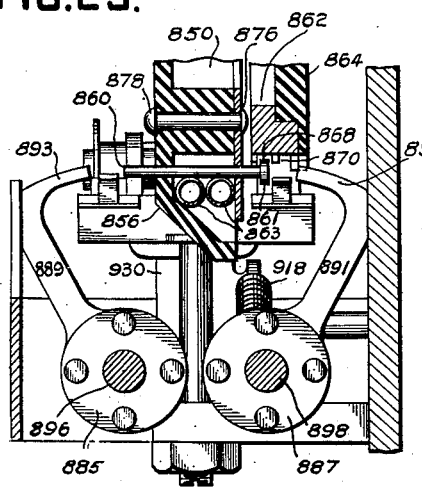
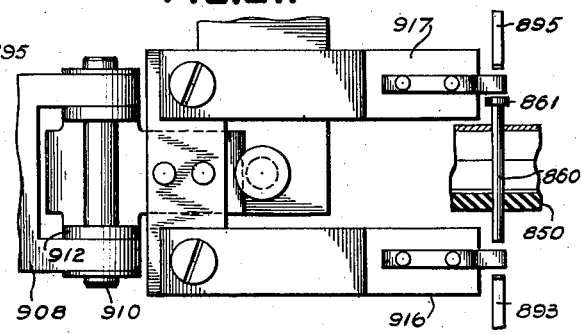
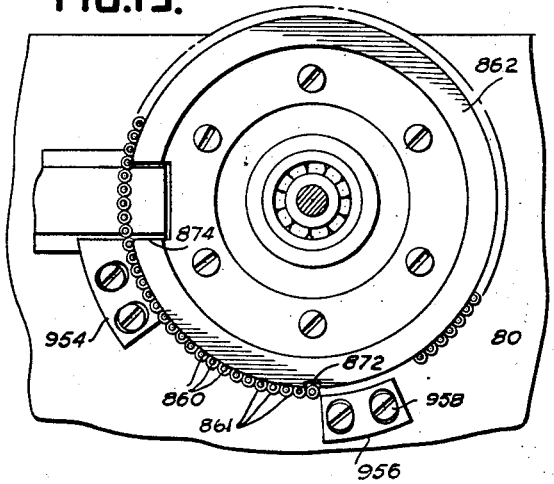
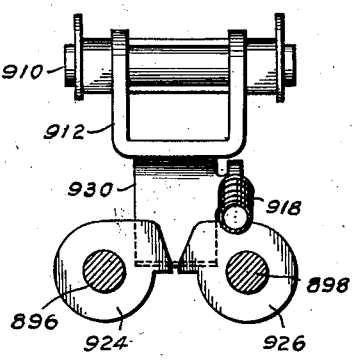
INVENTOR
Eugene A. Ford
BY
ATTORNEY

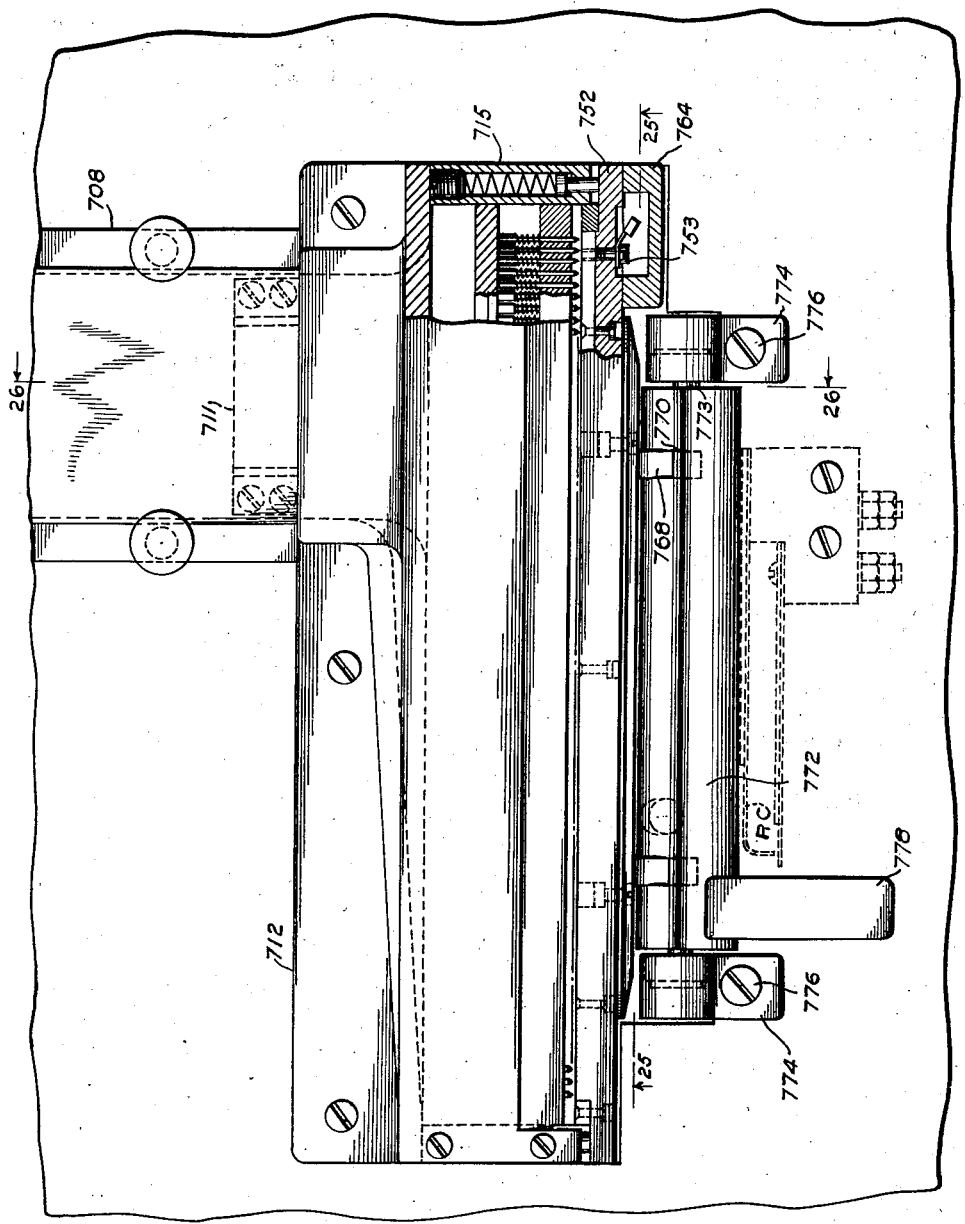

Feb. 12, 1946.  E. A. FORD  2,394,604
PERFORATING APPARATUS
Filed June 22, 1944  21 Sheets-Sheet 15

INVENTOR
Eugene A. Ford
BY
ATTORNEY

Feb. 12, 1946.  E. A. FORD  2,394,604
PERFORATING APPARATUS
Filed June 22, 1944  21 Sheets-Sheet 16
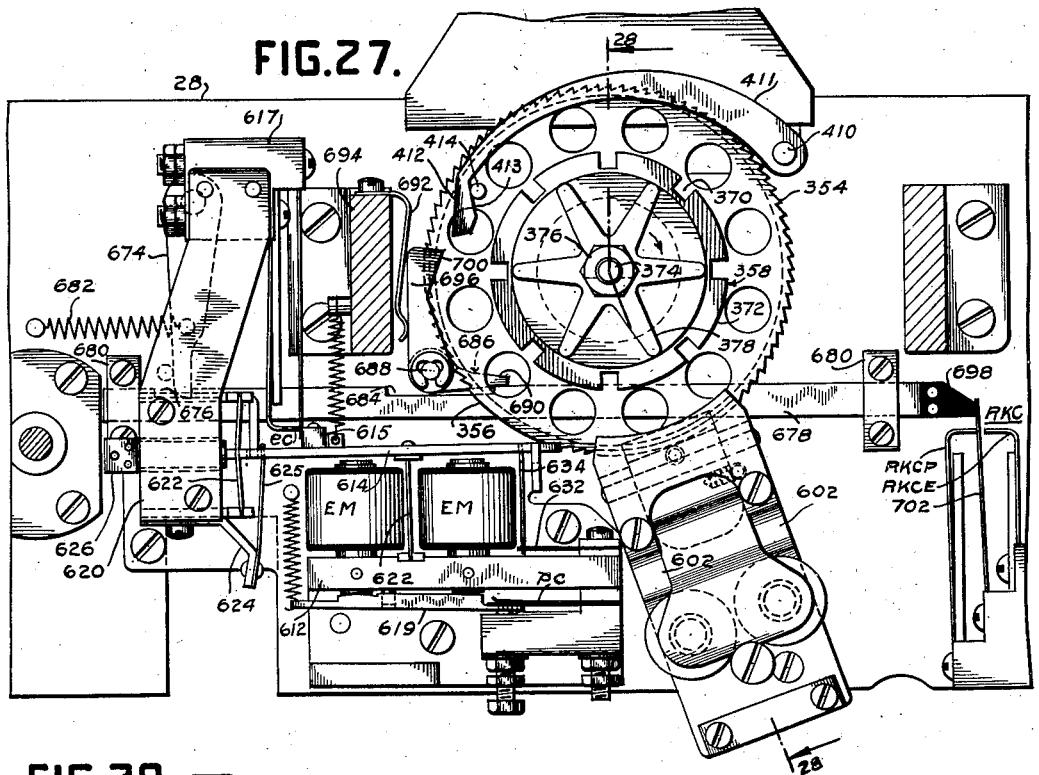
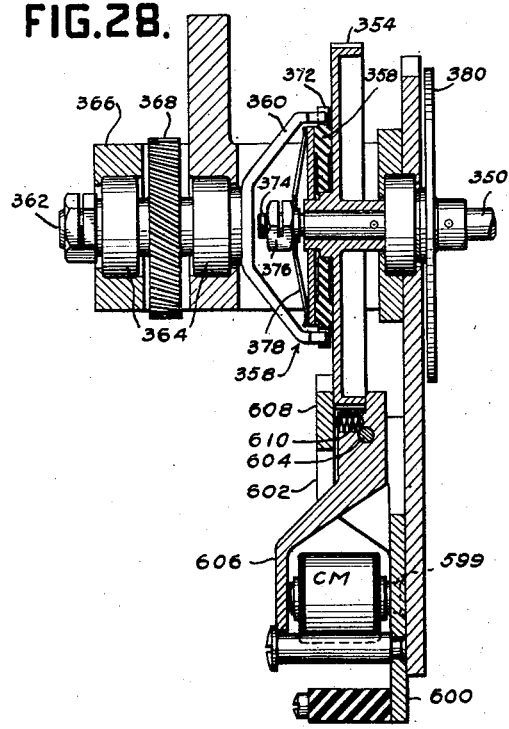
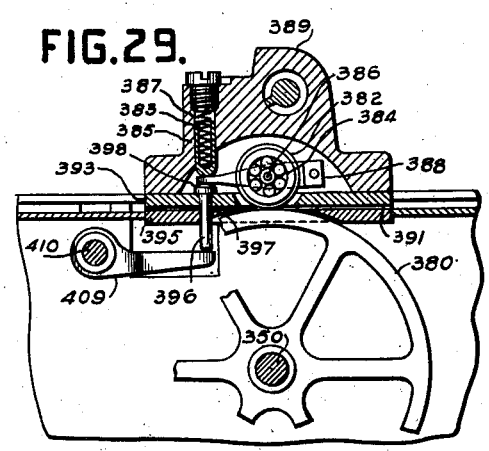
INVENTOR
*Eugene A. Ford*
BY
ATTORNEY

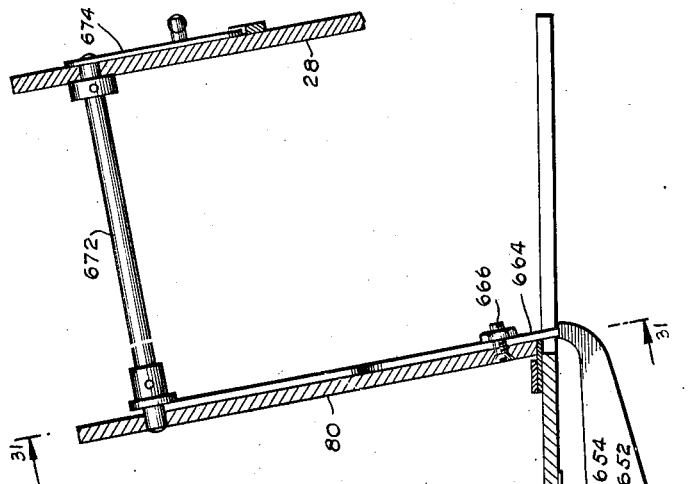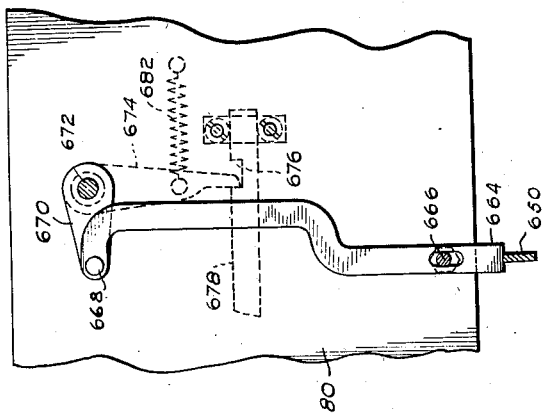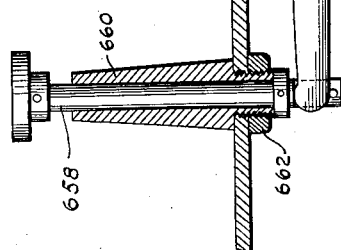

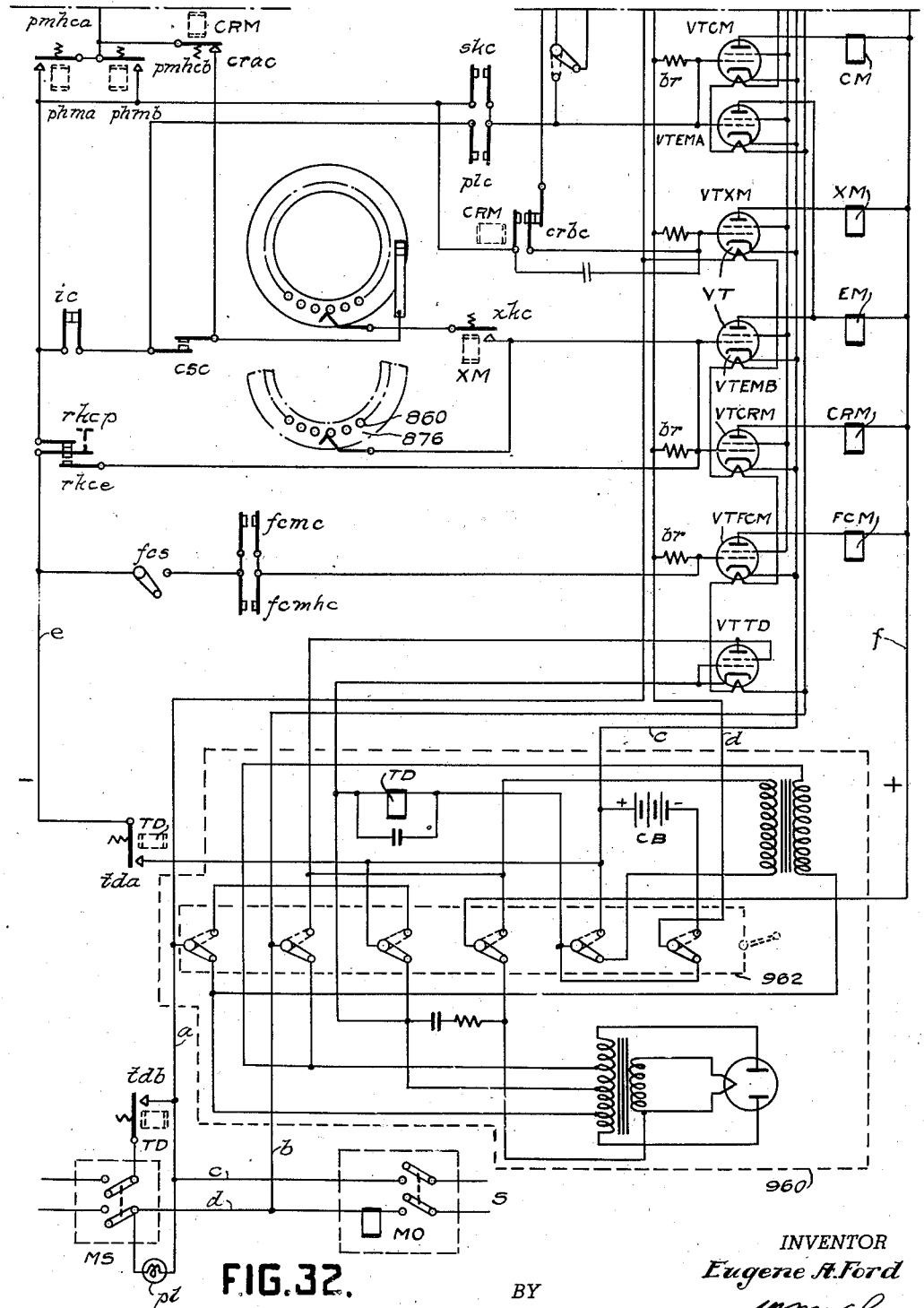

Feb. 12, 1946.                E. A. FORD                2,394,604
                        PERFORATING APPARATUS
                    Filed June 22, 1944        21 Sheets-Sheet 19

INVENTOR
*Eugene A. Ford*
BY
*W. M. Wilson*
ATTORNEY

Feb. 12, 1946.　　　　E. A. FORD　　　　2,394,604
PERFORATING APPARATUS
Filed June 22, 1944　　　21 Sheets-Sheet 20
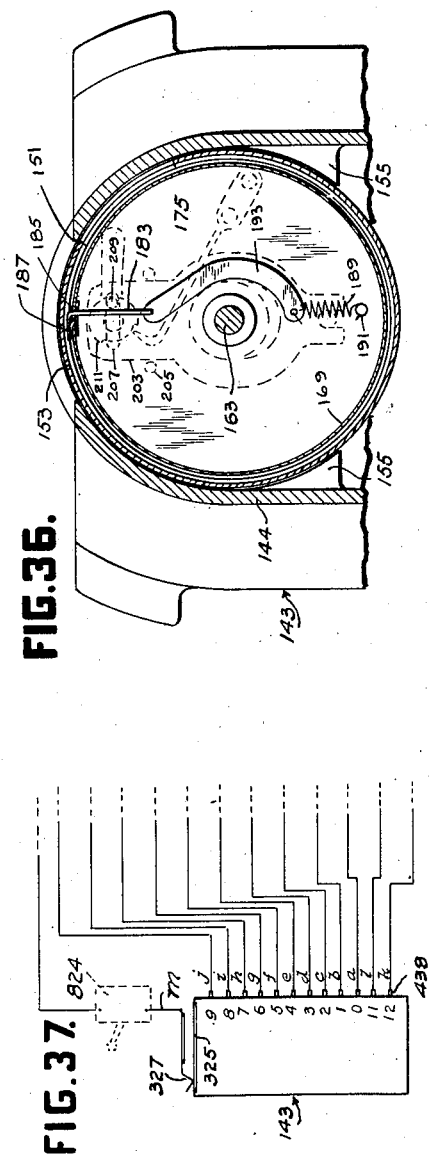
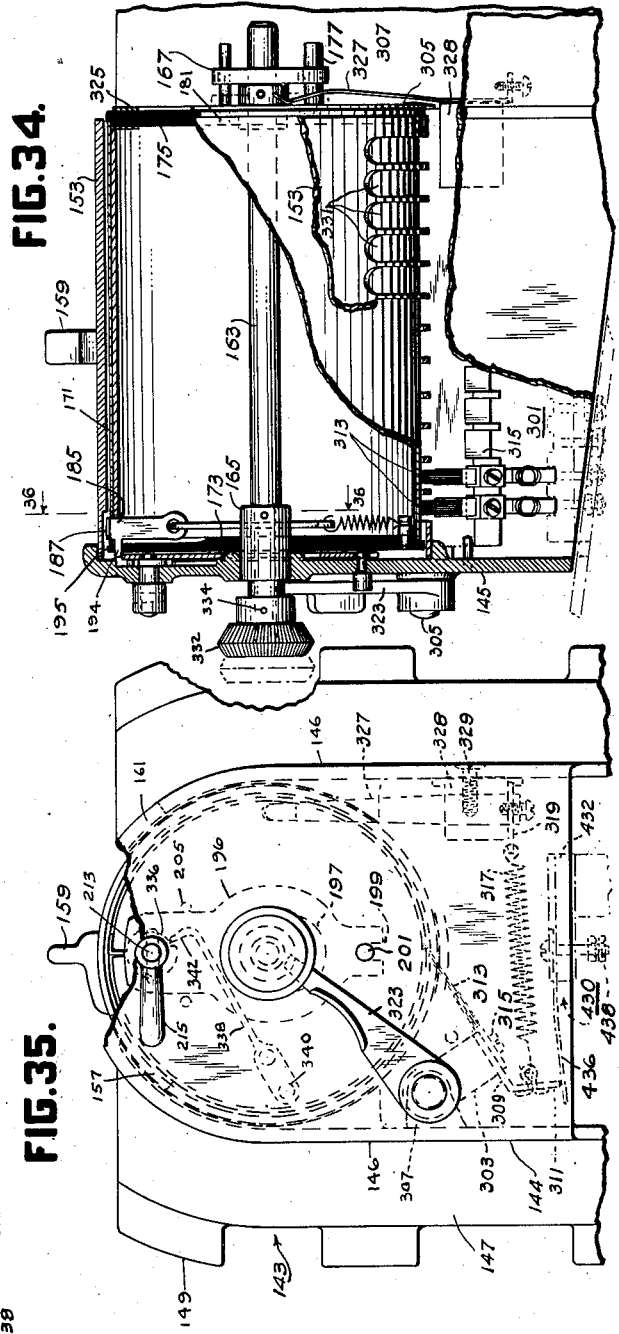
INVENTOR
*Eugene A. Ford*
BY
ATTORNEY Feb. 12, 1946.     E. A. FORD     2,394,604
PERFORATING APPARATUS
Filed June 22, 1944     21 Sheets-Sheet 21

INVENTOR
Eugene A. Ford
BY
ATTORNEY

Patented Feb. 12, 1946

2,394,604

UNITED STATES PATENT OFFICE 2,394,604

PERFORATING APPARATUS

Eugene A. Ford, Scarsdale, N. Y., assignor to International Business Machines Corporation, New York, N. Y., a corporation of New York Application June 22, 1944, Serial No. 541,485

24 Claims. (Cl. 164—113)

The present invention relates to perforating apparatus, and more particularly to improved apparatus for perforating record cards either under the control of a manually operable keyboard or under the control of a master card whose perforations are to be duplicated automatically in successive cards of a series of blank cards or a joint manual and automatic control.

The principal object of the invention is to provide card feeding and punching devices capable of operation at high speed for perforating record cards under the manual selection of the operator or automatically under the control of a master card.

In carrying out this object, the invention contemplates the provision of a machine having a card storage hopper or bin wherein the blank cards to be perforated are stored for use. From the hopper, the cards are fed successively one at a time to a punching station wherein the cards are progressively perforated. During perforation of the cards at the punching station, the cards are progressively moved in step-by-step fashion and, after the last column of a card has been punched, the card is passed to a receiving bin or hopper.

Heretofore, in an apparatus of this type, various means have been provided for feeding the cards to the punching station from the feed hopper. Such means have usually consisted of a picker mechanism, including a reciprocating carriage and rack on which there is mounted a card picker which operates when the carriage is reciprocated to engage the rear edge of the lowermost card in the stack and advance the same to the punching station. Because of the fact that such card handling carriages are necessarily bulky and because they must be reciprocated through a distance sufficient to carry each card from under the stack of cards and impel the same to the punching station, considerable time has been wasted in the operating cycle of the machine during the interval of time between release of one card by the carriage and registry thereof with the next succeeding card.

The present invention is designed to overcome the above noted limitation that is attendant upon card perforating apparatus of the character set forth above. Toward this end, the invention contemplates the elimination of the conventional massive reciprocating card carriage and rack and the substitution in its stead of a friction card feed unit and a pair of feed rolls arranged in close proximity to the supply hopper. The friction unit serves to impel the lowermost card in the stack forwardly a slight distance, which is sufficient however to allow the card to be engaged by the feed rolls, which latter elements take possession of the card and impel the same towards the punching station.

Another limitation that is attendant upon conventional card handling and perforating apparatus resides in the fact that the cards progressing from the stack to the punching station follow each other in succession and are separated from each other by a comparatively wide distance. To overcome this further limitation, the present invention contemplates a considerable saving of time in the operating cycle of the machine by causing the lowermost card issuing from the stack to be fed underneath a card already in position at the punching station. The former card is engaged by a clamping device when its leading edge reaches a point which is just ahead of the punching station. The card is held in this stored position until the preceding card has been punched in all of the columns thereof and has been fed out of the punching station. When this has occurred, the card which previously had been fed beneath the first card is then advanced a slight distance sufficient to bring it under the control of the punching station feeding means and wherein the first column thereof is in registry with the punching devices. Thereafter, a succeeding card is fed under the second card and the process is repeated.

The provision of an apparatus of the character set forth above being the principal object of the invention, a further object thereof is to provide a novel form of card impelling means operable to engage a card and impel the same from its stored position of rest adjacent the punching station into the punching station to be operated upon.

Another object of the invention is to provide an improved form of card feeding mechanism, by means of which cards are frictionally engaged and impelled in step-by-step fashion through the card punching station.

A still further object of the invention is to provide a novel form of adjustable throat mechanism under which the lowermost card leaving the stack is fed in passing to its stored position ahead of the punching station. The provision of such a throat mechanism enables relatively thin cards, that is to say, cards which are considerably thinner than standard present-day Hollerith type cards, to be fed one at a time from the stack and thus overcomes many difficulties previously encountered in attempting to feed thin cards from a stack.

Another object of the invention is to provide a novel and efficient punch operating mechanism capable of operation at very high speeds with great precision and with an unusually large amount of power. In carrying out this last mentioned object, the invention contemplates the elimination of the frequently used magnetically operated punch instrumentalities and the substitution in their stead of power driven punch instrumentalities, the source of power for which is derived from the same electric motor that drives all of the other moving machine instrumentalities. Selecting means for the individual punches, however, is obtained by means of a series of selecting magnets operable upon selective energization thereof to select the mechanically driven punch operating instrumentalities for operation.

Another object of the invention, in a machine of the character set forth above, is to provide a novel form of reproducing unit wherein all nine-hundred and sixty index point positions of a master card are positioned for simultaneous sensing thereof, together with a distributor mechanism for setting up successive electrical circuits leading to the punch magnets to cause operative punching of successive cards under the control of the master card.

A still further object of the invention, in a modified form thereof, is to provide a reproducing mechanism capable of receiving a master card and of moving this card continuously past a series of sensing brushes in order that electrical impulses may be sent to the punch magnets to operatively punch a succession of cards under the control of the master card.

Another object of the invention is to provide an improved automatic-skipping mechanism for control of the punching apparatus so that data of a certain class on the original master card may be eliminated in transferring the data to the blank cards.

Another object of the invention is to provide a novel form of X-skipping mechanism for control of the punching apparatus so that data may be punched in all or any number of selected columns in one or more selected fields of the cards manually being punched.

A still further object of the invention is, in a punching apparatus of this character, to provide a novel means for removing chips that are formed during the punching operation from the punching station.

Still another object of the invention is to provide an apparatus, including a table or stand, on which the keyboard and other manually operable instrumentalities may be mounted, together with a casing which is positioned above and hinged to the table and which has enclosed therein and operatively associated therewith in fixed unchangeable relationship substantially all the various card feeding, card punching and other card handling instrumentalities. The casing, being hinged to the table top, is movable from an operative position wherein the cards are operated upon in the manner intended, to an inoperative tilted position wherein the various card handling instrumentalities are available for inspection or repair.

Another object of the invention is to provide an apparatus of the character set forth above in which all of the various electrical devices associated with the punching and other card handling instrumentalities are operated by plate current issuing from a series of vacuum tubes, thus eliminating costly electrical contact and other equipment ordinarily employed for this purpose, as well as producing an arrangement which is conducive toward an extremely sensitive electric control for the apparatus.

The provision of a card handling and punching apparatus which is extremely compact in its design, one which is rugged and durable and which, consequently, is unlikely to get out of order, and one which may be manufactured at a relatively low cost are further desirable features that have been borne in mind in the production and development of the present invention.

In the accompanying 21 sheets of drawings forming a part of this specification, one embodiment of the invention has been illustrated, together with a preferred and a modified form of reproducing apparatus. In these drawings:

Fig. 1 is a perspective view of a machine constructed in accordance with the principles of the present invention and showing a flat card reproducer unit associated therewith.

Fig. 2 is a fragmentary rear elevational view of the apparatus as shown in Fig. 1.

Fig. 2a is an enlarged sectional view taken substantially along the line 2a—2a of Fig. 2.

Fig. 3 is an enlarged fragmentary top plan view of the receiving end of the apparatus with a portion of the card bed-plate broken away to more clearly reveal the nature of the invention.

Fig. 3a is an enlarged end elevational view of the apparatus showing the manner in which the mechanical card handling assembly may be tilted to expose the internal operating instrumentalities thereof to facilitate inspection and repair.

Fig. 6 is a sectional view taken substantially along the line 6—6 of Fig. 4.

Fig. 9 is an enlarged detail sectional view taken transversely through one of a pair of card impelling units employed in connection with the present invention.

Fig. 10 is a sectional view taken substantially along the line 10—10 of Fig. 9.

Fig. 11 is a sectional view taken substantially along the line 11—11 of Figs. 8 and 10.

Fig. 12 is an enlarged fragmentary side elevational view, partly in section, of the punching instrumentalities taken longitudinally through the machine in the vicinity of the punching station.

Figs. 12a, 12b and 12c are enlarged diagrammatic views taken longitudinally through the machine in the vicinity of an adjustable throat mechanism employed in connection with the present invention and showing the manner in which successive cards passing through the machine move into overlapping relationship prior to their passage to the punching station.

Fig. 12d is an enlarged, detailed, fragmentary, sectional view showing the mechanical relationship between a certain thrust rod and lever employed in connection with the present invention.

Fig. 13 is a fragmentary side elevational view of a clamp magnet contact and operating lever therefor.

Fig. 14 is a sectional view taken substantially along the line 14—14 of Fig. 12.

Fig. 15 is a sectional view taken substantially along the line 15—15 of Fig. 12.

Fig. 19 is a sectional view taken substantially along the line 19—19 of Fig. 14.

Fig. 20 is a sectional view taken substantially along the line 20—20 of Fig. 16.

Fig. 21 is a sectional view taken substantially along the line 21—21 of Fig. 16.

Fig. 22 is a sectional view taken substantially along the line 22—22 of Fig. 16.

Fig. 23 is a sectional view taken substantially along the line 23—23 of Fig. 16.

Fig. 24 is a top plan view, partly in section, of a preferred form of reproducing unit employed in connection with the present invention.

Fig. 27 is a rear elevational view of the disclosure set forth in Fig. 14.

Fig. 28 is a sectional view taken substantially along the line 28—28 of Fig. 27.

Fig. 29 is a sectional view taken substantially along the line 29—29 of Fig. 14.

Fig. 30 is an enlarged detail sectional view of a release mechanism employed in connection with the present invention.

Fig. 31 is a sectional view taken substantially along the line 31—31 of Fig. 30.

Figure 33:
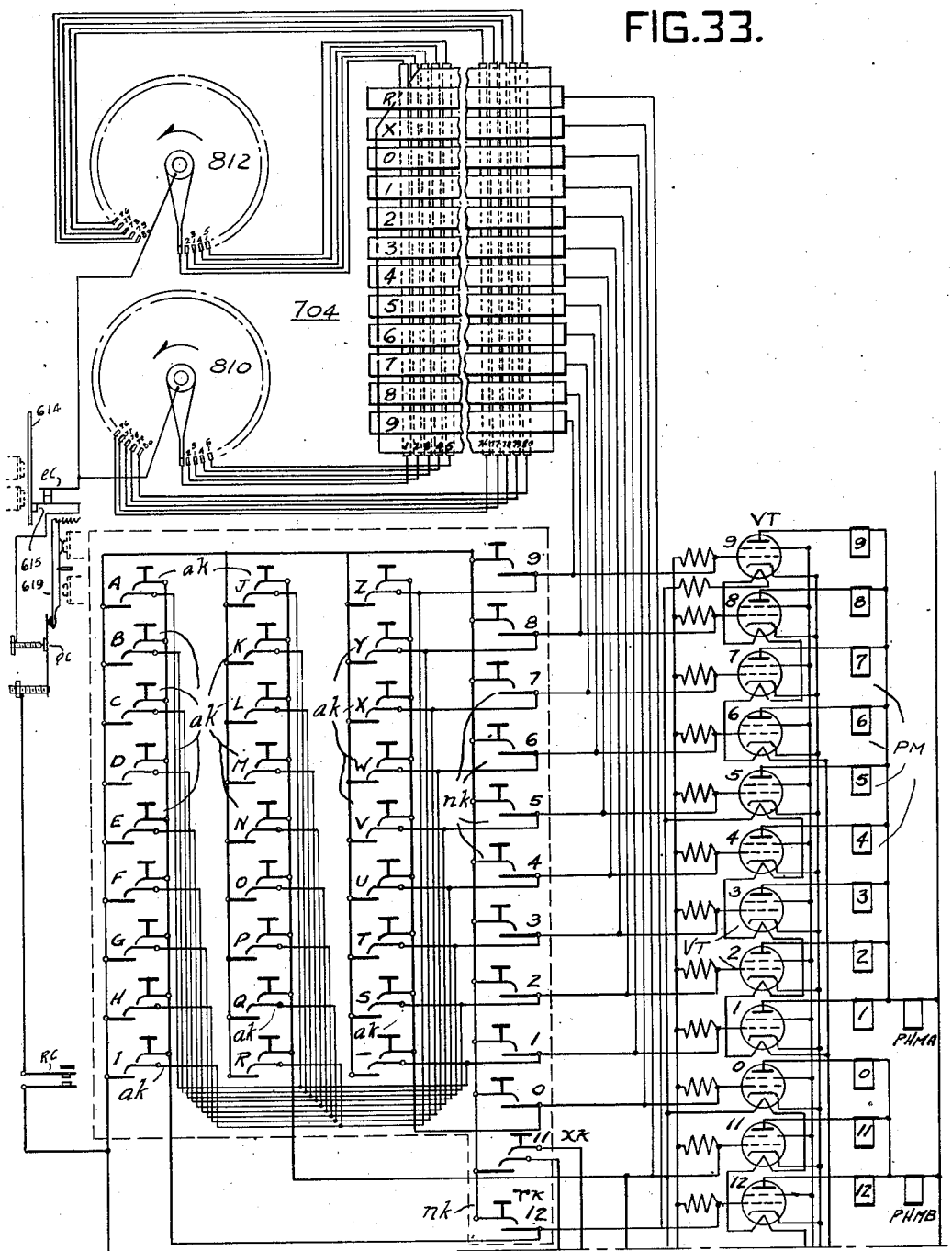

Figs. 32 and 33, taken together, constitute an electrical wiring diagram of the machine.

Fig. 34 is a transverse sectional view taken through a modified form of reproducing unit which may alternatively be employed in connection with the present invention.

Fig. 35 is an end view of Fig. 34.

Fig. 36 is a sectional view taken substantially along the line 36—36 of Fig. 34.

Fig. 37 is an electrical diagrammatic view showing the electrical connections employed in connection with the modified form of reproducing unit shown in Fig. 34.

Figure 38:
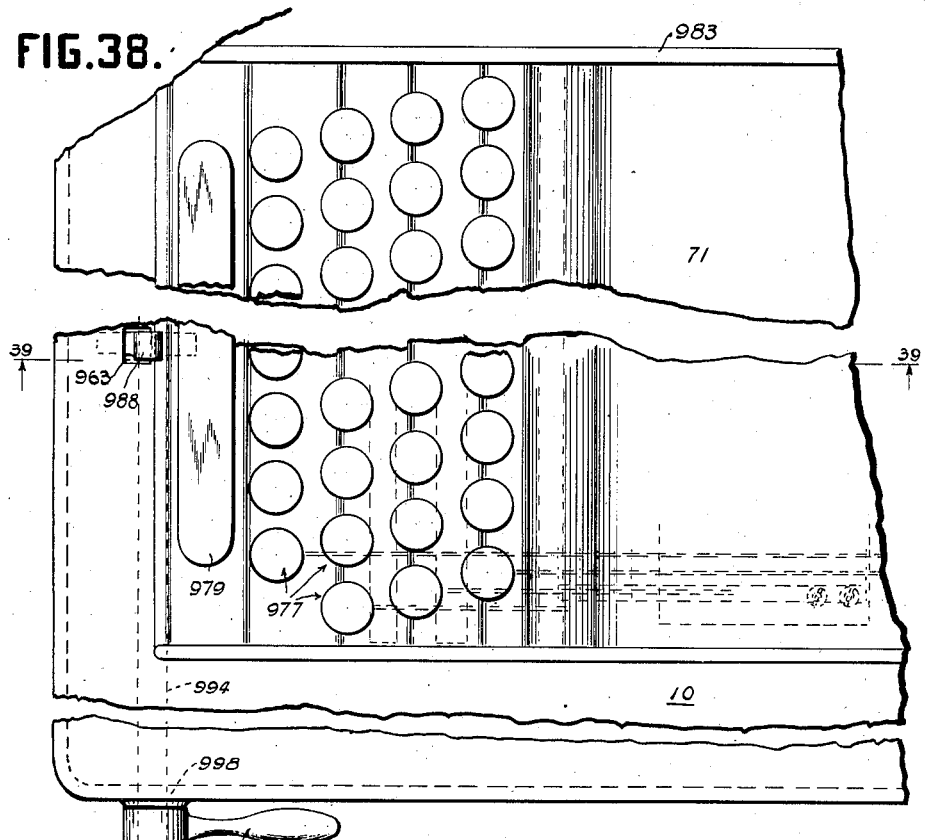

Fig. 38 is a top plan view of one form of keyboard which may be employed in connection with the present invention for controlling the punching operations.

Figure 39:
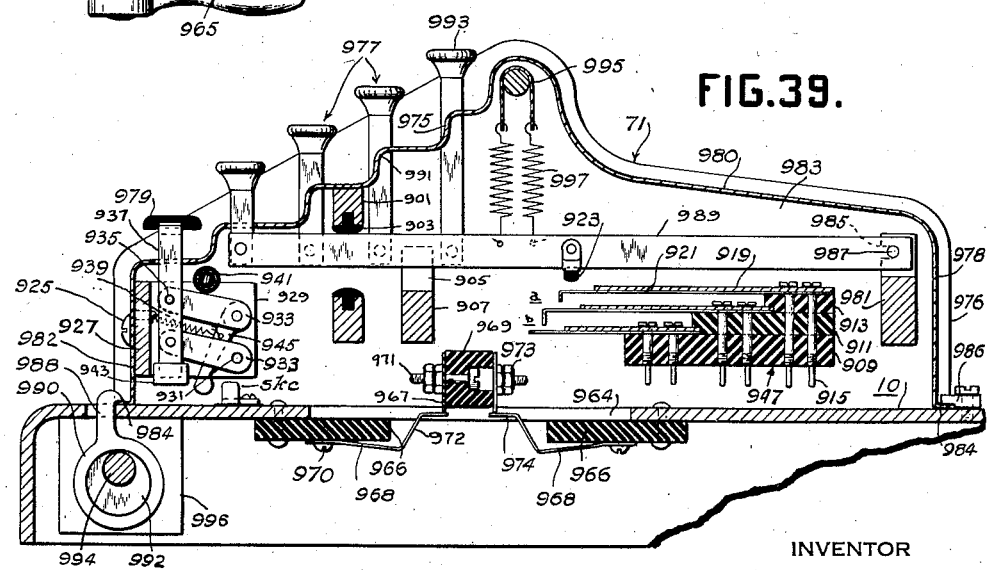

Fig. 39 is a sectional view taken substantially along the line 39—39 of Fig. 38.

BRIEF DESCRIPTION

Referring now to the drawings in detail, the separate units of the machine will first be described and their mechanical functions and operations explained, after which will follow a description of the circuit diagram during which description complete operation of the machine will be set forth.

Referring to Fig. 1, the machine involves in its general organization a card feeding station at the right-hand side of the machine as viewed in this figure, including a feed hopper in which cards are placed and from which they are successively fed through a throat arrangement to a plurality of feed rolls by means of which they are grasped and advanced to a punching station located in the medial regions of the machine.

Time is saved in the operating cycle of the machine by allowing a card to be fed under a card that has already reached the punching station and the card is arrested in its movement toward the punching station when its leading edge has reached the entrance to the punching station. The card is maintained or stored in its arrested position during that portion of the machine cycle in which the card preceding it and under which it has been fed is operated upon at the punching mechanism. In its stored position the card is no longer under the driving control of the card feed rolls and, as a consequence, a special flipper mechanism is employed for engaging and advancing the stored card to the punching station at an appropriate time after the punched card has left the punching station. Punching is accomplished at the punching station either under the control of a manually operable keyboard or automatically under the control of a master card placed in a reproducing unit for control purposes. In either case, the punching devices are electromagnetically controlled in the same fashion and the card is advanced in step-by-step fashion past the punching station one card column at a time.

Feeding of the cards is accomplished by means of a plurality of card feeding rolls which are operated under the control of a frictionally driven ratchet wheel, the normal tendency of which is to rotate for card feeding purposes but whose movement may be arrested periodically by means of an electromagnetically actuated escapement mechanism, the function of which is controlled by the punching instrumentalities. Means are provided for automatically feeding each card out of the punching station to a plurality of eject rolls after the card has been advanced beyond its last punching position in the punching station. The eject rolls serve to feed the card to a hopper or receptacle located at the end of the machine opposite the feed stacker. The machine is equipped with a release key which may be manually depressed at any time during a card punching cycle to discontinue punching operations and render the escapement mechanism ineffective to retard the card feeding rolls. The feed rolls then operate to continuously feed the card to the eject rolls from whence they are sent to the hopper. Means are also provided whereby an oncoming card following a released card will be arrested in its movement at the punching station in the first punching position thereof.

Where cards are to be automatically reproduced under the control of a master card, a reproducing magazine is employed in which the master card is placed for sensing purposes. An individual sensing pin is employed for each index point position of the card, there being nine-hundred and sixty pins in all in the case of standard Hollerith cards, and the various pins are connected to a distributor assembly by means of which the corresponding magnets controlling the punching operations are selectively energized. Where the reproducing magazine is employed, all machine functions are automatic and the cards are fed from the feed hopper to the punching station whence they are operated upon and passed to the receptacle which receives the punched cards in rapid succession.

The apparatus is equipped for both automatic- and X-skipping. That is to say, means are provided whereby information may be omitted from any particular field of the card undergoing reproducing or information may be added to any particular field thereof during manual punching. Toward this end, a skip index wheel is provided having associated therewith a plurality of movable pins, one for each card column, together with means for positioning the pins in one of three positions, namly, a central inoperative position, a rearward position for X-skipping or a forward position for automatic-skipping. Movement of the index wheel is synchronized with movement of the card feed instrumentalities. Such pins as are positioned for automatic- or X-skipping are designed for contact with one or the other of a pair of contact springs which make contact with selected pins and actuate the escapement mechanism. The pins may be selectively moved from their inoperative position to either the automatic- or X-skipping positions by means of keys available to the operator in front of the machine. The keys serve to shift the pins corresponding to the column in which the index wheel is positioned. In the case of automatic-skipping the index wheel is automatically advanced to the next column each time a pin is encountered.

Means are provided whereby all of the pins may automatically be restored to their inoperative positions and, toward this end, a sliding cam member is provided and upon movement thereof into the path of the pins the various pins are urged toward their inoperative position upon encountering the cam.

For spacing purposes, a space key is provided on the keyboard and manipulation of this key serves to actuate the escapement mechanism in a manner similar to its actuation under the control of the punching instrumentalities. Travel of the index wheel and of the card is thus limited to one column for each depression of the key.

GENERAL MACHINE CHARACTERISTICS

Referring now to the drawings in detail, and particularly to Fig. 1, the apparatus involves in its general organization a supporting structure upon which the operative machine instrumentalities are mounted and including a flat table top 10 which may be supported on legs 12. Depending from the underneath side of the table 10 is a box-like casing 14 in which there are housed all of the electronic and other electrical equipment employed for operating the apparatus.

Referring now to Figs. 1, 1a, 2, 3 and 3a, a pair of standards 16 and 18 are bolted or otherwise secured to the table portion 10 adjacent the rear edge of the machine and project upwardly therefrom. The upper end of each standard is bifurcated as at 20, and each bifurcated end carries a short horizontal stub or rock shaft 22. A pair of brackets 24 have their outer ends secured to the stub shafts 22 and their inner ends are bolted or otherwise secured as at 26 to the rear side wall 28 of an elongated rectilinear box-like casing 30 having an open lower end and in which are enclosed substantially all of the operative card handling instrumentalities associated with the apparatus, with the exception of certain punching operating magnets and levers and other instrumentalities shown in Fig. 12, and which are situated beneath and project upwardly above the table 10, as will be described subsequently.

The casing 30 and all of its enclosed instrumentalities may, by virtue of its pivotal mounting upon the stub shafts 22, be swung upwardly and rearwardly throughout an angle slightly in excess of 90° to conveniently expose the open lower end of the casing to render the card handling and punching instrumentalities contained therein accessible for inspection or repair. The manner in which the casing 30 may thus be tilted to an inoperative position is shown in dotted lines in Fig. 3a.

Figure 1A:
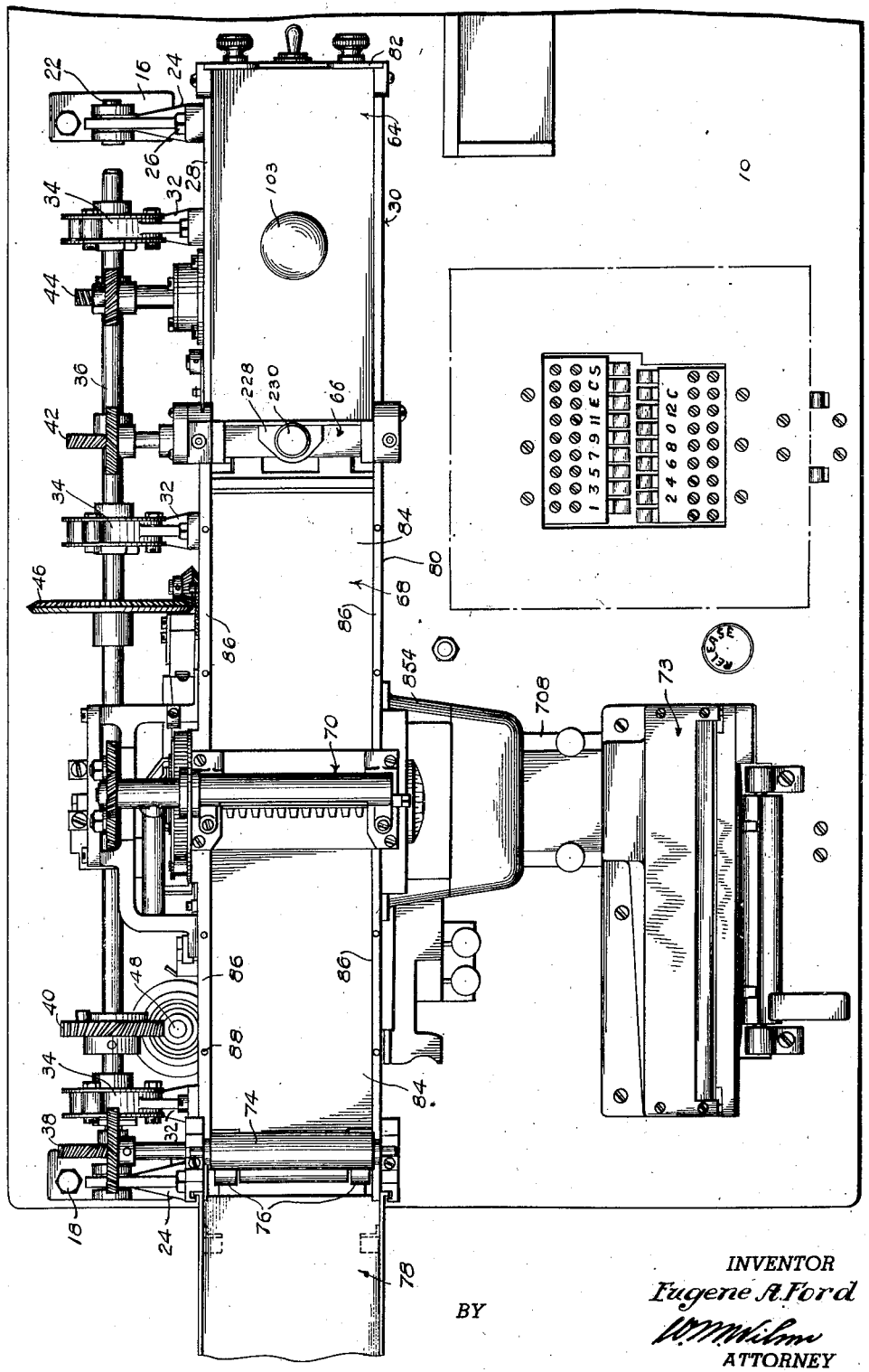
Fig. 1a is a top plan view of the apparatus.

A plurality of brackets 32 are secured to the rear wall 28 of the casing 30 and project laterally and rearwardly therefrom. The outer ends of the brackets 32 carry antifriction bearings 34 which serve to support therebetween a horizontal shaft 36 which is in exact alignment with the stub shafts 22 and which constitute the main operating shaft for the various card handling and punching instrumentalities associated with the machine and contained within the casing 30. The shaft 36 has mounted thereon a plurality of spiral gears, these gears being designated in order reading from left to right, as shown in Fig. 1a, at 38, 40, 41 (concealed but shown in Fig. 2), 42 and 44, and a bevel gear 46, by means of which gears the internal mechanism within the casing 30 is operated.

A shaft 48 (Figs. 1a, 2, 2a and 15) projects upwardly through an anti-friction bearing 50 and carries at its upper end a spiral gear 52 which meshes with the gear 40 for operative driving of the shaft 36.

Referring now to Figs. 2a and 15, the spiral gear 40 is mounted for limited turning movement upon a sleeve 54 which is anchored as at 55 to the shaft 36. The sleeve 54 is provided with a circular flange-like head 56 having an arcuate recess 57 formed in the peripheral regions thereof. A pin 58 projecting laterally from one side of the spiral gear 40 projects into the recess 57 and is limited in its movement by the edges thereof. The gear 52 is adapted to drive the gear 40 in the direction of the arrow as indicated in Fig. 2a, and thus it will be seen that the pin 58 upon encountering one edge of the recess 57 will drive the sleeve 54 and consequently the shaft 36 in a clockwise direction. The lost motion afforded by virtue of the pin 58 and the recess 57 in which it is disposed comes into play when the machine is not running and it is desired to tilt the casing 30 upwardly to the dotted line position shown in Fig. 3a. It will be appreciated that since the shaft 48 and the bevel gear 46 mounted thereon are continuously running elements, the casing 30 may be tilted upwardly to its dotted line position, as shown in Fig. 3a, without necessarily stopping the machine. In such an instance, since tilting of the casing 30 will take place at a slower rate of angular movement than the rate of angular turning movement of shaft 36, the pin 58 will drive the shaft 36 continuously during tilting of the casing and after it has assumed its tilted position. Only when tilting of the casing is resorted to with the machine stopped will the lost motion connection above described come into play.

Referring now to Fig. 2 wherein the rear side of the machine is shown in elevation, a motor M is mounted in any suitable manner beneath the table 10 and adjacent one corner of the machine within the confines of the supporting legs 12. A motor shaft 59 is connected through a flexible coupling 60 to the driving shaft 48 and has mounted thereon a fan arrangement, not shown, contained within a box-like fan or blower casing 61 having an open side 62 directed toward the central regions of the machine and through which air is expelled for cooling purposes. The blower assembly is purely conventional in its design and no claim is made herein to any novelty associated with the same. Its function is to cool the electronic and other instrumentalities contained within the casing 14.

Figures 4, 5:
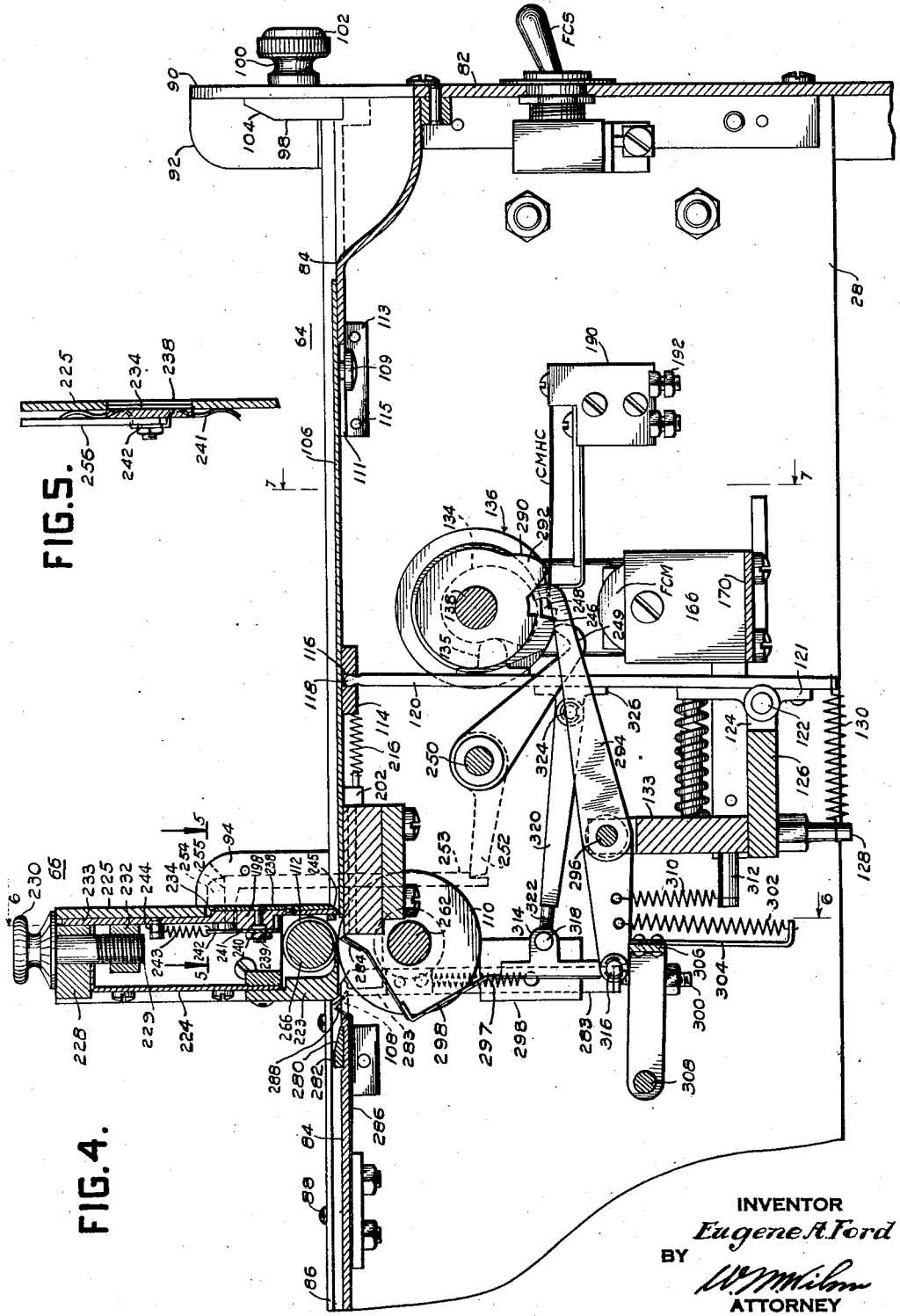
Fig. 4 is an enlarged sectional view taken substantially along the line 4—4 of Fig. 3.
Fig. 5 is a sectional view taken substantially along the line 5—5 of Fig. 4.

Referring now to Figs. 1a, 4 and 12, blank cards placed in a bin 64 adjacent the right-hand end of the machine, as viewed in Fig. 1a, and arranged in a stack are adapted to be fed one at a time from the bottom of the stack through an adjustable throat mechanism 66 from whence they pass to a storing station 68 located in the medial regions of the machine. The throat mechanism 66 is designed to permit feeding of either thin cards or cards of standard thickness, and toward this end the throat is provided with an adjusting mechanism, the nature of which will be set forth presently. At the storing station 68 time is saved in the operating cycle of the machine by causing a card to be fed under a card that has passed to a punching station 70. Cards passing through the punching station 70 are operated upon either under the control of a keyboard 71 or under the control of a reproducing unit 73, by means of which the cards passing through the machine are successively punched in accordance with the perforations appearing in a master card placed within the reproducing unit 73. After all punching operations have been effected in the cards passing through the punching station 70, the cards pass to a pair of eject rollers 74 and 76 located adjacent the left-hand end of the machine, as viewed in Fig. 1a, and by means of which they are carried into a removable eject bin or hopper 78.

The casing 30 includes the previously mentioned rear wall 28, a front wall 80, end plates 82 and a top card bed plate 84. The front and rear walls 80 and 28 project upwardly a slight distance above the level of the bed plate 84 and a plurality of narrow channel-forming strips 86 are secured as at 88 by means of screws to the upper edges of these walls to provide a shallow card receiving channel that extends from the adjustable throat mechanism 66 all the way along the machine to the eject bin 78. The opposite longitudinal edges of the cards are received beneath the plates 86, while the main body of the card slides along the bed plate 84 as the cards progress through the machine.

THE CARD STORING HOPPER

Still referring to Figs. 1, 1a, 4 and 12, the storage bin or hopper 64 for blank cards is formed by virtue of an upward extension 90 of the end plate 82 (see Figs. 3a and 4) together with a pair of side members 92 which project upwardly above the level of the bed plate 84 at one end of the machine and a pair of offset side members 94 associated with the adjustable throat mechanism 66.

The end plate 82 is provided with a pair of spaced vertically extending slots 96 arranged above the level of the bed plate 84. A pair of card rests 98 are each provided with threaded studs 100 which pass through the slots 96 and threadedly receive thereon a pair of clamping knobs 102 by means of which the elevation of the card rests 98 may be adjusted. A stack of cards C is adapted to be received within the bin 64 in such a manner that the lowermost card in the stack has its leading edge positioned upon the bed plate 84 in close proximity to the adjustable throat afforded by the throat mechanism 66 and with its opposite transverse edge resting in an elevated position upon inclined surfaces 104 formed on the blocks 98. In this manner the entire stack of cards is inclined slightly forwardly and downwardly as shown in Fig. 1. A card weight or follower in the form of a flat plate 101 having dimensions substantially equal to the dimensions of an individual card and provided with a knob or handle 103 is adapted to be placed upon the stack of cards C to exert its mass downwardly upon the stack and assist in guiding the leading edge of the lowermost card in the stack through the adjustable throat at the proper time in the machine cycle. A manually operable switch *fcs* is mounted on the end plate 82 at the right-hand end of the machine immediately below the bin 64 and is employed for the purpose of preventing card feeding operations, as will be described presently.

THE CARD FEEDING MECHANISM

Figure 7:
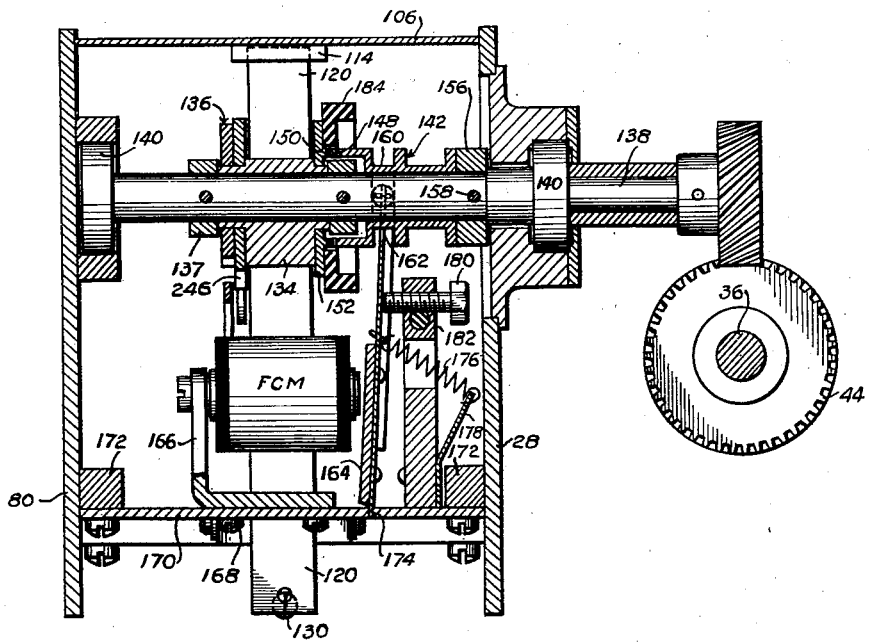
Fig. 7 is a sectional view taken substantially along the line 7—7 of Fig. 4.
Figure 8:
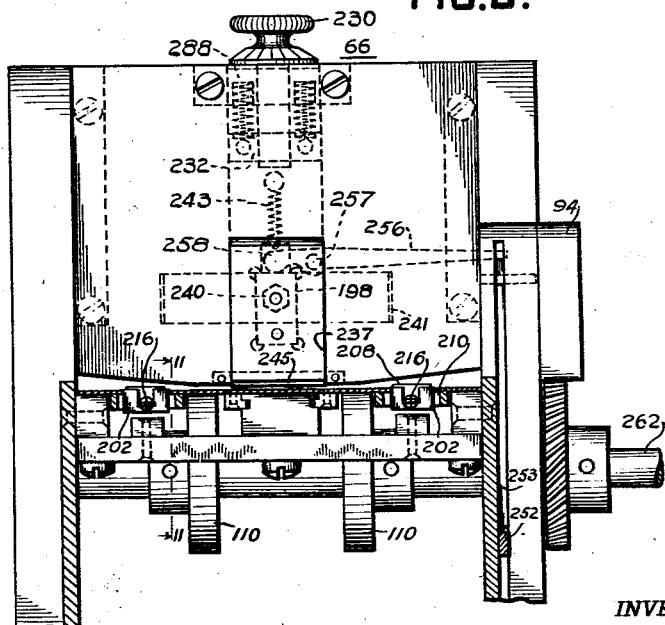
Fig. 8 is an end elevational view of a card feed and throat mechanism employed in connection with the present invention.

Referring now to Figs. 3, 4 and 7 wherein the card feeding mechanism is best illustrated, in order to feed the cards one at a time from the bin 64 a reciprocating feed plate 106 is slidably disposed on the bed plate 84 above an opening 108 formed therein. The feed plate 106 is possessed of limited movement longitudinally of the machine just sufficient to pass the leading edge of a card resting thereon into a pair of feed rollers 110 and 112 associated with the adjustable throat mechanism 66. Adjacent the rear end of the feed plate 106 and depending from the underneath side of the latter at opposite sides thereof are a pair of studs 109 having enlarged heads slightly spaced from the underneath side of the plate 106 and adapted to ride with the plate beneath horizontal flanges 111 formed on a pair of brackets 113 riveted or otherwise secured as at 115 to the rear wall 28. The plate 106 is thus guided in its limited longitudinal movements. A block 114 secured to the underneath side of the plate 106 in the medial regions thereof is formed with a socket 116 (Figs. 4 and 9) adapted to receive therein the rounded end 118 of an oscillating drive rod or member 120. The rod 120 is pivoted adjacent its lower end for limited oscillating movement by means of a bracket 121 which is secured thereto and which is itself pivotally mounted on a stud 122 carried by a pair of ears 124 formed at one end of a horizontal bracket 126 suitably secured to the stationary framework of the casing 30. A pin 128 projects downwardly from the underneath side of the bracket 126 and a spring 130 has one end anchored to the pin 128 and the other end thereof connected to the lower end of the rod 120, thus urging the rod 120 in a clockwise direction about the pivotal axis of the stud 122. A second spring 132 of the compression type bears against a bracket 133, also secured to the framework of the casing 30, and against the tiltable bracket 121 to assist the spring 130 in its tensioning of the rod 120.

Reciprocation of the feed plate 106 longitudinally of the machine throughout a limited distance is effected by means of a cam member 134 (see Figs. 4 and 7) which forms one cam element of a cam cluster 136 freely mounted on a continuously turning transverse shaft 138 mounted in anti-friction bearings 140. The cluster 136 is centered on the shaft 138 by means of a spacing collar 137 and a combined clutch head and collar 156 arranged on opposite sides thereof. The cam element 134 cooperates with a protuberance 135 carried by the rod 120 in such a manner that upon periodic one-revolution turning of the cam cluster 136, the rod 120 will be moved in a counter-clockwise direction against the action of the two springs 130 and 132 to impel the plate 106 to the left, as viewed in Fig. 4, for card feeding purposes.

The cam cluster 136 is normally maintained stationary in the position shown in Fig. 4 but is adapted to be periodically rotated throughout one complete revolution by means of a one-revolution clutch associated therewith and including a clutch sleeve 142 slidably disposed on the shaft 138 (see also Fig. 3). The clutch sleeve 142 is provided with a plurality of clutch teeth 148 formed on one end thereof which are adapted to cooperate with similar clutch teeth 150 provided on a clutch plate 152 carried by the cam cluster 136. The clutch sleeve 142 is mounted on the shaft 138 for limited sliding movement thereon and is splined as at 154 to the driving head or guide 156 which is anchored as at 158 for turning movement with the continuously running shaft 138.

The clutch sleeve 142 is provided with an integral clutch groove 160 integrally formed thereon and which cooperates in the usual manner with a clutch yoke 162 mounted on the armature 164 of a feed clutch magnet FCM carried by a bracket 166 secured in any suitable manner, as by means of screws 168 to a horizontal plate 170 secured to blocks 172 affixed to the front and rear casing walls 80 and 28. The yoke member 162 and armature 164 are pivoted as at 174 to the plate 170 and a coil spring 176 anchored at one end to the yoke 162 and at the other end to a bracket 178 normally urges the armature 164 to a retracted position wherein the teeth 148 and 150 of the clutch member are out of engagement. A set screw 180 passing through a bracket 182 is provided for the purpose of adjusting the position of the yoke 162 and armature 164 when the latter is in its retracted position.

The feed clutch magnet FCM is adapted to be energized by means of a momentary impulse of current thereto by momentary closing of feed clutch magnet contacts *fcmc*, shown in Fig. 13, and whose operation will be described later. Upon energization of the feed clutch magnet, the armature 164 is attracted thereto, thus moving the clutch sleeve 142 to the left, as viewed in Fig. 7, to cause the teeth 148 and 150 to become engaged to thereby rotate the cam cluster 136. The cam cluster 136 has associated therewith a cam element 184 formed of an insulating material, such as Bakelite. The cam element 184 is provided with a cam depression and a relatively long dwell cam surface, which depression and surface cooperate with a pair of clutch magnet holding contacts *cmhc* carried by an insulating block 190 having electrical terminals 192 for the contacts. The contacts *cmhc* are arranged in the operative energizing circuit of the magnet FCM and at such time as they are operatively engaged in the dwell period of the cam element 184 the circuit to the magnet FCM is complete. When, however, the contacts *cmhc* cooperate with the cam depression the circuit through the magnet FCM is open and the clutch which controls rotation of the cam cluster 136 becomes disengaged, thus bringing the cam cluster to rest. Because of the fact that the cam 184 is provided with a single cam depression and the remainder of the cam surface thereof constitutes in effect a period of dwell, the clutch mechanism above described is in effect a simple, electrically controlled, one-revolution clutch.

*The card impelling mechanism*

The reciprocating card feed plate 106 has associated therewith a pair of card feeding devices, one of which is illustrated in Figs. 9, 10 and 11 and which devices are situated on the plate 106 in spaced relationship adjacent the forward end thereof. Each of these card feeding devices is in the form of a resilient pad 200 formed of soft rubber or similar material and secured in a holder 202 by means of rivets 204 or the like, the entire unit being yieldingly mounted within an opening 206 formed in the plate 106. Each pad 200 is provided with a plurality of yieldable card engaging fingers 208 on its upper surface which project upwardly a slight distance through the opening 206 and are designed for yielding engagement with the underneath surface of the lowermost card in the stack C contained within the bin 64. The holder 202 is provided with a pair of trunnions 210 adapted to ride in inclined slots 212 formed in a pair of brackets 214 secured to the underneath side of the plate 106 on opposite sides of the opening 206. A coil spring 216 is anchored at one end to the holder 202 and at the other end to a stud 218 projecting downwardly from the underneath side of the plate 106 in such manner as to normally urge the pad 200 and its holder 202 rearwardly within the opening 206.

In actual operation, the pad 200 and its holder 202 float freely within the opening 206 in which it is disposed with the underneath side of the card resting upon the yieldable fingers 208 with a degree of friction controlled by the weight of the stack of cards C and the follower 101 resting thereupon. The inclination of the slots 212 is such that as the card feed plate 106 is moved forwardly under the influence of the oscillating rod 120 the tendency of the yieldable pad 200 is to move upwardly into firm frictional engagement with the card with which it is in contact. On the other hand, during the return stroke of the reciprocating feed plate 106 the tendency of the pad 200 is to release much, if not all, of its frictional engagement with the card with which it is in contact by virtue of its association with the slots 212 and its consequent tendency to move downwardly. In this manner very little frictional resistance is offered by the pad 200 to the card which has been fed forwardly and which is engaged by the feed rolls associated with the adjustable throat mechanism 66. The pad 200 will at no time move out of engagement with the card undergoing feeding and the action thereof is simply one of change in degree of friction, the friction on the card being less as the plate 106 is retracted than when this plate is advanced for card feeding purposes.

THE THROAT MECHANISM

Referring now to Figs. 4 to 8 inclusive wherein the adjustable throat mechanism for feeding cards from the bin or hopper 64 to the storing station 68 is illustrated, a pair of standards 220 and 221 are secured to the front and rear walls 80 and 28 respectively of the casing 30 and project upwardly above the level of the bed plate 84. A card guide 223 extends laterally between the side members 28 and 80 and is elevated slightly above the level of the bed plate 84. The stationary parts thus far described, together with an angular rear plate or cover 224 and a front plate or support 225, constitute a closed box-like casing in which there are disposed certain automatically operable internal throat operating instrumentalities, the nature of which will become clear presently.

Secured to the plate 225 by means of screws 227 is a block 228 through which there passes a micrometer screw 229 having a knurled operating knob 230. The lower end of the micrometer screw 229 is threaded and the threaded portion thereof is threadedly received in a vertically movable adjusting block 232 secured to a throat plate 233. The throat plate 233 is offset as at 234 and extends downwardly to a point which is in close proximity to the card feed plate 106. It will be seen that by turning the micrometer screw 229 in one direction or the other the elevation of the throat plate 233, and consequently the width of the throat provided between the lower edge of the plate and the card feed plate, may be varied. The block 228 is provided with a pair of recesses 235 in its underneath side and a pair of coil springs 236 having their ends disposed in these recesses bear downwardly against the adjusting block 232 for tensioning purposes. The plate 225 is formed with a rectangular recess 237 in the lower central regions thereof and a movable card guiding throat member 238 substantially fills the recess and is flush with the plate 225 but is of slightly less height than the height of the recess in order that the same may be reciprocated throughout a minute distance vertically within the recess. A threaded stud 239 receives thereover a block 198 and receives thereon a nut 240, by means of which the tension of a leaf spring 241 bearing against the inside surface of the plate 225 may be adjusted for the purpose of stabilizing the member 238 in its movements. The spring 241 is provided with an upwardly extending lug 242 to which there is anchored one end of a coil spring 243 whose other end is secured to a stud 244 carried by the adjustable throat plate 233. The spring 243 normally urges the adjustable throat member 238 to its uppermost position within the recess 237.

The lower edge of the automatically movable throat plate 238 is beveled as at 245 and this beveled portion of the plate serves normally to maintain the card immediately above the lowermost card in the stack away from the adjustable throat afforded by the throat plate 233 when cards are being fed from the bin 64. However, during such time as a card is not being fed from the hopper 64 the movable throat plate 238 assumes an elevated position. Immediately prior to the card feeding portion of the machine cycle the plate 238 is adapted to be automatically lowered until its lowermost edge is substantially flush with the lowermost edge of the plate 233 and in so moving, the plate 233 by a camming action forces the card immediately above and resting on the lowermost card rearwardly a slight distance and away from the throat in order that there will be no danger of two cards passing through the throat. This feature of the invention is of considerable importance where cards which are thinner than the standard Hollerith cards are being treated.

The means for automatically reciprocating the movable throat 238 includes a cam element 246 associated with the previously mentioned cam cluster 136 carried on the shaft 138 between the spacing collars 137. The cam element 246 is provided with a notch 248 in the periphery thereof, a rise portion 247, and the remainder of the periphery of the cam constitutes a dwell portion. A cam follower 249 is mounted upon a horizontal rock shaft 250 within the casing 30 and a finger 252 secured to the shaft 250 outside the casing 30 and on the rear side thereof cooperates with a thrust rod 253 disposed within a groove 254 formed in the previously offset side member of the standard 221. The upper end of the thrust rod 253 extends laterally as at 255 and this lateral extension thereof is adapted to bear against a lever 256 which is pivoted as at 257 and having an arm 258 normally bearing against the block 198 which moves with the movable throat plate 238. It will be seen that as the cam cluster 136 rotates throughout one revolution, the follower 249 riding outwardly on the dwell portion of the cam element 246 will rock the shaft 250, thus causing the thrust rod 253 to be moved upwardly to in turn rock the lever 256 and depress the automatically adjustable throat plate 238 relative to the stationary throat plate 233.

The spiral gear 42, which is mounted on the continuously rotatable shaft 36, meshes with a spiral gear 260 carried at the end of a transverse shaft 262 (Figs. 1, 4 and 6) and which projects completely across the casing 30 and is journaled in anti-friction bearings 264 mounted in the standards 220 and 221. The previously mentioned feed rollers 110 are disposed on the shaft 262 within the casing 30 and underlie the adjustable throat mechanism in a position which is slightly to the rear of the throat proper. The feed rollers 110 are of relatively large diameter and cooperate with the previously mentioned pair of feed rollers 112, which are of relatively small diameter and which are disposed within the casing of the throat mechanism between the card guide 223 and the adjustable throat plate 233. The pair of rollers 112 are integrally formed on a floating horizontal shaft 266 carried in anti-friction bearings 268 that are received in pockets 270 formed in the standards 220 and 221. Each of the bearings 268 is normally urged downwardly within its respective pocket 270 by means of a plunger 272, spring 274 and adjusting screw 276, all of which latter members are operatively mounted within a vercal bore 278 provided in each standard 220 and 221. The springs 274 thus serve to tension the upper rollers 112 against the lower rollers 110.

It will be seen that upon admission of the leading edge of a card through the throat proper this leading edge will be engaged by the continuously rotatable rolls 110, 112 and the card will be forced rearwardly and thus withdrawn from the storage bin 64.

THE CARD STORING STATION

Referring now to Figs. 1a, 4, 12a and 12b, the first card admitted to the feed rolls 110, 112 through the throat proper is caused to have its leading edge ride upwardly on an inclined surface 280 provided on a bar 282 positioned in the path of movement of the card. The card, once it has been grasped by the rolls 110, 112, is continuously fed along the bed plate 84 until its rear edge has passed beyond the center line of the rolls 110, 112. At this point an automatically operable clamping mechanism, including a pair of card clamps 283 (Fig. 6) serves to hold the card stationary on the bed plate 84. This position of the card has been referred to herein as a stored position because of the fact that the card is no longer under the influence of the rolls 110, 112, and it has not progressed sufficiently to bring it under the influence of the feeding mechanism associated with the card punching instrumentalities 70. Such a card is shown at c' in Fig. 12a. In order that at the proper time in the machine cycle the card c' may be advanced from its stored position to a point wherein its leading edge enters the punching station, a special flipper mechanism, which will be described presently and including a flipper element 284, is employed for engaging the rear edge of the card and forcibly impelling it along its normal path of movement. In Fig. 12b the card c' is shown as having been engaged by the flipper element 284 and advanced to a position wherein its leading edge has entered the punching station. In this position the rear region of the card c' becomes slightly elevated by virtue of the previously mentioned bar 282 and also by virtue of a pair of leaf springs 286 which are secured to the underneath side of the bed plate 84 and project upwardly as at 288 through the opening in the bed plate in which the feed rolls 110, 112 operate. The rear edge of the card c' being thus elevated, it is in a position to receive therebeneath the leading edge of an oncoming card c'' (Fig. 12b) when this card is released. In Fig. 12c the card c' is shown as having been engaged by the flipper element 284 and advanced to such an extent that it is under the influence of the punching instrumentalities, while the card c'' has moved to its stored position beneath the card c'. In this manner considerable time is saved in the operating cycle of the machine inasmuch as the stored card is in a position to immediately enter the punching station precisely at the moment that the card preceding it has been punched in all eighty columns thereof. Such an arrangement is distinguished from prior card feeding devices wherein a reciprocating carriage and picker mechanism carries a card to the punching station and then returns to pick up a succeeding card.

THE CARD CLAMPING MECHANISM

Referring now to Figs. 4 and 6, the card clamps 283 previously mentioned are automatically operated from a cam element 290 included in the cam cluster 136 mounted on the shaft 138. The cam element 290 is provided with a protuberance 292 designed for cooperation with a lever 294 which is pivoted as at 296 to the bracket 133. The clamping members 283 are of inverted L-shape and each has a horizontal portion adapted to overlie a longitudinal side edge of the card existing at the storing station. The clamping members 283 are guided in U-shaped brackets 298 and the lower ends thereof bear against adjusting screws 300 carried by a U-shaped cradle 306 carried on a rock shaft 308. A bracket 304 depends from the cradle 306 and the lower end of the bracket is connected to one end of a coil spring 302, the other end of the spring being attached to the lever 294. It will be seen that upon rotation of the cam cluster 136 the protuberance 292 will periodically engage an end of the lever 294 and rock the latter in a clockwise direction, as viewed in Fig. 4, to yieldingly urge the clamping members 283 upwardly and thus away from the bed plate 84. At this point in the machine cycle, i. e. when the clamps 283 are elevated, a card issuing from the feed rolls 110, 112 passes beneath the clamps 283 and moves to its stored position. Immediately thereafter, the cam element 290 operates to release the lever 294 and thus lower the clamps 283 into contact with the edges of the card. The lever 294 is normally maintained in its operative card clamping position by means of a spring 310, one end of which is attached to a pin 312 mounted on the bracket 133 and the other end of which is attached to the lever 294. A pair of coil springs 297 have their lower ends secured to a pair of pins 247 carried on the guide members 298 and their upper ends secured to a pair of pins 231 mounted in the clamp members 283. The springs 297 serve to normally maintain the lower ends of the clamp members 283 in contact with the adjusting screws 300.

THE CARD FLIPPER MECHANISM

As previously stated, it is necessary to forcibly impel each card from its stored position at the storing station inasmuch as the card in this position is no longer under the control of the feed rolls 110, 112. The previously mentioned flipper element 284 appears in Figs. 3, 4 and 6 and it also appears in detail in Figs. 12a, 12b and 12c, wherein its path of movement is diagrammatically illustrated. The flipper element 284 is in the form of an angular plate having an upper edge designed for engagement and impact with the rear edge of each card at the storing station at the proper time in the machine cycle. The purpose of the flipper element 284 is to engage and move each card from its stored position to a position where it may come under the influence of the punching instrumentalities. The flipper element 284 is secured at its lower end to a head 314. The head 314 is provided with a pivot pin 318 and is thereby connected with a link 320 having provision as at 322 for adjusting its length. The head 314 is also pivotally attached at its lower end, as at 316, to one end of the lever 294. The link is pivoted as at 324 to a bracket 326 carried by the rod 120 which operates the card feeding slide 106. It will be seen from the above description of parts that the operation of the card feeding mechanism, the clamping mechanism and the card flipper mechanism are closely interrelated. The card flipper element 284 derives horizontal component of motion by virtue of the link 320 connecting the rod 120 to the head 314. It also derives a vertical component of motion by virtue of the rocking lever 294 operated from the cam element 290. The actual path of movement of the upper edge of the card flipper element is diagrammatically illustrated in dotted lines in Fig. 12a. The closed path of movement of the upper edge of the flipper element is generally in the form of a parallelogram. When moving upwardly along the right-hand edge of this parallelogram, as viewed in Fig. 12a, the upper edge of the flipper element engages the rear edge of the card which rests just beyond the reach of the feed rolls 110, 112. Moving upwardly, the flipper element impels the card by a flipping action along its path of movement. As the upper edge of the flipper element traverses the upper edge of the parallelogram representing its path of movement, the card is still further impelled forwardly. After the leading edge of the card has entered the punching station to be operated upon in a manner that will be subsequently described, the upper edge of the flipper element 284 is caused to descend abruptly with a slight rearward movement along the left-hand edge of the parallelogram. The upper edge of the element 284 then travels rapidly rearwardly and just prior to its return to its initial position it makes a sharp dip downwardly to avoid meeting the edge of an oncoming card passing beneath the throat mechanism 233, 238.

THE CARD PUNCHING STATION

Referring now to Figs. 1a, 2, 12, 14, 15, 27, 28 and 29, the punching instrumentalities in the vicinity of the punching station 70 include means for applying perforations to the cards passing through this station, as well as card feeding means for periodically advancing the card in step-by-step fashion through the station. Referring specifically to Figs. 1a, 14 and 15, a horizontal feed shaft 350 extends across the machine in the vicinity of the punching station beneath the bed plate 84 and is journaled in bearings 352 at opposite sides of the machine. The shaft 350 carries at its rear end just outside the casing wall 28 a toothed escapement wheel 354 having formed on its periphery a series of escapement teeth, of which there are eighty in number, each tooth corresponding to one column of the cards undergoing punching. As shown in Fig. 27, the series of teeth are interrupted as at 356 for a space equivalent to the space normally occupied by eight of the escapement teeth, such interruption being for the purpose of permitting feeding of the cards away from the punching station after the eightieth column therein has been punched, as will be described presently. The shaft 350, together with the escapement wheel 354 thereon, is normally held against rotation and is adapted to be driven through a friction clutch mechanism designated in its entirety at 358 and which derives its motion from the shaft 36.

The friction clutch driving mechanism

The friction clutch 358 is best illustrated in Figs. 14, 27 and 28. This clutch includes a driven element in the form of a spider 360 mounted upon a shaft 362 carried in anti-friction bearings 364 mounted in a two-piece bracket 366 secured to the side wall 28 of the casing 30. The shaft 362 carries a spiral gear 368 meshing with the spiral gear 41 mounted on the drive shaft 36. Inasmuch as the shaft 36 and gear 41 are continuously rotating members, it will be seen that the spiral gear 368, shaft 362 and spider 360 are also continuously driven. The outer ends of the spider arms project into peripheral slots 370 formed in a circular friction disc 372 surrounding the shaft 350 and positioned in frictional contact with the rear side face of the escapement wheel 354. The rear end of the shaft 350 is threaded as at 374 and this threaded portion thereof receives thereon a tension adjusting split nut 376 which is adapted to adjust the tension applied to the friction member 372 by a spider-like spring 378 (see also Fig. 27). It will be seen that the tendency of the clutch assembly 358 is at all times to apply a torque to the escapement wheel 354 tending to rotate the same in the direction of the arrow shown in Fig. 27. As stated previously, however, the escapement wheel 354, and shaft 350 upon which it is mounted, is normally maintained stationary against the frictional tendency of the clutch member 358 to rotate the same.

The card feeding mechanism

As shown in Figs. 12, 14, 15 and 29, the feed shaft 350 has mounted thereon inside the casing walls 28 and 80, and in close proximity to the latter, a pair of relatively thin, comparatively large diameter lower card indexing rollers 380 designed for cooperation with a pair of vertically shiftable upper card indexing rollers 382, which latter rollers are of relatively small diameter. The rollers 380 are provided on their peripheries with relatively fine serrations or teeth for card gripping purposes. The rollers 382 are supported on anti-friction bearings 384 carried on short stub shafts 386 mounted medially of a pair of rock arms 388 suitably pivoted within a punching head 389 associated with the punching instrumentalities proper, the nature of which will be set forth subsequently when describing these punching instrumentalities. The upper rollers 382 are normally maintained in operative card clamping relationship to the rollers 380 therebeneath but are adapted to be periodically lifted out of operative engagement with the cards arriving at the punching station. Toward this end, a pair of springs 383 mounted in cups 385 contained in vertical bores 387 extend downwardly through the head 389 and exert their influence against the free ends of the arms 388, thus forcing the rollers 382 downwardly against the lower card indexing rollers 380. The rollers 382 and 380 operate upon the cards through openings 391 provided in upper and lower die blocks 393 and 395 respectively associated with the head 389. A pair of pins 396 are slidably disposed for vertical movement in openings 397 passing through the die blocks 393 and 395 and have formed thereon heads 398 which underlie the free ends of the arms 388.

The pins 396 function as thrust members for elevating the rollers 382 and accordingly they bear at their lower ends against a pair of arms 409 (see also Fig. 15) carried near the opposite ends of a horizontal rock shaft 410 journaled in and extending between the walls 28 and 80 of the casing 30. Means are provided whereby the rock shaft 410 may be periodically turned throughout a limited degree of movement in a counter-clockwise direction, as viewed in Figs. 12 and 29. Accordingly, the shaft 410 projects laterally through the rear wall 28 of the casing 30 (Figs. 15 and 27) and carries at its rear end a curved lever 411 provided with an inturned end 412 affording a cam surface 413 designed for camming engagement with a pin 414 mounted on the rear side of the escapement wheel 354 near the periphery thereof. Each time the escapement wheel 354 makes a complete revolution and the pin 414 engages the cam surface 413 on the inturned end 412 of the curved lever 411, this lever will be rocked about the axis of the shaft 410 in a clockwise direction, as seen in Fig. 27, and the shaft 386 will be turned in a counter-clockwise direction, as seen in Figs. 12 and 29, to elevate the arms 409, thrust pins 396, arms 388 and rollers 382 carried thereby, thus causing the latter to assume positions out of the path of movement of oncoming cards arriving at the punching station.

In order to initially feed a card to the pair of card indexing rolls 380, 382, it is necessary to momentarily energize the feed clutch magnet FCM to set the shaft 138 into one complete revolution, thereby operating the card feed slide plate 106 which carries the rubber card gripping friction pads 209. Toward this end, a contact group 416 (Figs. 13 and 15), including the previously mentioned pair of normally open feed clutch magnet contacts fcmc and a pair of interrupter contacts ic, is mounted on a block 418 secured to the inside front wall 80 of the casing 30. A contact lever 420 pivotally mounted on a stud 422 secured to the wall 80 is provided with an insulated finger 424 adapted upon operative movement of the lever to momentarily open the normally closed contacts ic and momentarily close the normally open contacts fcmc. A pin 426 carried by the front lower card indexing roller 380 is adapted once during each revolution of the roller to strike an end of the lever 420 and rock the same in a clockwise direction, as viewed in Fig. 13, to complete the functions just described.

Such momentary closing of the contacts *jcmc* applies an impulse to the magnet FCM of Fig. 7, thereby setting the shaft 138 into a single revolution, as previously described. Opening of the pair of contacts *ic* serves to prevent punching operations during that interval of time wherein a card has left the punching station and a new card has not yet arrived.

The card stop

In order that oncoming cards arriving at the punching station shall come to rest in the first punching position thereof, a card stop 400 (Figs. 12 and 15) is adapted to be projected upwardly through the die block 395 associated with the punching head 389. This card stop 400 is in the form of a flat plate loosely mounted on the ends of a pair of arms 404 secured to the horizontal rock shaft 410. The card stop 400 is in register with a slot 406 formed in the die block 395 and when the shaft 410 is in its normal position the card stop 400 occupies a retracted position within the slot 406, as shown in Fig. 12. Upon turning movement of the shaft 410 under the influence of the pin 414 and lever 411, as previously described, the arms 404 are adapted to become elevated to project the card stop 400 upwardly above the level of the bed plate 84 and into the path of movement of oncoming cards. The position of the slot 406 and card stop 400 relative to the punching instrumentalities is such that when the leading edge of an oncoming card engages the card stop, the card is so oriented with respect to the punching instrumentalities that it may receive perforations in the first column thereof. Immediately upon commencement of the punching operations and after the pin 414 has moved out of engagement with the lever 411, the card stop assumes its retracted position and feeding operations, wherein the card is progressively advanced through the punching station in step-by-step fashion, may commence. The shaft 410 carries thereon a contact operating finger 408 operable when the shaft is tilted in a counter-clockwise direction, as viewed in Fig. 12, to open a pair of card stop contacts labeled *csc*, the function of which is to open the electrical circuits that operate the punching instrumentalities and prevent punching operations prior to the time each oncoming card has arrived at the punching station in the proper position for punching thereof in the first column. In other words, and more briefly stated, the function of the card stop contacts is to prevent punching operations whenever the card stop 400 is in its elevated position within the slot 406. The manner in which the contacts *csc* operate will be set forth more fully during description of the circuit diagram for the machine.

The card punching instrumentalities

The punching instrumentalities proper are best illustrated in Figs. 12 and 15 and include a series of mechanically operated punches 450, of which there are twelve in number, for the purpose of forming alphabetic and numeric code perforations in the card. The punches 450 are mechanically operated from the motor M as the source of driving power. Selection of the punches for perforating purposes is accomplished by means of a series of punch magnets PM, one for each punch. These magnets PM serve upon energization thereof to actuate certain mechanical selecting devices which cooperate with the mechanical punch operating instrumentalities to selectively render the latter operative to apply power derived from the motor M to the operation of mechanically moving the selected punches.

The mechanical instrumentalities, by means of which the punches 450 are operated, are all carried within the casing 30 and accordingly are bodily movable with the casing when the latter is tilted upwardly from its operative position, as shown in full lines in Fig. 3a, to the inoperative dotted line position thereof. The selecting means, whereby certain of the punches 450 are selectively operated, is disposed beneath the stationary table portion 10 of the machine and when the casing is tilted to its inoperative position in the manner aforesaid all of the mechanical punch operating instrumentalities move out of cooperation and register with the selecting means which remain undisturbed.

The previously mentioned die block 395 is disposed at the punching station 70 and has its upper surface substantially flush with the surface of the bed plate 84 so as to form a substantial continuation thereof over which cards arriving at the punching station may pass. The punches 450 are each disposed in a vertical position and aligned with a corresponding die opening 452 formed in the die block 395. The punches 450 are arranged in alignment transversely across the die block 395 and their lower ends are guided in a series of guideways 454 provided in a guide bracket 456 suspended from the die block 395. Positioned above the die block 395 and secured to the side walls 28 and 80 of the casing 30 is the previously mentioned punching head 389 in the form of a casting having vertically disposed grooves 460 formed therein in alignment with the respective die openings 452 and in which grooves chips resulting from the punching operation are adapted to move vertically. A vertical cover plate 462 closes the open sides of the grooves 460, thus providing a series of narrow bores for the chips leading to a horizontal chip removal chamber 464 contained within the upper regions of the head 389. A screw conveyor 466 (see also Fig. 14) substantially fills the chamber 464 and is provided with a shaft portion 470 adjacent its rear end which is journaled as at 468 within the head. A spiral gear 472 mounted on the shaft 470 exteriorly of the head meshes with an idler gear 474 which in turn meshes with a similar idler gear 476, which meshes with the spiral gear 368 and this latter gear finally meshes with the gear 41 mounted on the shaft 36. Thus it will be seen that through the train of gears just described the screw conveyor 466 is continuously driven from the shaft 36 at all times, regardless of whether the casing 30 remains in its operative position or in its tilted inoperative position.

The chamber 464 is provided with an outlet 479 at the rear side of the machine which is in register with the upper end of a tubular chip removal chute 471 (Figs. 2, 14 and 15) which passes downwardly through the table portion 10 and communicates at its lower end with the interior of a chip receiving receptacle 473.

The punches 450 are adapted to be selectively operated so as to move upwardly a slight distance and perforate holes in the cards resting on the die block 395. Accordingly, an upper stripper plate 478 disposed beneath the head 389 is provided with die openings 480 therein in registry with the die opening 452 and also in registry with the chip removal grooves 460.

Referring now to Figs. 12 and 15, the means for mechanically selectively actuating the punches 450 by the application of power thereto from the motor M includes a continuously running, horizontally disposed driver in the form of an elongated cylindrical member 482 rotatably journaled in bearings 484 carried on the inside of the side walls 28 and 80 respectively. Continuous motion is applied to the driver 482 by means of a bevel gear 486 mounted on a shaft 488 formed on the driver 482. The bevel gear 486 remains at all times in mesh with the large bevel gear 46 carried on the shaft 36, and thus it will be seen that the driver 482 is adapted to be rotated at a comparatively high rate of speed by virtue of the step-up action between the two gears 46 and 486.

Positioned below the driver 482 and supported from the side walls 28 and 80 is a transverse horizontal supporting bracket 490 carrying a rubber or other resilient supporting pad 492 in the form of an elongated bar-like member embedded in the bracket 490 and upon which there rest the adjacent ends of a plurality of horizontal push or thrust rods 494, one for each of the punches 450. The adjacent ends of the push rods 494 which rest upon the pad 492 are each provided with a plurality of teeth 496 which are normally maintained out of contact with, but which are movable into engagement with, a series of driving teeth 498 formed on the periphery of the driver 482 and which are substantially coextensive therewith. The thrust rods 494 are individually shiftable in the direction of their length and are movable from a retracted position, wherein their ends abut, against a rubber or other resilient pad 500 carried in the bracket 490 and secured therein by means of a plate 502 and cap screws 504, to an advanced position for punch operating purposes. Accordingly, the ends of the rods 494 remote from the driver 482 are guided in a guide bracket 506 secured by means of cap screws 508 to a horizontal bar 510 that extends laterally across the casing 30. The bar 510 is provided with a comb-like series of teeth 512 adjacent its lower end and with a similar comb-like series of teeth 514 adjacent its upper end. Pivoted between the various adjacent teeth of the comb-like series 514 are a plurality of punch levers 516 in the form of bell crank levers, one for each of the thrust rods 494, these bell crank levers all being carried on a horizontal pintle pin 518 passing through the series of teeth 514. Each of the bell crank levers 516 is provided with a long depending arm 520, the lower end of which is guided between adjacent teeth of the series of teeth 512. The levers 516 are also provided with short horizontal arms 522.

The short horizontal arms 522 project outwardly from the bracket 510 in parallelism and the outer end of each arm underlies one of the punches 450. A resilient pad or bumper 524 is secured in a suitable manner beneath the bar or bracket 510 and serves to cushion the movement of the bell crank levers 516 when these latter move to their retracted position. The ends of the thrust rods 494 remote from the driver 482, in addition to being supported in the guide member 506, are yieldingly supported on the outer ends of a series of leaf springs 526 anchored in a bar 528 extending across the casing 30 and supported upon brackets 530 mounted on the side walls 28 and 80. The bell crank levers 516 are adapted under the influence of their respective thrust rods 494 to be rocked in a clockwise direction, as viewed in Fig. 12, about their pivotal axis 518 a slight distance and in so moving each of these levers is adapted to engage and close a pair of punch lever contacts *plc* carried in a contact block 532. The function of each of the contacts *plc* is to close an electrical circuit through a clamp magnet and an escapement magnet in a manner and for purposes to be set forth hereinafter.

The ends of the thrust rods 494 adjacent the driver 482, in addition to being maintained out of contact with the driver by the force of gravity when punching operations are not resorted to, are maintained in their lowered position by means of links 534 pivoted on a common pintle pin 536 carried in a block 537 mounted at the lower end of a plate 538 suspended from the bar 490. The extreme upper ends of the links 534 project through small openings 540 provided in the various thrust rods 494 (see Fig. 12d). The length of the various links 534 is such that when the ends of the thrust rods 494 adjacent the driver 482 become elevated for punching operating purposes, these ends will not completely leave the openings 540 in which they are disposed but will assume the position shown in dotted lines in Fig. 12d. The upper ends of the link 534 are provided with inclined cam surfaces 542, against which the edges of the openings 540 are adapted to bear when the thrust rods 494 move downwardly under the influence of gravity after a power stroke. These cam surfaces 542 thus enable the rods 494 to be snapped into position with the edges of the openings 540 moving into their respective notches 541. The ends of the rods 494 are turned upwardly as at 495 and the upturned ends are adapted to be engaged by the periphery of the driver to force the rods downwardly at the end of each operative stroke. A notch 541 is provided at the upper end of each link 534 which is designed for camming cooperation with the edge of its respective opening 540 so that after a punching operation the members will not bounce upwardly into engagement with the driver. In this manner repeat punching operations are prevented. A plurality of coil springs 544 are attached to the lower ends of the links 534 and to brackets 546 anchored to the block 537 in order to normally bias these links in a counter-clockwise direction, as viewed in Fig. 12. The coil springs 544 are sufficiently weak as to permit the desired camming action between the edges of the openings 540 and the cam surfaces 542.

The punch magnets PM are mounted in staggered relationship in a cradle 548 adjustably suspended from the underneath side of the table top 10. The cradle 548 includes a bottom plate 549 which is adjustably suspended from the table top 10 by means of a pair of horizontal bars 552 which threadedly receive at their opposite ends a pair of threaded studs 554. Each stud 554 has associated therewith a cap screw 555 which projects through the plate 549 and serves to secure the latter to the studs 554. The bars 552 and studs 554 thus constitute adjustable expansion members by means of which the height and inclination of the plate 549 may be adjusted.

Supported on the bottom plate 549 and extending laterally across the machine is a bar 560 which carries in its upper longitudinal edge a resilient supporting pad 562 in the form of an elongated bar upon which there rest the adjacent ends of a plurality of lifting levers 564 pivoted as at 566 at the upper ends of U-shaped brackets 568 associated with the various magnets PM. Each of the levers 564 is integrally formed with a magnet armature 570 associated with a respective magnet PM and normally maintained elevated in position directly above their respective magnet cores. Upon energization of any one of the magnets PM, the armature 570 thereof is adapted to be attracted thereto and thus move downwardly to rock the lever 564 associated therewith about its pivotal point 566 and elevate the outer end thereof. The levers 564 are maintained in their normal depressed position by means of a series of spring fingers 572 associated with a comb-like spring unit 574 secured by means of cap screws or the like 576 to an overlying bracket 578 associated with the magnets PM.

Resting with their lower ends supported upon respective levers 564 are a plurality of substantially vertically extending push rods 580, each of which is adapted to cooperate with a respective thrust rod 494. The upper ends of the push rods 580 are guided by means of a cross-piece 582 supported in brackets 584 and a spring finger 586 suitably supported in a bracket 588. The fingers 586 normally bear against their respective push rods 580 and urge the latter into sliding engagement with the cross-piece 582. The lower ends of the push rods 580 are provided with small heads 581 and the outer ends of the spring fingers 572 are bifurcated and straddle the push rods 580 and bear downwardly against the heads 581, thus maintaining the push rods 580 in their lowermost position and also maintaining the levers 564 in their inoperative position with their ends abutting against the resilient pad 562.

Secured to the underneath side of each of the thrust rods 494 and normally in alignment with the upper ends of the various push rods 580 are a plurality of circular abutment plates 590 of material thickness. These abutment plates are designed for engagement by the upper ends of the push rods 580 upon selective energization of the magnets PM. It will be seen that upon such energization of any one of the magnets PM, the push rod 580 will be moved upwardly under the influence of the lever 564, thus causing the upper end of the push rod 580 to engage the abutment plate 590 and elevate the end of its respective thrust rod 494 to such an extent that the teeth 496 thereon clash or engage the teeth 498 provided on the continuously running driver 482. When this occurs, the driver 482, which is continuously rotated in the direction of the arrow in Fig. 12, will cause the thrust rod 494 to be forcibly impelled longitudinally of the machine to such an extent that the end thereof engages the lower end of the bell crank punch lever 516, thereby rocking this lever in a clockwise direction, as viewed in Fig. 12, and causing its lower end to move out of engagement with the resilient pad or bumper 524. Because of the fact that the driver 482 is continuously driven from the relatively powerful motor M, which operates all of the machine instrumentalities, considerable thrust is exerted upon the push rod 494 for punching purposes. Also, because of the nature of the bell crank levers 516, possessing as they do a long leverage arm 520 and a short leverage arm 522, a very high degree of pressure is exerted upwardly on the punches 450 to cause them to penetrate the card resting upon the die block 395 and thereby resulting in a very efficient punching action. It is also to be noted at this point that because of the fact that the driver 482 is rotating at a comparatively high rate of speed, very quick and efficient punching operations are effected. As distinguished from more or less conventional punching instrumentalities, which rely for their mechanical operation upon the attractive powers of an electromagnet, the present punching instrumentalities have at their disposal a great deal more power for punching operations. It may also be noted at this point that by virtue of the present arrangement the magnets PM, which upon selective operation cause selection of their respective punches for operation, need not be as strong and, consequently, as bulky as the ordinary so-called punch magnet. Their function is not to apply mechanical power to the punches 450, either directly or indirectly, but rather it is to selectively set into operation other power applying instrumentalities in no way associated with the operation of the magnets PM. Indeed, these magnets may be extremely small in their design inasmuch as it is required of them only to elevate the push rods 580 and thrust rods 494 associated therewith.

The circular abutment plate 590 is of such diameter and is so positioned with respect to the upper ends of the push rods 580 that when the thrust rods 494 are moved longitudinally under the influence of the driver 482 these abutment plates move out of register with the push rods 580. Thus it will be seen that during the return stroke of the thrust rod 494 should the push rod 580 not have returned to its normal position at the time the thrust rod 494 approaches its normal position repetitive punching will not take place, by virtue of the fact that the plate 590 will engage the push rod 580 and force the same to the right against the action of the spring 586 and the latter will return to its lowered position at such time as the residual magnetism in its controlling magnet PM has become dissipated.

The escapement mechanism

It has been previously stated how, when any one of the thrust rods 494, associated with the mechanical punching instrumentalities of Fig. 12, is forcibly impelled to the left, as shown in this figure, under the influence of its clashing contact with the driver 482, a pair of punch lever contacts *plc* are adapted to become closed momentarily. Such closure of the punch lever contacts operates to energize a clamp magnet CM (Figs. 27 and 28) and also an escapement magnet EM (Figs. 27 and 28). The clamp magnet CM operates upon energization thereof to immediately arrest motion of the escapement wheel 354. Toward this end, the clamp magnet CM, which is preferably of the dual core type, is secured by means of a screw 599 to a bracket 600 affixed to the rear wall 28 of the casing. The bracket 600 is provided with side pieces 602 between which there is supported a pivot shaft 604 on which there is pivotally mounted for limited turning movement a clamp member 606, the lower end of which serves as an armature for the magnet CM. A cross bar 608 extending between the side pieces 602 has bearing thereagainst a compression spring 610 and the other end of the spring bears outwardly against the upper end of the clamp member 606. The clamp member 606 slightly overlaps the lower peripheral region of the escapement wheel 354 and thus the spring normally urges this member out of engagement with the wheel. Upon energization of the magnet CM, the armature portion of the clamp member 606 is attracted thereto, thus rocking the latter about the pivot point 604 to compress the spring 610 and force the clamp member into engagement with the side of the escapement wheel 354 to hold the same against rotation and prevent rotation of the feed shaft 350.

The escapement wheel 354 has associated therewith an escapement mechanism, best illustrated in Fig. 27, whereby indexing movement of the wheel in step-by-step fashion may take place under the control of the keyboard mechanism or the reproducer mechanism, either of which serve by electrical control means to control operation of the punches. The escapement wheel 354 by thus moving in step-by-step fashion allows the upper and lower card indexing rolls 382 and 380 to move the cards through the punching station in step-by-step fashion after punching operations have commenced.

The escapement mechanism just referred to includes the escapement magnet EM which, like the magnet CM, is of the dual core type. The escapement magnet is mounted upon a bracket 612 secured to the rear side wall 28 of the casing 30.

The escapement magnet is provided with an upper armature 614 in the form of an elongated rod, one end of which cooperates with the teeth formed on the periphery of the escapement wheel 354. The armature 614 is normally maintained elevated a slight distance above the cores of the magnet EM and when in such a position its end bears against the periphery of the escapement wheel 354 to prevent turning thereof in a clockwise direction, as viewed in Fig. 27. Floating guides in the form of relatively thin, flat leaf springs 622 are suitably attached to a stationary part of the machine framework and their upper ends yieldingly support the armature 614 in an elevated position. A tension spring 625, carried on a bracket 624, urges the armature forwardly against the periphery of the escapement wheel 354. A horizontal leaf spring 632 is supported at one end from the bracket 612 and has associated with its outer end a lifting piece 634 in the form of a flat piece of spring material, the two members 632 and 634 serving normally to urge the end of the armature 614 upwardly into engagement with the periphery of the escapement wheel 354. A stop 626 is adjustably mounted in the bracket 620 and limits the rearward traveling movement of the armature 614. Upon energization of the escapement magnet EM, the armature 614 is attracted thereto and the forward end of the armature moves downwardly and forwardly out of engagement with the periphery of the escapement wheel 354, thus allowing the latter to turn under the influence of the friction clutch drive mechanism 358.

It has been previously stated that when the punch lever contacts plc become closed by engagement with one of the bell crank punch levers 516, both the clamp magnet CM and the escapement magnet EM become energized. It is now pointed out, however, that the clamp magnet becomes energized a slight interval of time before the escapement magnet becomes energized. Such difference in the time of energization between these two magnets is preferably controlled by means of a suitable time delay device, such as a copper jacket, not shown, placed on the escapement magnet. Thus, upon energization of the clamp magnet, the escapement wheel 354 is immediately locked against turning movement. When the punch lever 516 has been partially restored to its initial position, the punch lever contacts open to deenergize both the clamp and escapement magnets, and the escapement magnet armature 614 moves upwardly to a position wherein it will engage the next tooth on the escapement wheel 354 by virtue of the fact that it is moved forwardly under the influence of the supporting member or spring 622. It is in this manner that step-by-step operation of the escapement wheel 354 is obtained, and consequently step-by-step feeding of the cards through the punching station is effected by the card indexing rolls 380 and 382 which are mounted on the same shaft 350 that carries the escapement wheel 354.

The above step-by-step feeding operation of the cards is repeated during punching for all eighty columns of each card. When the eightieth column has been punched, the entire feed wheel assembly will rotate throughout an angle equivalent to eight spaces or columns, inasmuch as the ratchet wheel is devoid of teeth in the section 356. At this point, the escapement wheel 354 will rotate uniformly under the influence of the friction clutch until such time as the card undergoing punching has been fed out of the punching station and its forward edge engaged by the pair of eject rolls 74 and 76 adjacent the end of the machine.

The above feeding operations are carried out during punching of each card, whether the punching operations are being controlled under the influence of the keyboard 71 or under the control of the reproducing unit 73. Where punching is under the control of the keyboard, obviously each indexing of the feed assembly will await the manual operation of a key on the keyboard and its subsequent effect upon the punching instrumentalities. Where cards are being automatically reproduced under the influence of the reproducing unit 73, the indexing operations follow each other in rapid succession under the influence of the punching instrumentalities.

The upper armature 614 of the escapement magnet EM has affixed thereto a contact operating finger 615 which operates when the magnet EM is deenergized and the armature is in its retracted position to maintain a pair of escapement contacts ec closed. The contacts ec are carried in an insulation block 617 secured to the rear wall 28 of the casing 30. These contacts serve to open the punching circuit to prevent punching operations in between columns of the card, and toward this end they remain open until the escapement wheel has in each instance been fully indexed.

The escapement magnet EM is provided with a lower armature 619 operable upon energization of the magnet to open a pair of punch circuit contacts pc, the function of which is to prevent repeat punching in the same column due to any residual magnetism that may remain in the punch magnets after initial energization thereof.

THE RELEASE MECHANISM

The action of the feed assembly after the eightieth column in a card has been punched constitutes in effect an automatic release for the card. Means are provided, however, whereby release of a card may be effected manually at any time during card punching operations, regardless of which column of the card is in position for punching. Toward this end, a release lever 650, shown in detail in Fig. 30, is pivotally mounted as at 652 on a pin 654 suspended from the table 10. One end of the lever 650 bears upwardly under the influence of a spring 656 against the lower end of a release key 658 slidably disposed in a guide member 660 secured as at 662 to the table 10. The other end of the lever 650 underlies the lower end of a thrust rod 664 (see also Fig. 31) slidably mounted by means of a pin and slot connection 666 on the inside of the front wall 80 of the casing 30. The upper end of the thrust rod 664 is pivoted as at 668 to a link 670 which is anchored to a rock shaft 672 rotatably journaled in the front and rear casing walls 80 and 28 respectively. The rock shaft 672 has secured thereto outside the casing wall 28 a depending finger 674 (see also Fig. 27), the lower or free end of which projects into a slot 676 provided in the upper edge of an elongated bar 678 slidably disposed in brackets 680 secured to the outside of the wall 28. A coil spring 682 serves to normally move the finger 674 to a retracted position wherein the bar 678 is also retracted. It will be seen that upon depression of the release key 658 the release lever 650 is tilted in a counter-clockwise direction, as shown in Fig. 30, thus causing the thrust rod 664 to become elevated and rock the link 670 in a clockwise direction, as shown in Fig. 31, thus rotating the shaft 672 in a counter-clockwise direction, as shown in Fig. 27, and causing the finger 674 to move the bar 678 forwardly.

The bar 678 is provided with a slot 684 medially thereof in its upper edge and an angular latch piece 686, pivoted as at 688 to the wall 28, has a horizontal arm 690, the end of which is adapted to fall into the slot 684 when the bar 678 is moved forwardly. A spring 692 secured to a bracket 694 bears against a vertical arm 696 formed on the latch member 686 to maintain the latter in its latched position with the bar 678 in its advanced or forward position. The forward end of the bar 678 has secured thereto in any suitable manner, as by means of rivets, a contact engaging finger 698 formed of insulating material and designed for operative engagement with a release key contact group *rkc*. The contact group *rkc* includes normally closed contacts *rkcp* which normally maintain the punching circuit closed but are operable upon opening thereof to open the punching circuit so that punching cannot occur during the time that a card is being fed out of the punching station. The contact group *rkc* also includes normally open contacts *rkce* which, when closed, serve to establish a circuit through the escapement magnet EM but not through the clamp magnet CM. Thus, when the release key 658 is depressed and the bar 678 moved forwardly to open the contacts *rkcp* and close the contacts *rkce* of the contact group *rkc*, the escapement wheel 354 is free to turn unrestrictedly.

The latch member 686, as shown in Fig. 27, has a portion thereof overlying the outer peripheral side of the escapement wheel 354. The pin 414, which controls the movements of the card stop lever 411, is designed for camming engagement with a cam surface 700 on the latch 686 in order to move this latch in a counter-clockwise direction and cause the arm 690 thereof to leave the slot 684 and thus release the bar 678 to allow it to move to its original retracted position under the influence of a spring arm 702, which also constitutes one electrical element of the contact group *rkc*. When this occurs, the contacts *rkc* are reversed, the escapement magnet EM is deenergized, and its armature 614 is free to rise so that the end thereof moves into the path of movement of the particular tooth on the periphery of the escapement wheel 354 representing the first punching position of an oncoming card at the punching station.

THE KEYBOARD AND CONNECTIONS THEREFOR

Referring now to Figs. 38 and 39 wherein one form of keyboard having provisions for both numerical and alphabetical punching is disclosed, the keyboard 71 in its entirety is adapted to be detachably applied to the upper surface of the table top 10 and when in position on the table overlies a central opening 964 provided in the table top 10 to the right of the reproducer unit 73 and release key 658 and in front of the tiltable machine casing 30. Secured to the underneath side of the table top 10, on opposite sides of the opening 964, are a pair of insulation blocks 966 which project inwardly from the opposite sides of the opening 964 toward each other and which serve to carry a plurality of spring contact fingers 968 which are secured by means of rivets 970 to the blocks 966. These spring contact fingers 968 project upwardly as at 972 through the opening 964 and extend laterally as at 974 and are arranged in staggered relationship. The spring fingers 968 are electrically connected by means of individual wires, not shown, to the various punch and other magnets which control the card handling and punching operations, as will be described subsequently, in connection with the electrical circuit diagram for the machine. The keyboard unit 71 includes an outer casing 976 having a rear wall 978, top wall 980, front wall 982 and side walls 983. Both the front and rear walls 982, 978, are provided with narrow, laterally extending foot flanges 984, the rear flange being adapted to be inserted beneath an attachment strip 986 suitably mounted on the table top 10 along the rear side of the opening 964. The forward flange 984 is adapted to rest squarely on the table top 10 and to be releasably clamped against the table top 10 by means of a pair of clamping lugs 988 associated with a clamping mechanism 990. The clamping lugs 988 are integrally formed on a pair of eccentric members 992 carried on a shaft 994, one end of which is journaled in a block 996 suspended from the table top 10 and the other end of which is journaled as at 998 at the right-hand side of the machine framework just below the level of the table top 10. The lugs 988 formed on the eccentric members 992 project upwardly through openings 963 formed in the table top 10 near the front edge of the opening 964.

The shaft 994 projects outwardly beyond the edge of the table top 10 and has secured thereto a handle 965. When the shaft 994 is turned in a clockwise direction by means of the handle 965, as viewed in Fig. 38, the clamping lugs 988 will become slightly elevated from the flange 984 and will be moved to a position where they are out of register therewith, thus permitting the front end of the keyboard to be lifted bodily upwardly so that the keyboard may be removed from its clamped position on the table top 10. When the shaft 994 is turned in the opposite direction the clamping lugs 988 will move into position above the flange 984 and subsequently be lowered into engagement with this flange to securely clamp the forward edge of the casing 976 in position on the table top 10.

When the keyboard 71 is in position on the table top 10 and is held against dislodgement by means of the lugs 988, the spring contact fingers 968 are adapted to be engaged by respective contact strips 967 arranged in staggered relationship on opposite sides of an insulation bar 909 and secured thereto by means of through-bolts 971 and clamping nuts 973. The through-bolts 971 and clamping nuts 973 constitute electrical terminal connections whereby when the keyboard 71 is in position on the table top 10 the contact fingers 968 may be operatively electrically connected to certain groups of contacts associated with the keyboard mechanism and which will subsequently be described.

The top wall 980 of the casing 976 is, in the front regions thereof, formed with a series of stepped formations 975 to accommodate four rows of manually operable keys 977 at different elevations, together with an elongated space bar or key 979 arranged at the front of the casing and occupying a lower elevation than any of the rows of keys 977.

The pattern of the keys 977 and space bar 979 is unimportant as regards the present invention and, if desired, these keys may be arranged generally to accommodate the standard keyboard as universally employed in typewriting machines. In the present instance, however, and for convenience of illustration, the upper row of keys 977 is designed to accommodate the ten digits of the Arabic numeral system, while the three lower rows of keys accommodate the letters of the alphabet, together with three additional special keys.

A support 981, in the form of a horizontal bar, extends across the rear of the casing 976 between the side walls 983. The upper end of the support 981 is slotted along its length as at 985 to provide a comb-like structure through which there extends a horizontal rod or pintle pin 987 to which there is pivoted a series of elongated levers 989 which at their free ends serve to support the various keys 977. These keys project through openings 991 formed in the top wall 980 of the casing 976 and are provided with the usual heads 993 adapted to be engaged by the fingers of the operator. A suspension bar 995 projects across the casing 976 at the extreme top thereof and suspended from this bar are a series of springs 997, the lower ends of which are anchored to the respective levers 989 to maintain the latter in elevated positions. A horizontal bar 901 carries a rubber bumper pad 903 which limits the upper positions of the levers 989 and determines the elevation of the heads 993 of the keys 977. The forward or free ends of the levers 989 are guided in slots 905 provided in a conventional interlocking guide bar 907 that extends across the sides 983 of the casing 976.

A terminal unit designated in its entirety at 947 is mounted within the casing 976 at the rear thereof and consists of three tiers of insulation blocks 909, 911, 913 respectively, arranged in superimposed relationship and diminishing in width upwardly, as shown in Fig. 39. The three blocks are secured together by means of contact bolts 915, which extend completely through the units and which also serve as electrical terminal contacts. Secured to the upper surface of each of the blocks 909, 911 and 913, by means of the bolts 915, are a plurality of abutment strips 919 of brass material and underlying spring contact elements 921. The forward ends of the contact elements 921 are arranged in close proximity and in such a manner that deflection of the upper elements 921 downwardly will serve to close plural pairs of contacts, as shown at a and b respectively. Each of the levers 989 carries in its medial region a finger 923 and the various fingers overlie respective upper contact spring elements 921 in the various groups. Thus it will be seen that upon depression of any one of the keys 977, one contact group consisting of two pairs of contact elements will become closed. The bolts 915 which serve as electrical terminals are suitably wired by wires, not shown, to the bolts 971 associated with the insulation bar 969 and thus the contact groups are electrically established in circuits leading to the punch and other control magnets of the machine.

Secured to the front wall 902 of the casing 976, by means of screws 925 or the like, is a U-shaped bracket 927 having parallel arms 929 projecting inwardly of the casing. Secured at one end to a pair of rock shafts 931 carried by the side walls of the bracket 927 are a pair of parallel links 933, the free ends of which are pivoted as at 935 to vertical supports 937 for the space key 979. The links 933, being arranged in parallelism, serve to maintain the supports 937 substantially vertical at all times. A coil spring 939 normally urges the links 933, and consequently the supports 937 and space key 979, to their uppermost positions with the uppermost link 933 bearing against an abutment member 941. The lower end of each of the supports 937 carries thereon a bumper element 943 which, when the space key 979 is depressed, is adapted to bear against the table top 10 and limit the downward movement of the space key.

The upper shaft 931 carries at one end thereof outside of the bracket 927 a contact engaging finger 945 to which the spring 939 is attached. The finger 945 is designed for engagement with a pair of normally open space key contacts *skc*, the function of which will become apparent presently. Upon depression of the space key 979, the finger 945 is rocked about the axis of the shaft 931 in a counter-clockwise direction, as viewed in Fig. 39, and the normally open contacts *skc* are caused to become closed.

THE REPRODUCING UNIT (PREFERRED FORM)

In Figs. 1a, 24, 25 and 26, there is disclosed one form of reproducing unit 73 which may be employed in connection with the present invention. In this form of reproducing unit a prepunched master card is held in a flat condition and the perforations appearing therein are simultaneously sensed, there being provision for sensing nine-hundred and sixty perforations. Associated with this reproducing unit, and mounted on the same shaft 350 that carries the escapement wheel and card indexing roller assembly, is a distributor mechanism shown at the extreme left-hand end of Fig. 14 and designated in its entirety at 704, the nature of which will be set forth subsequently. If desired, however, the entire unit 73 may be dispensed with and in its stead substituted a modified form of reproducer unit as shown in Fig. 34.

The reproducer unit 73 is mounted on the table 10 adjacent the front left-hand corner thereof and alongside the keyboard 71. The reproducing unit 73 involves in its general organization a casing, including a top wall 710, an inclined rear wall 712 integrally formed with side wings 714 overlying the table 10, this rear wall and its wings constituting a table chamber wherein the various wires constituting the cable may be grouped together and extended into a cable cover 708 through a cable clamp 711. The unit also includes a bottom plate 716 and side pieces 715.

Figure 26:
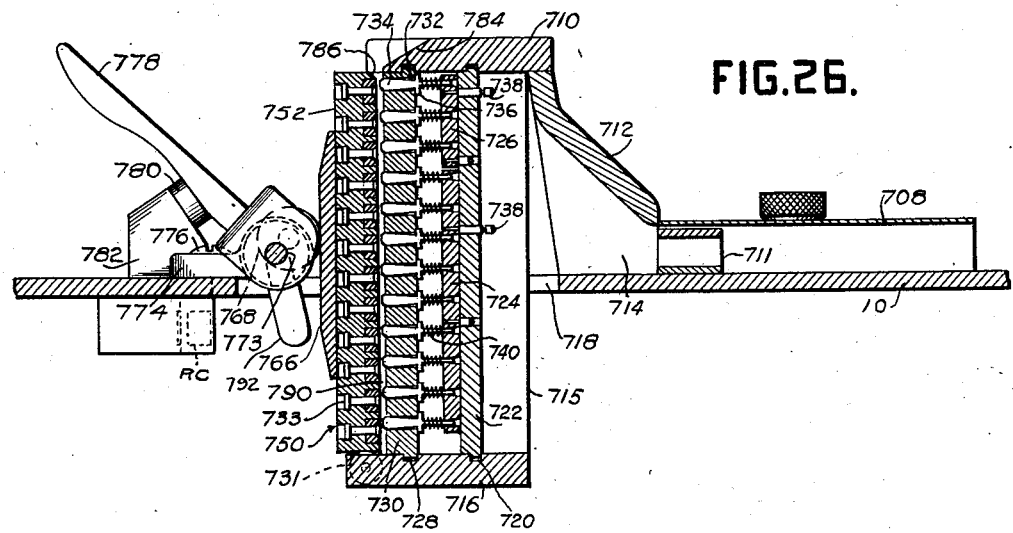
Fig. 26 is a sectional view taken substantially along the line 26—26 of Fig. 24.
Figure 25:
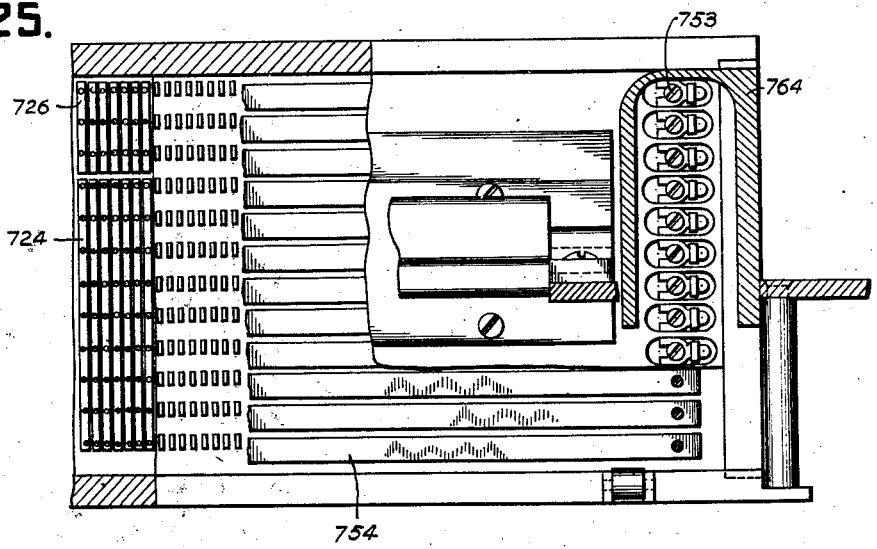
Fig. 25 is a sectional view taken substantially along the line 25—25 of Fig. 24.

The reproducing unit 73 extends downwardly through an opening 718 formed in the table top 10, a portion of this unit being contained below the table top and the remainder thereof being positioned above the table top. The top wall 710 and bottom plate 716 are provided with slots 720 therein for the purpose of holding therebetween a common plate 722. Secured to the common plate 722 are a series of eighty electrical common bars 724, hereinafter referred to as the numerical common bars, and a series of eighty electrical common bars 726, hereinafter referred to as the alphabetical common bars. Additional grooves 728 formed in the top wall 710 and bottom plate 716 serve to support therebetween a pin carrying block 730 formed of insulating material. The block 730 is provided with a series of nine-hundred and sixty holes 732 therein arranged in twelve rows corresponding to the twelve card columns of a standard Hollerith card of eighty holes, each corresponding to the eighty index point positions of the cards. A plurality of sensing pins 734, one for each hole, project through their respective holes in the block 730 and have heads 736 formed thereon to limit their inward position. The pins 734 contained in the three upper rows of pins, as shown in Fig. 26, are electrically connected as at 738 to the alphabetical common bars 726, while the pins in the nine lower rows, as viewed in this figure, are electrically connected in a similar fashion to the numerical common bars 724. Coil springs 740 surround the electrical connecting means and bear at one end against the common bars 724 or 726, as the case may be, and at the other end against the pin heads 736. Disposed within the opening 718 in front of the pin carrying insulating blocks 730, and movably mounted on rollers 731 carried by the bottom plate 716, is a common plate unit 750 which is generally of rectangular configuration and is comprised of an insulating block 752, across the inner face of which there extends a series of twelve parallel arranged common sensing bars 754. These latter bars are embedded in the insulating material of the block 752 and each bar is in register with a respective row of the pins 734 and is held in position by means of rivets 733. Each common bar 754 is provided with a terminal screw 753 that projects through the insulating block 752. A cover plate or casing 764 serves to conceal the various terminal screws and is removably disposed on the table top 10. Wires leading from these terminal connections, as well as wires leading from the pins 734, are carried out through the clamp 711 and cable cover 708 in the form of cable, as previously described.

A pressure plate 766 is affixed to the front face of the common bar carrying block 752 and is adapted to cooperate with a pair of eccentric rollers 768 mounted in slots 770 provided in a tiltable pressure head 772 pivoted as at 773 to a bracket 774 secured to the table top 10 by means of screws 776 forwardly of the opening 718. The pressure head is provided with a handle 778 which normally rests against a rubber or other resilient stop or bumper 780 mounted on a block 782.

Referring now to Fig. 26, the upper forward edge of the top wall 710 is beveled as at 784 and the rear upper edge of the common bar carrying block 752 is also beveled as at 786 to provide a guideway to facilitate insertion of a card vertically downwardly in the space or slot 790 existing between the block 752 and the block 730 when the former block is retracted. After a card has been inserted in the slot 790, the handle 778 is manually tilted forwardly to a vertical position so that the eccentric rollers 768 move over a dead-center position and lock the head 772 against the pressure plate 766 to compress the card and allow such pins as register with holes in the card to engage their respective common bars 754. When the block 752 is in its retracted position with the handle 778 bearing against the resilient bumper 780, a finger 792 carried by the head 772 is adapted to engage a pair of contacts $rc$ to open the electrical reproducing circuit during insertion or withdrawal of a card from the unit.

*The distributor mechanism*

Figure 18:
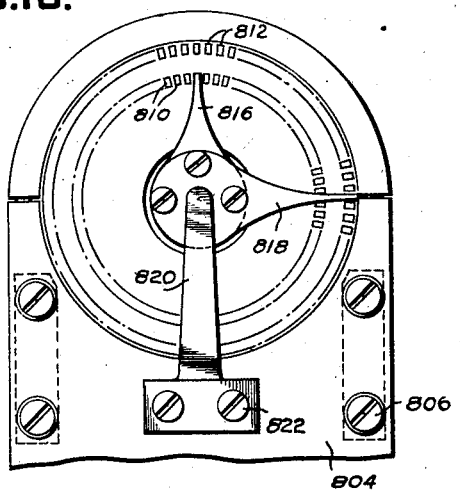
Fig. 18 is a sectional view taken substantially along the line 18—18 of Fig. 14.

Referring now to Figs. 14 and 18, the distributor mechanism 704 is illustrated and operates to energize successive pin columns in the reproducer to send impulses to the proper punch magnets which correspond to the holes sensed in the master card contained within the reproducer. The distributor mechanism is mounted on an extension 350' of the shaft 350, and in Fig. 14 is shown as being located to the left of a mechanism 800 utilized when X-skipping and automatic-skipping operations are desired. The extension 350' carries at its extreme outer end a head 802 surrounded by a stationary insulation block 804 secured by means of screws 806 to a bracket 808 mounted on a casting 809 affixed to the casing wall 80. Embedded in the insulation block 804, and arranged concentrically about the axis of the head 802, are inner and outer circular series of contacts 810 and 812 respectively. The inner circular series of contacts 810 represents a series of electrical contacts utilized for numerical punching of cards, while the outer circular series 812 represents a series of contacts utilized for alphabetical punching. Secured to the head 802, by means of cap screws 814 or the like, are a pair of distributor arms 816 and 818 respectively, the former being designed for successive engagement with the contacts 810 and the latter being designed for successive engagement with the contacts 812. The arms 816 and 818 are arranged approximately 90° apart, as shown in Fig. 18, and a common contact finger 820, secured by means of screws 822 to the insulation block 804, bears at its free end against the distributor arms 816 and 818.

THE SKIPPING MECHANISM

As previously stated, the present machine is equipped for both automatic- and X-skipping. Automatic-skipping is resorted to only during punching operations that take place under the control of a master card contained in the reproducer unit 73 and when it is desired to omit information from one or more selected fields of the cards undergoing punching. When the machine is conditioned for automatic-skipping operations, the punching instrumentalities will reproduce all of the information appearing in the successive columns of the master card up until a field from which it is desired to omit information altogether is encountered. The card will then be advanced rapidly so that the punches will skip over this field entirely and punching operations will be resumed at the end of the field under the control of the master card. If it is desired that no additional fields on the card should be skipped, punching operations will continue until the eightieth column of the card has been punched, at which time the card will automatically be ejected from the machine.

X-skipping is resorted to only during manual punching operations when no master card is contained in the reproducing unit 73. The X-skipping mechanism is provided for the purpose of enabling the operator to skip over any remaining portion of a selected field after all desired punching operations in that field have taken place. For example, if a field consists of twenty successive card columns and it is desired to add information to only the first five columns of this field, it would ordinarily be necessary, after the first five punching operations, for the operator to depress the space key fifteen additional times to bring the card to the beginning of the next field. The X-skipping mechanism is provided for the purpose of enabling the operator to pass or advance the card directly to the commencement of the next field after the first five punching operations have been completed.

The skipping mechanism for accomplishing these aims is best illustrated in Figs. 14 and 16 to 23 inclusive. Referring now to Fig. 14, a skip index wheel 850 formed of insulating material, such as Bakelite or the like, is mounted on the extension 350' of the feed shaft 350 and is enclosed in a housing 854 (see Fig. 1a). The wheel 850 is formed with a beveled face portion 856 having indicia 858 provided thereon representing the card columns and also having a blank space equivalent to eight index point positions involving eighty-eight index divisions in all.

A circular series of pins 860 having heads 861 thereon (see Fig. 23) project laterally through the index wheel 850 in the peripheral regions thereof just inside the beveled portion 856 and are selectively movable from a central or neutral position, as shown in the figure under consideration, and as shown in Fig. 22 at n, to either a forward position as indicated at f, or a rearward position as indicated at r. The forward position represents a condition wherein automatic-skipping may take place, while the rearward position represents a condition wherein X-skipping may take place. A circular guide member 862 is riveted or otherwise secured to a circular insulation strip 864, which in turn is fastened to the front wall 80 of the casing 30 by means of spacer members 866. The guide member 862 is formed with a pair of circular channels 868 and 870 which are interrupted for a slight distance adjacent the bottom of the wheel as at 872 and again as at 874 at one side of the member. The guides are so positioned that when the pins are in their neutral position the heads 861 thereof will be in alignment with the guideway or channel 868, and upon indexing of the wheel 850 these heads 861 will travel in this latter guide. When the pins are in their rearward position to obtain a condition of X-skipping, the heads 861 of the pins 860 are in alignment with the groove or channel 870 and may travel therein upon rotation of the wheel 850. When the pins are in their forward position at a condition of automatic-skipping, the heads of the pins are flush with a circular ring 876 which is secured to the rear face of the wheel by means of rivets 878. This ring constitutes an electrical common for the pins 860 and is engaged by an electrical take-off brush 865. In this forward position the heads of the pins will be guided by the front forward surface of the wall of the channel or guideway 868 and will thereby be prevented from becoming dislodged. A pair of electrically conductive coil springs 863 extend around the peripheral regions of the wheel 850 and bear inwardly against all the pins 860 to electrically connect or common these pins. The ends of the coil springs are suitably fastened together to provide a continuous ring-like conductor element.

In order to preset the pins 860 in either their front or rear positions for automatic- or X-skipping respectively, a pair of manually operable keys 880 and 882 (Figs. 16 and 17), representing automatic- and X-skipping respectively, are pivoted on a shaft 884 mounted in a bracket 886 secured to the casing wall 80. Coil springs 888, which are disposed in respective recesses 890, are contained in inverted thimbles 892 which bear upwardly against the keys 880 and 882 and serve to normally maintain the latter elevated. Positioned beneath the keys 880 and 882, and pivotally mounted in a pair of brackets 894, are a pair of parallel rock shafts 896 and 898. A hub 900 is mounted on the shaft 896 and is provided with an arm 902 which is connected by a link 904 to the key 882 medially thereof. Thus it will be seen that upon depression of the key 882, the rock shaft 896 will be rotated in a clockwise direction, as shown in Fig. 17, for a limited distance. The shaft 898 is similarly equipped with a hub and an arm, which latter arm is connected by means of a link to the key 880. These elements are substantially identical with the elements 900, 902 and 904 but they are concealed in the drawings and hence no reference numerals are applied thereto.

A bifurcated extension 908 of the bracket 886 forms a support for a horizontal shaft 910 upon which there is mounted a tiltable cradle 912, including an insulating block 914 to which there is secured a pair of contact brushes 916 and 917 designed for contact with the various pins when the latter are in their forward or rearward positions respectively. A spring 918, anchored at one end to a pin 920 and at the other end to a lug 922 formed on the cradle 912, serves to normally tilt the cradle to a position wherein the contact brushes 916 and 917 are elevated and in the path of the various pins 860.

Mounted on the shafts 896 and 898 are a pair of cam members 924 and 926 having cam surfaces 928 formed thereon and designed for cooperation with a cam surface 930 provided on the cradle 912. It will be seen, therefore, that upon depression of the key 882 the link and arm arrangement 904, 902, will impart a clockwise rocking movement to the shaft 896 to tilt the cam member 924 and thus tilt the cradle 912 to lower the contact brushes 916 and 917 out of the path of movement of the pin ends 860. Similarly, upon depression of the key 880, the cam member 926 will be moved in a counter-clockwise direction to cause the cradle 912 to become tilted and the brushes 916 and 917 to move out of the path of movement of the pin itself.

The shafts 896 and 898 (Figs. 22 and 23) have mounted thereon adjacent their ends and immediately below the skip index wheel 850 a pair of hubs 885 and 887 respectively. The hubs 885 and 887 have formed thereon upwardly extending arms 889 and 891, the upper ends of which are turned laterally to provide a pair of fingers 893 and 895, the ends of which are in register with the opposite ends of the various skip pins 860 when these pins are in their lowermost positions. It will be seen that upon rocking movement of either of the shafts 896 or 898 as controlled by depression of either of the keys 880 or 882, as the case may be, the extreme ends of one or the other of the fingers 893 or 895 will be moved into engagement with an end of the particular skip pin 860 which is in position for presetting and the pin may be shifted in either direction as desired to accommodate conditions of either X-skipping or automatic-skipping.

The pins 860 and brushes 916 and 917 are connected in the circuit leading to the escapement magnet EM. The pins 860 occupy positions at the periphery of the skip index wheel 850 in close proximity to one another or, in other words, the pins are closely spaced from each other in order that one pin shall not leave contact with either of the brushes 916 or 917 until the next succeeding pin has established electrical contact with the same brush. In this manner continuity of the electrical circuit leading to the escapement magnet EM, whose operation the pins control, is assured during skipping operations.

Figure 16:
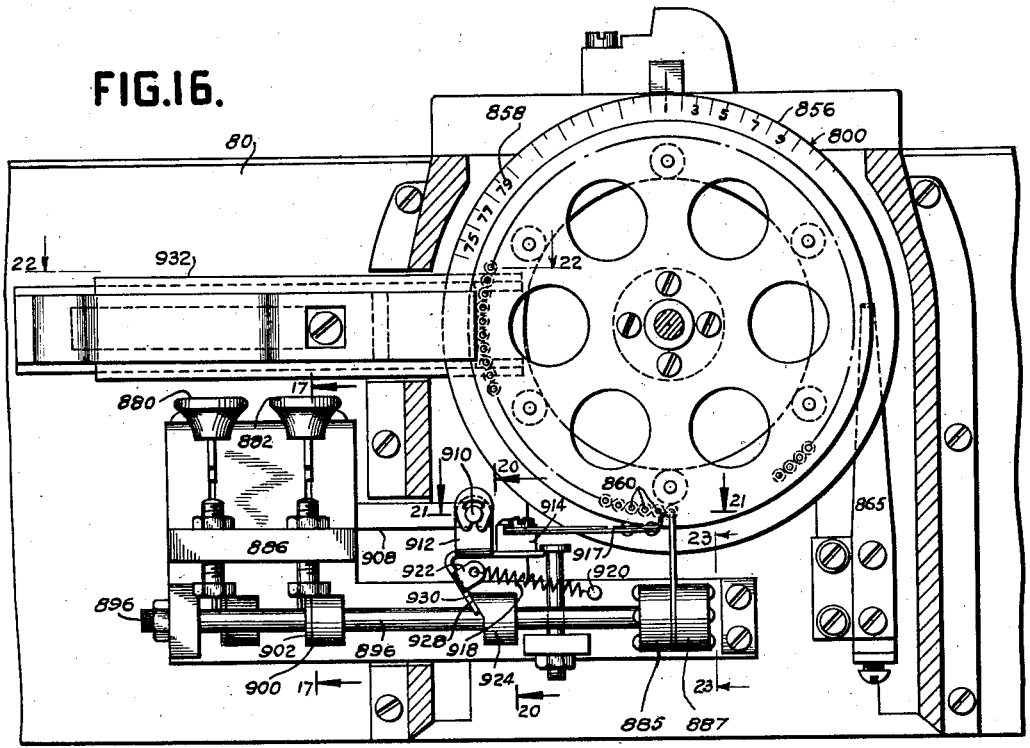
Fig. 16 is a sectional view taken substantially along the line 16—16 of Fig. 14.
Figure 17:
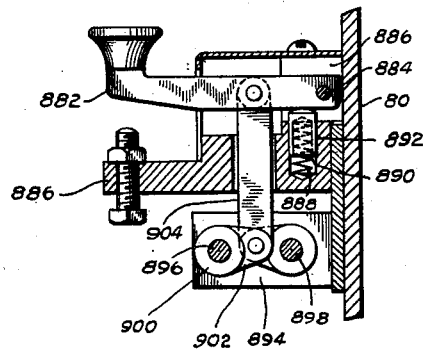
Fig. 17 is a sectional view taken substantially along the line 17—17 of Fig. 16.

Referring now to Figs. 16 and 22, a channel-shaped guide member 932 is affixed by means of screws 934 to the front wall 80 of the casing 30 and serves to slidably retain therein a pin resetting cam slide 936. The slide 936 is provided with a recess 938 at the rear side thereof, and disposed within this recess is a compression spring 940 which bears at one end against the edge of the recess 938 and at the other end against a stop pin 942 projecting into the recess 938 and anchored to the front casing wall 80. One end of the slide 936 is provided with a slot 944 therein, and suitably mounted in the side walls of the slot 944 is a pair of cam inserts 946 having inclined surfaces 950 designed for camming engagement with the heads 861 and shanks of the pins 860. Normally, the inclined surfaces 950 are maintained out of the path of movement of the pins by virtue of the spring 940 which maintains the slide 936 in a retracted position. A finger piece 952 is provided on the slide 936 and serves as an operating member whereby the slide 936 may be moved against the tension of the spring 940 to a position wherein the camming surfaces 950 assume positions in the path of movement of the pins 860.

By thus operating the slide 936 through the medium of the finger piece 952, the slide member 936 may be moved to the right, as shown in Fig. 22, whereupon when the escapement shaft is rotated to rotate the index wheel 850 all of the pins will successively be urged to their neutral positions with their heads 861 guided in the channel or groove 868. It is to be noted in connection with the restoring slide member 936 just described that the two channels 868 and 870, being interrupted as they are at 874, will permit restoration of the pins to their neutral positions. The interruption of the grooves 868 and 870 at 872 permits the pins initially to become preset. A pair of guide members 954 and 956 are adjustably secured by means of screws 958 to the wall 80 of the casing 30 and serve as pin guides for aligning the heads of the pins initially and preventing bending thereof.

THE REPRODUCING UNIT (MODIFIED FORM)

Referring now to Fig. 34 wherein a modified form of reproducing unit is disclosed, this latter form of unit will hereinafter be referred to generally as the drum type reproducing unit, as distinguished from the form of reproducing unit just described and referred to as the stationary magazine type reproducing unit.

When employing the drum type reproducing unit, the distributor assembly 704 of Fig. 14 is not employed and consequently the same, together with the shaft 350' on which it is supported, is removed from the end of the shaft 350. The drum type reproducing unit is designated in its entirety at 143 and includes an outer casing 144 having a front wall 145, side walls 146 and an open rear end. The side walls 146 adjacent their rear ends are flared outwardly as at 147 and are flanged as at 149 to provide attachment flanges, by means of which the casing may be secured to the front wall 80 of the casing 30. The casing 144 is provided with a dome-shaped top which is cut away as at 151 coextensively from the front wall 145 to the wall 80 of the casing 30 to expose the upper region of the skip index wheel 850 and the indicia 858 appearing on the periphery thereof. A tubular sleeve-like member 153 fits within the upper dome-like portion of the casing 144 and is designed for limited turning movement within the casing. It is slidably supported in its lower regions by means of arcuate lugs 155 integrally formed on the inner side walls of the casing. The sleeve 153 is slotted as at 157 and an operating finger piece 159 is formed on the sleeve 153 adjacent one edge of the slot 157. The slot 157 is designed for registry with the slotted portion 151 of the casing 144 when the reproducing unit is open for reception therein of a master card. When in its open position the operating finger piece 159 is receivable in a guideway 161 provided in the upper region of one side wall of the casing. By engaging the operating finger piece 159 and rotating the sleeve 153 within the casing 144, the slot 157 thereof may be moved out of register with the slotted portion 151 of the casing 144, thus effectively closing the casing.

Extending through the casing 144 and sleeve 153 coaxially with the latter is a shaft 163 which constitutes an extension of the shaft 350. The forward end of the shaft 163 is rotatably journaled as at 165 in the front wall 145 of the casing 144 and the rear end of the shaft has mounted thereon a suitable coupling device 167 which serves to couple the shaft 163 to the skip wheel 850. Mounted upon the shaft 163 and rotatable therewith is a reproducer drum 169. This drum 169 fits snugly within the sleeve 153 and is rotatable with the shaft 163. The drum includes a cylindrical body portion 171 and front and rear circular end pieces 173 and 175 respectively, which are formed of insulating material. The previously mentioned coupling device 167 includes a series of coupling pins 177 that project into apertures (not shown) formed in the skip index wheel 850 and into apertures 181 formed in the rear end piece 175, thereby effectively coupling the drum 169 and index wheel 850.

The drum 169 is adapted to receive therearound a master card, which it is desired to reproduce repetitiously, and when a card is thus positioned around the drum it is wholly contained within the confines of the sleeve 153. In order to facilitate insertion of a master card in the reproducing unit in proper position for repetitive sensing, clamping means are provided on the drum 169 whereby one corner of the card is firmly engaged, so that upon rotation of the drum throughout an angle of 360° the card may be drawn into the casing through the openings or slots 151 and 157 in the casing 144 and sleeve 153 respectively.

The clamping means just referred to include a clamp member 183 which projects through a slot 185 formed in the periphery of the drum 169 adjacent the forward edge thereof and which has a flat clamping portion 187 adapted to overlie a corner of the card and draw the same tightly against the drum 169 for clamping purposes. The clamping member is normally maintained in its clamping position by means of a coil spring 189 which is anchored as at one end to a stud 191 secured on the inside of the front end piece 173. The other end of the spring 189 is attached to the lower end of an arcuate link 193 which is curved to avoid the shaft 163 and which has its upper end connected to the clamping member 183, thus tending at all times to draw this latter member downwardly. The clamp member 183 is provided with a lateral extension or finger 194 which projects through a slot 195 formed in the periphery of the front end piece 173. The finger 194 is designed for engagement with a lifting cam 196 slidably mounted on the inside front wall 145 of the casing 144. The lifting cam 196 is in the form of a flat washer-like strip of pressed fiber, or other suitable composition, and is provided with a central opening 197 which surrounds the bearing 165 and which is of somewhat larger diameter than the latter. The lifting cam 196 is slotted as at 199 at its lower end and is guided by means of a pin 201 for vertical sliding movement. The upper end of the member 196 is provided with an ear 203 which is guided between guide pins 205 and a transverse slot 207 formed in the ear 203 receives therein an eccentric pin 209 mounted on a disc 211 carried by a shaft 213 rotatably journaled in the front wall 145 of the casing 144. The disc 211 is provided with an arcuate slot 336 in the peripheral regions thereof and a tension member 338 in the form of an elongated spring arm secured to the casing as at 340 has a finger 342 that extends into the slot 336 and frictionally bears against the inner wall of the slot. The turning movement of the disc 211 is thus limited by the extent of the arcuate slot 336. An operating lever 215 associated with the shaft 213 is adapted to be manually operated to impart vertical sliding movement to the cam member 196 in order that when the drum 169 is so oriented that the finger 194 of the clamping member 183 is in position above the upper edge of the cam member 196, the clamp will be lifted against the action of the spring 189 so that its overlying clamping portion 187 will clear the periphery of the drum and permit insertion of one corner of a card therebeneath. Upon release of the lever 215, the cam member 196 will be drawn downwardly under the influence of the spring 189 operating through the clamp member 183, thus permitting the corner of the card to be securely clamped against the periphery of the drum, while at the same time releasing the drum for subsequent turning movement under the influence of the shaft 350.

A sensing unit 301 includes an elongated insulating block 303 provided with trunnions 305, one of which is pivoted in an ear 307 formed on the inside of the casing and the other of which is pivoted in the front wall 145 thereof. A plurality of terminal pieces 309 are disposed along one edge of the block 303 and are provided with depending portions 311 affording terminal electrical contacts for respective sensing brushes 313 secured thereto by means of screws 315. A plurality of springs 317, anchored at one end to certain of the contact pieces 309, have their other ends secured to a flat horizontal insulation piece 319, which is secured in any suitable manner on the inside of the casing. The sleeve 153 is formed in its lower region with a grille-like series of openings or slots 331 through which the sensing brushes 313 are adapted to extend when the latter are in operative sensing relationship with respect to a card contained within the unit. The trunnion 305, which is journaled in the front wall 145 of the casing 144, projects completely through this front wall and is provided with an operating lever 323 on the outside of the casing, by means of which the entire sensing unit may be tilted in a clockwise direction against the action of the spring 317, as viewed in Fig. 35, to withdraw the brushes 313 from the slots 331 provided in the sleeve 153 during assembly or disassembly of the drum unit.

The electrical connections for the sensing brushes leading to the various punch magnets are afforded by means of a contact spring assembly 430 disposed within an opening formed in the table 10 directly beneath the unit 143. The assembly 430 includes an insulation block 432 suitably supported from the stationary framework of the machine. A series of flexible contact fingers 436 are secured as at 438 to the cross piece 434 and each underlies and is designed for contact with the depending portion 311 of one of the terminal pieces 309.

The rear end piece 175 of the drum 169 has affixed thereto a circular common ring 325, which is electrically connected to the metal drum and which is adapted to be engaged by a take-off brush 327 secured to a terminal block 328 affixed by means of screws 329 to the inside wall of the casing.

The shaft 163 is designed for limited sliding movement axially through the casing 144 from a forward full line position, as shown in Fig. 34, to a rearward dotted line position. When the shaft is in this latter position the coupling pins 177 become withdrawn from the apertures formed in the skip index wheel 850. In this position of the shaft the drum 169 is free to rotate during insertion of a master card into the unit to facilitate shifting of the shaft 163, as well as turning of the drum 169 and knurled operating knob 332 is pinned or otherwise secured as at 334 to the forward end of the shaft 163 outside of the casing 144. The pin and aperture arrangement 177, 179 thus constitutes in effect a manually releasable clutch whereby the drum 169 may be engaged with or released from the skip index wheel 850.

It is to be noted that the finger piece or lever 323 is slightly longer than the distance from its point of pivotal connection with the casing 144 to the edge of the aperture in which the bearing piece 165 is mounted. Thus when the shaft 163 is in its rearmost position with the clutch 177, 179 disengaged, the extreme end of the finger piece 323 will bear against the periphery of the bearing member 165 to cause the sensing unit 301 to assume its tilted inoperative position against the action of the springs 317 with the sensing brushes 313 out of registry with the master card. It is to be also noted that when the shaft is in its forward position with the clutch 177, 179 engaged, the extreme end of the finger piece 323 overlies the forward end of the bearing piece 165 to prevent accidental shifting of the shaft 163 laterally. The finger piece 323 thus acts as a locking member and when it is desired to move the shaft 163 to its disengaged position, it is necessary to depress the finger piece 323 manually to clear the end of the bearing piece 165.

THE ELECTRICAL CIRCUIT DIAGRAM

In Figs. 32 and 33 the electrical circuit diagram for the machine is illustrated. A description of this circuit diagram now follows, while simultaneously therewith will be given a general description of the operation of the apparatus, both as regards its mechanical aspects and as regards its electrical aspects.

The entire set of punch magnets PM, two of which appear in Fig. 12 near the bottom thereof, are shown in Fig. 33 and for convenience are arranged in a row along the lower right-hand edge of the figure. In addition to their common designation PM, these magnets are labeled 0 to 9 inclusive, 11 and 12. Each of the above mentioned magnets exists in the plate circuit of a corresponding electronic vacuum tube VT, also labeled 0 to 9 inclusive, 11 and 12. In Fig. 32, five additional vacuum tube controlled magnets are shown. These include the clamp magnet CM of Figs. 27 and 28 existing in the plate circuit of a vacuum tube VTCM; an X-skip magnet XM existing in the plate circuit of a vacuum tube VTXM; the escapement magnet EM of Fig. 27 existing in the plate circuits of a pair of vacuum tubes VTEMA and VTEMB; a control relay magnet CRM existing in the plate circuit of a vacuum tube VTCRM and the feed clutch magnet FCM of Figs. 4 and 7 existing in the plate circuit of a vacuum tube VTFCM. An additional vacuum tube VTTD, hereinafter referred to as the time delay tube, has in the plate circuit thereof a time delay magnet TD, the function of which will appear presently. The control relay magnet CRM has associated therewith a pair of normally closed contacts $crac$ and also a plurality of double-throw contacts $crbc$, whose purpose and function will also be described presently.

The machine is provided with a magnetic overload switch MO existing in the main line leading from a source S of current supply which may be either alternating or direct current. Upon closing of the switch MO, current is supplied through a line $a$ to the filaments of all of the vacuum tubes and returns to the source through a line $b$. A pilot light $pl$ is disposed in series with the filament circuit in order that the operator may be apprised of the fact that tubes are energized. A vacuum tube rectifier unit 960, which is preferably of the full wave type, serves to supply current for the plate circuits of the tubes when the source voltage is alternating current. Where the source voltage is direct current, provision is made by means of a switch 962 whereby the rectifier unit may be removed from the circuit. Each of the vacuum tubes thus far described, with the exception of the tube VTTD, is provided with a grid bias resistor $br$ which, when removed from the grid circuit of its respective tube, alters the bias on the tube to such an extent that the tube will pass plate current and thus operate. The punch magnet tubes are adapted to be operated to pass current whenever their respective grid bias resistors are shorted from the grid circuit by depression of one of a series of alphabetical keys $ak$ or by depression of one of a series of numerical keys $nk$. Additional keys $xk$ and $rk$ are provided for shorting the resistors of the vacuum tubes 11 and 12 respectively to selectively cause these latter tubes to operate. The various resistors $br$ may also be shorted from the grid circuits in which they are mounted by means of the distributor mechanism 704, shown in Fig. 14 and also illustrated at the upper left-hand portion of Fig. 33. Where direct current is being supplied at the source S a C-battery CB is employed. Where the source S supplies alternating current, the matter of a suitable grid bias may be taken care of by the rectifier assembly and may, if desired, constitute an isolation transformer or other means not shown. Irrespective, however, of the manner in which the tubes are effectively biased, the essential features of the invention remain substantially the same at all times.

After the magnetic overload switch MO has been closed, current is immediately available through lines $a$ and $b$, to the filaments of all of the tubes. However, because of the fact that two pairs of contacts $tda$ and $tdb$, associated with the time delay magnet TD, remain initially open until such time as the magnet TD becomes energized, current is not available through lines $c$ and $d$ to the motor M, nor is it available through the lines $e$ and $f$ for application to the various tube electrodes. However, when the time delay tube VTTD becomes sufficiently heated to allow it to pass current in its plate circuit, magnet TD will become energized, thus closing the contacts $tda$ and $tdb$ to start the motor and to supply tube voltages for all of the remaining vacuum tubes of the machine. A motor switch MS for the lines $c$ and $d$ is provided and this switch is located on the table top and by opening this switch operation of the machine may be stopped without opening the filament circuit leading to the tubes. Thus, the tubes will remain in their heated condition although the machine is not running and upon again closing the switch MS instant operation of the machine will take place. The time delay relay mechanism above described is provided in order that positive operation of the machine will at all times occur and to prevent operation of any portion of the machine until all of the tubes are thoroughly heated and operable. As shown in the circuit diagram, the time delay contacts $tda$ are arranged in series with the grid circuit of the various vacuum tubes, while the time delay contacts $tdb$ are in series with the motor circuit $c$, $d$.

The circuit through the feed clutch magnet FCM is adapted to become closed, as previously described, when the pin 426 of Fig. 13 engages the lever 420 to close the feed clutch magnet contacts $fcmc$, and this occurs immediately after the eightieth column of a card has been punched. Upon energization of the feed clutch magnet, the clutch assembly of Fig. 7 becomes engaged. As the clutch shaft 138 commences to rotate, the cam element 184 associated with the cam cluster 136 serves to close the pair of contacts $fcmhc$ and hold the magnet FCM energized during one complete revolution of the shaft 138.

Upon depression of any one of the keys associated with the keyboard 71, a circuit is established through the normally closed pair of release key contacts $rkcp$, the interrupter contacts $ic$, the card stop contacts $csc$ and the pair of control relay contacts $crac$ under the control of the magnet CRM through the selected keyboard contacts, by means of which the grid bias of the tube corresponding to the particular punch magnet to be operated is eliminated. The tube thus becomes energized to pass current in its plate circuit and energize its corresponding punch magnet PM. Upon energization of the magnet PM, the mechanical functions previously described associated with the punching instrumentalities take place and a circuit to the clamp magnet CM, shown in Figs. 27 and 28, and to the escapement magnet EM, shown in Fig. 27, is established. This circuit passes through the interrupter contacts *ic* located on the inside of the casing wall 80, as shown in Fig. 13, and punch lever contacts *plc* located in front of the punch levers, as shown in Fig. 12. Simultaneous energization of the clamp and escapement magnets causes the escapement wheel 354 to be clamped against rotation, while at the same time the armature 614 of the escapement magnet is withdrawn from a tooth on the escapement wheel and positioned in the path of movement of the next succeeding tooth, so that upon deenergization of the clamp and escapement magnets this latter tooth will move up into position and engage the end of the armature 614. Thus, the step-by-step indexing of the escapement wheel 354 is entirely automatic and will occur immediately upon depression of a key in the keyboard 71 by the operator whether or not depression of the key is momentary or prolonged. The interrupter contacts *ic* and card stop contacts *csc* serve to prevent punching in between cards. In other words, these contacts are so operated that no punching will occur during the interval of time between the release of one card and the complete registration of a succeeding card with the punches in the first position of the card at the punching station. The interrupter contacts *ic* open the punching circuit immediately after the eightieth column of a card has been punched. The card stop contacts become open whenever the card stop 400, of Fig. 12, is in its uppermost position and when the card index rolls 380 and 382 are separated. The control relay contacts *crac* and *crbc* serve functions that will be described in connection with automatic- and X-skipping.

When employing the reproducing unit 73 to perforate successive cards in the machine repetitiously according to the pattern of the master card, the handle 778 (Fig. 24) is moved forwardly, thus closing the pair of contacts *rc*. A circuit to the reproducing unit is then established through the release key contact group *rkcp*, the interrupter contacts *ic*, the card stop contacts *csc*, the control relay contacts *crac*, the contacts *rc* at the reproducer 73, the contacts *pc* associated with the lower armature 619 of the escapement magnet, the escapement contacts *ec* associated with the upper armature 614 of the escapement magnet and the brushes of the distributor mechanism 704. A circuit is then completed by the sensing brushes of the reproducer unit through the perforations in the card and through the corresponding punch magnet or magnets PM. The interrupter and card stop contacts *ic* and *csc* have no particular function during complete automatic reproduction of a master card, inasmuch as impulse timing is accounted for by the distributor mechanism 704.

The contacts *rc* are employed for the purpose of opening the circuit to the reproducer unit 73 during the interval of time when a card is being inserted into or removed from the reproducer magazine, as well as during manual punching when the reproducing unit is not in use. The pair of contacts *pc*, associated with the lower armature 619 of the escapement magnet EM, exists primarily to open the circuit leading to the punch magnets as soon as the teeth 496 on the thrust rod 494 are securely caught by the teeth 498 of the driver 482, as shown in Fig. 12. The reason for thus opening the circuit leading to the punch magnets is to allow maximum time for overcoming the residual current of the punch magnet, or, in other words, for allowing the magnet coil to become fully deenergized, otherwise it is possible that the thrust rod 494 might on its return stroke after performance of the punching operation engage the top of the rod 580, which by virtue of residual magnetism in the punch magnet PM would remain elevated an undue length of time and deflect the thrust rod 494 into the teeth of the driver 482 to effect repetitive punching.

Where manual punching is resorted to, neither the contacts *pc* nor the contacts *ec* are employed for the reason that opening of the punch circuit at any point therein, except at the keyboard, will render ineffective the mechanical nonrepeating feature of the machine, as previously described. The escapement contacts *ec* are so positioned with respect to the armature 614, as shown in Fig. 27, that the application of current to the punching magnets will not occur until the armature has been fully restored to its initial position. In this manner it is insured that the card undergoing punching moves through a full column and is properly positioned for punching before the punches 450 are actuated.

The alphabetical and numerical impulse distributor contacts 812 and 810 respectively provide a column selecting means within the reproducer unit. Since the distributor arms 816 and 818 are mounted on the same shaft in fixed relation with respect to one another, they are continuously and automatically in proper registration with the contacts which they serve. It is necessary to provide a double distributor system of this character to permit segregation of the alphabet-representing holes in the card from the numeric-representing holes.

*Automatic-skipping*

As previously described, the present machine is designed for both automatic- and X-skipping. The circuits for these two systems are similar in many respects but are sufficiently different to warrant consideration separately.

Automatic-skipping, wherein information may be omitted from any particular field of the cards undergoing punching under the control of a master card in the reproducer unit, is effected through the interrupter contacts *ic*, card stop contacts *csc* to the common ring 876 (Fig. 23) of the series of skip pins 860 and from thence through the skip pins to the vacuum tube VTEMB which supplies plate current to the escapement magnet, and to the vacuum tube VTCRM which supplies plate current to the control relay magnet, thus causing energization of both of these magnets. According to the mechanical exigencies previously set forth, the index assembly is thus left free to rotate until such time as the circuit just described is opened by virtue of a skip pin 860 moving away from the skip pin contacts. When this occurs, the index assembly is brought to a stop at the proper position to accommodate the next card column.

*X-skipping*

X-skipping for the purpose of adding information to one or more successive columns in any particular field of the cards undergoing punching is resorted to only during manual punching operations when no card exists in the reproducer unit 73. Such skipping is for the purpose of avoiding repetitious depression of the space key in order to complete card advancing operations after all of the desired information in a particular field has been punched and remaining unpunched columns exist in this particular field. X-skipping is effected by depressing the key *xk*. Depression of the key *xk* will serve to close a circuit through a manually controlled switch *xs*, providing this switch has previously been closed, to operate the vacuum tube labeled 11 in the punching circuit and thus energize its corresponding punch magnet whereby a perforation is applied to the card in the eleventh position thereof. Obviously if the switch *xs* is open, such a circuit will not be established and X-skipping may proceed without applying the additional perforation to the card in the eleventh position thereof.

Regardless of whether the switch *xs* is open or closed, depression of the key *xk* serves to close a circuit through the normally closed contacts *crbc* to operate the vacuum tube VTXM and thus energize the magnet XM in order to close a pair of contacts *xkc* which are controlled by this latter magnet. Closure of the contacts *xkc* establishes a circuit through the interrupter contacts *ic*, card stop contacts *csc*, common ring 876 of the skip wheel 850, the skip pins 860, the contacts *xkc*, the vacuum tube VTEMB and VTCRM, thus energizing the magnet EM and CRM. Because of the fact that the escapement magnet EM remains energized and the clamp magnet CM is not energized, the escapement clutch mechanism will operate to rotate the escapement wheel continuously until such time as a skip pin 860 is no longer encountered by the X-skip pin contacts.

In order to open the manually operable punching circuit and prevent inadvertent operation of the punch magnets by virtue of the depression of a key on the keyboard, the contacts *crac* which operate under the control of the magnet CRM become open, thus preventing energizing current from passing through either of the previously described reproducing or manual punching circuits. Energization of the magnet CRM also serves to transfer the position of the contacts *crbc* to establish a holding circuit for the vacuum tube VTXM. By virtue of these latter contacts *crbc*, the contacts under the control of the key *xk* remain closed and it is not necessary to maintain this latter key depressed during the entire X-skipping operation. Once the key *xk* has been depressed, skipping operations proceed until the circuit at the skip pins 860 is broken. Breaking of the circuit at this point serves to deenergize the magnet CRM and again cause transfer of the contacts *crbc* to their normal position. Opening of the circuit in the manner just described also serves to deenergize the magnet EM, thus allowing the armature of the escapement magnet to return to its normal position wherein the teeth on the escapement wheel move into engagement with the armature 614.

A pair of punch magnet holding contacts *pmhca* and *pmhcb* are disposed in parallel relationship in the circuit leading to the keyboard. These contacts are normally open and operate upon energization of a pair of punch holding magnets *phma* and *phmb* to become closed. The magnets and contacts just referred to are employed for the purpose of preventing repeat punching operations during X-skipping when relatively few skip pins 860 are in position for such skipping. These magnets and contacts are designed to prevent a condition wherein repeat punching might occur by virtue of prolonged depression of any one of the keys associated with the keyboard 71. Because of the extreme speed at which the present machine operates, if the skipping time is very short, as for example where only one or two of the pins 860 is in its X-skipping position, the normal tendency of the machine is to complete the X-skipping operation rapidly, thereby closing the contacts *crac* shortly after a key has been depressed. In the absence of the contacts *pmhca* and *pmhcb*, if a key at the keyboard 71 has not been released prior to the time the X-skipping operation has taken place the corresponding punch magnet will become reenergized and repeat punching will occur. By virtue of the magnets *phma* and *phmb*, the former of which is contained in the plate circuit of all of the vacuum tubes that represent numerical punching and the latter of which is contained in the plate circuits of all of the tubes which represent alphabetic punching, one or the other, or both, of these magnets will become energized during each and every punching operation, thereby effectively closing the contacts *pmhca* and *pmhcb* at each punching operation to prevent the undesirable condition set forth above.

Space bar

The space bar circuit is substantially the same as the circuit previously described in connection with the various alphabetic and numerical punching operations, with the exception, however, that no circuit exists upon depression of the space bar to any of the punch magnets. The circuit leading to the vacuum tubes VTCM and VTEMA which control energization of the clamp magnet and escapement magnet respectively is completed, as previously stated, when the clamp magnet and escapement magnet both become energized. Normal indexing of the escapement wheel takes place and the card is advanced through the punching station one column for each depression of the space key.

Upon depression of the release key 658, shown in Fig. 30, a circuit exists through the pair of contacts *rkce* to the vacuum tubes VTEMB and VTCRM, thus energizing their respective magnets EM and CRM. Energization of the escapement magnet EM serves to release the escapement wheel for continuous turning movement, as previously described, while energization of the magnet CRM serves to open the pair of contacts *crac* leading to the reproducing and manual punching circuit. Thus all punching operations are precluded while cards are fed out of the punching station to the eject hopper 78. It is to be noted that because of the fact that there are no teeth on the escapement wheel 354 throughout the area designated at 356 in Fig. 27, the cards automatically proceed into the punching station to a position wherein the first column thereof is aligned with the punches 450 and wherein the leading edge of the card bears against the card stop.

The manually operable switch *fcs*, which appears in Figs. 3 and 4 at the right-hand side of the machine and which is positioned on the end of the forward hopper 64, is arranged in series in the circuit with the feed clutch magnet contacts *fcmc* and when manually opened prevents these latter contacts from having any effect in the circuit, thereby at all times maintaining the vacuum tube VTFCM inoperative and, as a consequence, preventing energization of the feed clutch magnet FCM. With the switch *fcs* open, the cards may not be fed from the feeding hopper 64 to their stored position through the adjustable throat mechanism 66. The switch *fcs* functions only in the feed clutch magnet circuit, while all the other electrical circuits of the machine remain operative. As a consequence, if the switch *fcs* is opened and the release key 658 is operated, a card existing in the punching station may be fed to the eject bin or hopper without the introduction of a blank card into the punching station.

The electrical output connections for the modified rotary form of reproducing unit 143 are shown in Fig. 37. The various depending portions 311 of the terminal pieces 309 for the brushes 313 are electrically connected by means of wires *a, b, c, d, e, f, g, h, i, j, k* and *l* to the corresponding vacuum tubes which control the operation of the various punch magnets PM, escapement magnet EM, clamp magnet CM for operation thereof, as previously described in connection with the other form of reproducing unit 73. The common brush 327 which bears against the common ring 325 is connected in the punch magnet circuit by means of a wire *m* in which there is interposed a manually operable cutout switch 824 which is employed to open the circuit during insertion or removal of a card into or from the unit or during manual punching operations when the unit is not in actual use.

The invention is not to be limited to the exact arrangement of parts shown in the accompanying drawings or described in this specification as various changes in the details of construction may be resorted to without departing from the spirit of the invention. Only insofar as the invention has been particularly pointed out in the accompanying claims is the same to be limited.

What is claimed is:

1. In an apparatus for applying code perforations to successive record cards in the various columns thereof, a feed hopper adapted to receive therein a stack of blank cards, a pair of feed rolls positioned in close proximity to said feed hopper, a punching station including punching instrumentalities at a point remote from said feed hopper and means for advancing a card through the punching station in step-by-step fashion in between punching operations, means for continuously driving said advancing means, means for feeding the lowermost blank card in the stack forwardly to a position wherein its leading edge is engaged by said feed rolls, said card advancing means being located forwardly of the feed rolls a distance slightly greater than the length of a card whereby a card leaving said feed rolls comes to a position of rest with its leading edge in close proximity to said card advancing means, and additional card advancing means for engaging a card in its position of rest and impelling the same forwardly to bring the same under the control of said advancing means and punching instrumentalities.

2. In an apparatus for applying code perforations to successive record cards in the various columns thereof, a feed hopper adapted to receive therein a stack of blank cards, a pair of feed rolls positioned in close proximity to said feed hopper, a punching station including punching instrumentalities at a point remote from said feed hopper and means for advancing a card through the punching station in step-by-step fashion in between punching operations, means for continuously driving said feed rolls, means for feeding the lowermost blank card in the stack forwardly to a position wherein its leading edge is engaged by said feed rolls, said card advancing means being located forwardly of the feed rolls a distance slightly greater than the length of a card whereby a card leaving said feed rolls comes to a position of rest with its leading edge in close proximity to said card advancing means, additional card advancing means for engaging a card in its position of rest and impelling the same forwardly to bring the same under the control of said punching instrumentalities, and means for elevating the rear edge of a card which is under the control of said punching instrumentalities whereby a succeeding card fed from said feed hopper is fed under said first mentioned card and brought to its position of rest thereunder.

3. In an apparatus for applying code perforations to successive record cards in the various columns thereof, a feed hopper adapted to receive therein a stack of blank cards, a pair of feed rolls positioned in close proximity to said feed hopper, a punching station including punching instrumentalities at a point remote from said feed hopper and means for advancing a card through the punching station in step-by-step fashion in between punching operations, means for continuously driving said feed rolls, means for feeding the lowermost blank card in the stack forwardly to a position wherein its leading edge is engaged by said feed rolls, said card advancing means being located forwardly of the feed rolls a distance slightly greater than the length of a card whereby a card leaving said feed rolls comes to a position of rest with its leading edge in close proximity to said card advancing means, additional card advancing means for engaging a card in its position of rest and impelling the same forwardly to bring the same under the control of said punching instrumentalities, and card flexing means positioned in the path of movement of the cards leaving the feed hopper and over which the cards are adapted to pass for engaging a card which is under the control of said punching instrumentalities to elevate the rear edge thereof whereby a succeeding card fed from said feed hopper is fed under said first mentioned card and brought to its position of rest thereunder.

4. In an apparatus for applying code perforations to successive record cards in the various columns thereof and operable under the control of electric circuit closing means, a feed hopper adapted to receive therein a stack of blank cards, a pair of feed rolls positioned in close proximity to said feed hopper for successively feeding cards from the latter, a punching station including punching instrumentalities at a point remote from said feed hopper and a pair of card indexing rolls for advancing a card through the punching station in step-by-step fashion in between punching operations, means for continuously driving said feed rolls, means for intermittently driving said card indexing rolls under the control of said circuit closing means, means for feeding the lowermost blank card in the stack forwardly to a position wherein its leading edge is engaged by said feed rolls, the center-line distance between said pairs of rolls being slightly greater than the length of a card whereby a card leaving said feed rolls comes to a position of rest with its leading edge in close proximity to said card indexing rolls, and additional card-advancing means for engaging a card in its position of rest and impelling the same forwardly to bring the same under the control of said card indexing rolls.

5. In an apparatus for applying code perforations to successive record cards in the various columns thereof and operable under the control of electric circuit closing means, a feed hopper adapted to receive therein a stack of blank cards, a pair of feed rolls positioned in close proximity to said feed hopper, a punching station including punching instrumentalities at a point remote from said feed hopper and a pair of card indexing rolls for advancing a card through the punching station in step-by-step fashion in between punching operations, means for continuously driving said pairs of rolls, means for intermittently driving said card indexing rolls under the control of said circuit closing means, means for feeding the lowermost blank card in the stack forwardly to a position wherein its leading edge is engaged by said feed rolls, the center-line distance between said pairs of rolls being slightly greater than the length of a card whereby a card leaving said feed rolls comes to a position of rest with its leading edge in close proximity to said card indexing rolls, additional card-advancing means for engaging a card in its position of rest and impelling the same forwardly to bring the same under the control of said card indexing rolls, and means for elevating the rear edge of a card which is under the control of said card indexing rolls whereby a succeeding card fed from said feed hopper is fed under the first mentioned card and is brought to its position of rest thereunder.

6. In an apparatus for applying code perforations to successive record cards in the various columns thereof and operable under the control of electric circuit closing means, a feed hopper adapted to receive therein a stack of blank cards, a pair of feed rolls positioned in close proximity to said feed hopper, a punching station including punching instrumentalities at a point remote from said feed hopper and a pair of card indexing rolls for advancing a card through the punching station in step-by-step fashion in between punching operations, means for continuously driving said pairs of rolls, means for intermittently driving said card indexing rolls under the control of said circuit closing means, means for feeding the lowermost blank card in the stack forwardly to a position wherein its leading edge is engaged by said feed rolls, the center-line distance between said pairs of rolls being slightly greater than the length of a card whereby a card leaving said feed rolls comes to a position of rest with its leading edge in close proximity to said card indexing rolls, additional card-advancing means for engaging a card in its position of rest and impelling the same forwardly to bring the same under the control of said card indexing rolls, and card flexing means positioned in the path of movement of the cards leaving the feed hopper and over which the cards are adapted to pass for engaging a card which is under the control of said card indexing rolls to elevate the rear edge thereof whereby a succeeding card fed from said feed hopper is fed under said first mentioned card and brought to its position of rest.

7. In an apparatus for applying code perforations to successive record cards in the various columns thereof and operable under the control of electric circuit closing means, a feed hopper adapted to receive therein a stack of blank cards, a pair of feed rolls positioned in close proximity to said feed hopper, a punching station including punching instrumentalities at a point remote from said feed hopper and a pair of card indexing rolls for advancing a card through the punching station in step-by-step fashion in between punching operations, means for continuously driving said pairs of rolls, means for intermittently driving said card indexing rolls under the control of said circuit closing means, means for feeding the lowermost blank card in the stack forwardly to a position wherein its leading edge is engaged by said feed rolls, the center-line distance between said pairs of rolls being slightly greater than the length of a card whereby a card leaving said feed rolls comes to a position of rest with its leading edge in close proximity to said card indexing rolls, additional card-advancing means for engaging a card in its position of rest and impelling the same forwardly to bring the same under the control of said card indexing rolls, and yieldable card flexing means positioned in the path of movement of the cards leaving the feed hopper adapted to bear upwardly against the underneath side of a card which is under the control of said card indexing rolls near the rear edge thereof to hold the latter elevated whereby a succeeding card fed from said feed hopper is fed under said first mentioned card and brought to its position of rest.

8. In an apparatus for applying code perforations to successive record cards in the various columns thereof and operable under the control of electric circuit closing means, a feed hopper adapted to receive therein a stack of blank cards, a pair of feed rolls positioned in close proximity to said feed hopper, a punching station including punching instrumentalities at a point remote from said feed hopper and a pair of card indexing rolls for advancing a card through the punching station in step-by-step fashion in between punching operations, means for continuously driving said pairs of rolls, means for intermittently driving said card indexing rolls under the control of said circuit closing means, means for feeding the lowermost blank card in the stack forwardly to a position wherein its leading edge is engaged by said feed rolls, the center-line distance between said pairs of rolls being slightly greater than the length of a card whereby a card leaving said feed rolls comes to a position of rest with its leading edge in close proximity to said card indexing rolls, additional card-advancing means for engaging a card in its position of rest and impelling the same forwardly to bring the same under the control of said card indexing rolls, and an abutment positioned in the path of movement of the cards leaving the feed hopper and over which the cards are adapted to pass in proceeding to their positions of rest, said abutment being spaced from said card indexing rolls a distance slightly less than the length of a card whereby a card in its position of rest will have its rear edge elevated by said abutment to allow a succeeding card fed from said feed hopper to be fed under said first mentioned card and brought to its position of rest.

9. In an apparatus for applying code perforations to successive record cards in the various columns thereof and operable under the control of electric circuit closing means, a feed hopper adapted to receive therein a stack of blank cards, a pair of feed rolls positioned in close proximity to said feed hopper, a punching station including punching instrumentalities at a point remote from said feed hopper and a pair of card indexing rolls for advancing a card through the punching station in step-by-step fashion in between punching operations, means for continuously driving said feed rolls, means for intermittently driving said card indexing rolls under the control of said circuit closing means, means for feeding the lowermost blank card in the stack forwardly to a position wherein its leading edge is engaged by said feed rolls, the center-line distance between said pairs of rolls being slightly greater than the length of a card whereby a card leaving said feed rolls comes to a position of rest with its leading edge in close proximity to said card indexing rolls, additional card-advancing means for engaging a card in its position of rest and impelling the same forwardly to bring the same under the control of said card indexing rolls, and a yieldable abutment positioned in the path of movement of the cards leaving the feed hopper and over which the cards are adapted to pass in proceeding to their positions of rest, said abutment being spaced from said card indexing rolls a distance slightly less than the length of a card whereby a card in its position of rest will have its rear edge elevated by said abutment to allow a succeeding card fed from said feed hopper to be fed under said first mentioned card and brought to its position of rest.

10. Card handling apparatus comprising a feed hopper adapted to receive therein a stack of blank cards, a pair of feed rolls positioned in close proximity to said feed hopper forwardly thereof, there being a throat opening at the bottom of said hopper through which the lowermost card in the stack is adapted to be fed for engagement of its leading edge by said feed rolls, and means for successively feeding cards through said throat opening comprising a reciprocable bottom plate for said hopper upon which the stack of cards is adapted to rest, means for reciprocating said plate, a pair of rearwardly and upwardly inclined guideways carried by said plate and movable bodily therewith, a friction pad slidably disposed in said guideways and movable relative to the plate from a forward lowered position to a rearward elevated position wherein its upper surface is in frictional engagement with the lowermost card in the stack, and means yieldingly urging said pad to its elevated position.

11. In an apparatus for perforating record cards successively in the various card columns thereof, a punching station including punching instrumentalities, and means for moving the cards past said punching station in step-by-step fashion comprising a rotatable horizontal shaft, a card indexing roller and a toothed escapement wheel mounted on said shaft and rotatable therewith, a friction clutch and driving means therefor normally rotating the shaft continuously, a clamp magnet operable upon energization thereof to clamp said shaft and hold the same stationary against the action of said friction clutch, an escapement magnet having an armature in the form of an interposer pawl movable upon energization of the magnet from an initial position in holding engagement with one tooth on said escapement wheel to a position in the path of the next oncoming adjacent tooth thereof, means for energizing said clamp magnet and for immediately thereafter energizing said escapement magnet, and means for subsequently deenergizing said magnets substantially simultaneously to allow said escapement wheel to be rotated by said friction clutch whereby said last mentioned tooth on the escapement wheel will engage said interposer pawl and move the latter to its initial position in holding engagement with said last mentioned tooth on said escapement wheel.

12. In an apparatus for perforating record cards successively in the various card columns thereof, a punching station including punching instrumentalities, and means for moving the cards past said punching station in step-by-step fashion comprising a rotatable horizontal shaft, a card indexing roller and a toothed escapement wheel mounted on said shaft and rotatable therewith, a friction clutch and driving means therefor normally rotating the shaft continuously, a clamp magnet operable upon energization thereof to clamp said shaft and hold the same stationary against the action of said friction clutch, an escapement magnet having an armature in the form of an interposer pawl substantially tangentially disposed with respect to the periphery of the escapement wheel and having one end thereof normally in engagement with one tooth on said wheel, said armature being shiftable longitudinally throughout a limited distance and being movable upon energization of said escapement magnet to a longitudinally offset position wherein it is out of engagement with the periphery of said wheel and in the path of movement of the next adjacent oncoming tooth thereof, means for energizing said clamp magnet and for immediately thereafter energizing said escapement magnet, and means for subsequently deenergizing said magnets substantially simultaneously to allow said escapement wheel to be rotated by said friction clutch whereby said last mentioned tooth on the escapement wheel will engage said interposer pawl and move the latter to its initial position in holding engagement with said last mentioned tooth on said escapement wheel.

13. In an apparatus for perforating record cards successively in the various card columns thereof, a punching station including punching instrumentalities, and means for moving the cards past said punching station in step-by-step fashion comprising a rotatable horizontal shaft, a card indexing roller and a toothed escapement wheel mounted on said shaft and rotatable therewith, a friction clutch and driving means therefor normally rotating the shaft continuously, a clamp magnet operable upon energization thereof to clamp said shaft and hold the same stationary against the action of said friction clutch, an escapement magnet having an armature in the form of an interposer pawl movable upon energization of the magnet from an initial position in holding engagement with one tooth on said escapement wheel to a position in the path of movement of the next oncoming adjacent tooth thereof, means for energizing said clamp magnet and for immediately thereafter energizing said escapement magnet, and means for subsequently deenergizing said magnets substantially simultaneously to allow said escapement wheel to be rotated by said friction clutch whereby said last mentioned tooth on the escapement wheel will engage said interposer pawl and move the latter to its initial position in holding engagement with said last mentioned tooth on said escapement wheel, said escapement wheel being devoid of teeth in a limited peripheral region thereof to permit limited continuous rotation of said feed shaft when said region is encountered by said armature to move said cards at a uniform rate of speed under the influence of said friction clutch away from said punching station.

14. In an apparatus for perforating record cards successively in the various card columns thereof, a punching station including punching instrumentalities, and means for moving the cards past said punching station in step-by-step fashion comprising a rotatable horizontal shaft, a card indexing roller and a toothed escapement wheel mounted on said shaft and rotatable therewith, a friction clutch and driving means therefor normally rotating the shaft continuously, a clamp magnet operable upon energization thereof to clamp said shaft and hold the same stationary against the action of said friction clutch, an escapement magnet having an armature in the form of an interposer pawl substantially tangentially disposed with respect to the periphery of the escapement wheel and having one end thereof normally in engagement with one tooth on said wheel, said armature being shiftable longitudinally throughout a limited distance and being movable upon energization of said escapement magnet to a longitudinally offset position wherein it is out of engagement with the periphery of said wheel and in the path of movement of the next adjacent oncoming tooth thereof, means for energizing said clamp magnet and for immediately thereafter energizing said escapement magnet, and means for subsequently deenergizing said magnets substantially simultaneously to allow said escapement wheel to be rotated by said friction clutch whereby said last mentioned tooth on the escapement wheel will engage said interposer pawl and move the latter to its normal position in holding engagement with said last mentioned tooth on said escapement wheel, said escapement wheel being devoid of teeth in a limited peripheral region thereof to permit limited continuous rotation of said feed shaft when said region is encountered by said armature to uniformly move said cards away from said punching station.

15. In a perforating machine, a series of punches, and mechanism for operating said punches comprising a cylindrical driving element mounted for rotation about a horizontal axis, means for continuously rotating said element, a support positioned below the level of said driving element, a movable thrust rod for each punch, said rods having adjacent ends thereof normally resting upon said support and movable upwardly into frictional engagement with said driving element to receive an impulse therefrom to cause longitudinal shifting of the rods, means operatively connecting each thrust rod and its respective punch in driving relationship whereby upon shifting of the rod its respective punch becomes actuated, means for selectively moving said thrust rods into operative frictional engagement with the periphery of said driving element, and means normally urging each thrust rod to its position of rest on said support.

16. In a perforating machine, a series of punches, and mechanism for operating said punches comprising a cylindrical driving element mounted for rotation about a horizontal axis, means for continuously rotating said element, a support positioned below the level of said driving element, a movable thrust rod for each punch, said rods having adjacent ends thereof normally resting upon said support and movable upwardly into frictional engagement with said driving element to receive an impulse therefrom to cause longitudinal shifting of the rods, means operatively connecting each thrust rod and its respective punch in driving relationship whereby upon shifting of the rod its respective punch becomes actuated, means for selectively moving said thrust rods into operative frictional engagement with the periphery of said driving element, and cam means normally urging each thrust rod to its position of rest on said support.

17. In an apparatus for perforating record cards successively in the various card columns thereof, a punching station including punching instrumentalities, and means for moving the cards past said punching station in step-by-step fashion under the control of said punching instrumentalities, said last mentioned means including a card indexing roller, an escapement wheel and a skip index wheel, means for normally rotating said roller and wheels in unison, an escapement magnet having an armature operable when said magnet is energized to permit continuous rotation of said normally rotating members and operable when the magnet is deenergized to arrest movement of the latter, an electric circuit for the magnet, a stationary contact brush positioned adjacent said skip index wheel, a circular series of settable skip-pins mounted on said skip index wheel and movable independently from retracted positions wherein upon rotation of the skip index wheel they will avoid contact with said brush to advanced positions whereby upon rotation of the wheel they will electrically engage the brush in passing, said pins being electrically connected together and corresponding in number and position to the various card columns, said pins and contact brush being arranged electrically in the magnet circuit whereby contact of a pin with the brush will cause energization of the magnet, and manually operable means for selectively setting said skip-pins.

18. In an apparatus for perforating record cards successively in the various card columns thereof, a punching station including punching instrumentalities, and means for moving the cards past said punching station in step-by-step fashion under the control of said punching instrumentalities, said last mentioned means including a card indexing roller, an escapement wheel and a skip index wheel, means for normally rotating said roller and wheels in unison, an escapement magnet having an armature operable when said magnet is energized to permit continuous rotation of said normally rotating members and operable when the magnet is deenergized to arrest movement of the latter, an electric circuit for the magnet, a stationary contact brush positioned adjacent said skip index wheel, a circular series of settable skip-pins mounted on said skip index wheel and movable independently from retracted positions wherein upon rotation of the skip index wheel they will avoid contact with said brush to advanced positions whereby upon rotation of the wheel they will electrically engage the brush in passing, said pins corresponding in number and position to the various card columns, said pins being electrically connected together and said contact brush being arranged in the magnet circuit whereby contact of a pin with the brush will cause energization of the magnet, and manually operable means for selectively setting said skip-pins, said pins being closely spaced on the skip index wheel whereby continuity of the circuit which they electrically establish with said brush is maintained when successive pins are in their advanced positions.

19. In an apparatus for perforating record cards successively in the various card columns thereof, a punching station including punching instrumentalities, and means for moving the cards past said punching station in step-by-step fashion under the control of said punching instrumentalities, said last mentioned means including a card indexing roller, an escapement wheel and a skip index wheel, means for normally rotating said roller and wheel in unison, an escapement magnet having an armature operable when said magnet is energized to permit continuous rotation of said normally rotating members and operable when the magnet is deenergized to arrest movement of the latter, an electric circuit for the magnet, a contact brush positioned adjacent said skip index wheel, a series of contact-engaging circuit closing members mounted on said skip index wheel and movable from retracted positions wherein they avoid contact with said brush upon rotation of the wheel to advanced positions wherein they will engage said brush in passing, said members being electrically connected together and with the brush being arranged in the magnet circuit whereby engagement of the brush by a member will cause energization of said magnet, manually operable means for selectively moving said members to their advanced positions, and a cam member manually movable into the path of movement of such circuit closing members as are in their advanced positions for returning them to their retracted positions upon rotation of the skip index wheel.

20. In an apparatus for perforating record cards successively in the various card columns thereof, a punching station including punching instrumentalities, and means for moving the cards past said punching station in step-by-step fashion under the control of said punching instrumentalities, said last mentioned means including a card indexing roller, an escapement wheel and a skip index wheel, means for normally rotating said roller and wheel in unison, an escapement magnet having an armature operable when said magnet is energized to permit continuous rotation of said normally rotating members and operable when the magnet is deenergized to arrest movement of the latter, an electric circuit for the magnet, a contact brush positioned adjacent said skip index wheel, a series of contact-engaging circuit closing members mounted on said skip index wheel and movable from retracted positions wherein they avoid contact with said brush upon rotation of the wheel to advanced positions wherein they will electrically engage said brush in passing, said members being electrically connected together and with the brush being arranged in the magnet circuit whereby engagement of the brush by a member will cause energization of said magnet, manually operable means for selectively moving said members to their advanced positions, and selectively operable manual means for returning such circuit closing members as are in their advanced positions to their retracted positions upon rotation of said skip index wheel.

21. In an apparatus for perforating record cards successively in the various card columns thereof, a punching station including punching instrumentalities, and means for moving the cards past said punching station in step-by-step fashion under the control of said punching instrumentalities, said last mentioned means including a card indexing roller, an escapement wheel and a skip index wheel, means for normally rotating said roller and wheel in unison, an escapement magnet having an armature operable when said magnet is energized to permit continuous rotation of said normally rotating members and operable when the magnet is deenergized to arrest movement of the latter, an electric circuit for the magnet, a contact brush positioned adjacent said skip index wheel, a circular series of settable skip-pins mounted on said skip index wheel and movable independently from retracted positions wherein upon rotation of the skip index wheel they will avoid contact with said brush to advanced positions whereby upon rotation of the wheel they will engage the brush in passing, said pins corresponding in number and position to the various card columns, said pins being electrically connected together and with the contact brush being arranged in the magnet circuit, a pair of normally open contacts in said magnet circuit in series with said pins and contact brush, means for manually closing said normally open contacts whereby closing thereof during contact between a pin and said brush will cause energization of said escapement magnet, and means for holding said magnet circuit closed during engagement of said brush with succeeding pins on said skip index wheel.

22. In an apparatus for perforating record cards successively in the various card columns thereof, a punching station including punching instrumentalities, and means for moving the cards past said punching station in step-by-step fashion under the control of said punching instrumentalities, said last mentioned means including a card indexing roller, an escapement wheel and a skip index wheel, means for normally rotating said roller and wheels in unison, an escapement magnet having an armature operable when said magnet is energized to permit continuous rotation of said normally rotating members and operable when the magnet is deenergized to arrest movement of the latter, an electric circuit for the magnet, a pair of contact brushes positioned adjacent said skip index wheel, a series of contact-engaging circuit closing members mounted on said skip index wheel and selectively movable from retracted positions wherein they avoid contact with said brushes upon rotation of the wheel to advanced positions wherein they will engage one or the other of said brushes in passing, means electrically connecting said circuit closing members in common, means electrically connecting said contact brushes in respective card advancing control circuits, and manually operable means for selectively moving said members from their retracted positions to either of their advanced positions.

23. In an apparatus for perforating record cards successively in the various card columns thereof, a punching station including punching instrumentalities, and means for moving the cards past said punching station in step-by-step fashion under the control of said punching instrumentalities, said last mentioned means including a card indexing roller, an escapement wheel and a skip index wheel, means for normally rotating said roller and wheels in unison, an escapement magnet having an armature operable when said magnet is energized to permit continuous rotation of said normally rotating members and operable when the magnet is deenergized to arrest movement of the latter, an electric circuit for the magnet, a pair of contact brushes positioned adjacent said skip index wheel, a circular series of settable skip-pins mounted on said skip index wheel and movable independently from retracted positions wherein upon rotation of the skip index wheel they will avoid contact with said brushes to advanced positions wherein they will engage one or the other of said brushes in passing, stationary guide means for maintaining said pins in either their retracted positions or in either of their advanced positions during rotation of said index wheel, means electrically connecting said skip-pins in common, means electrically connecting said contact brushes in respective card advancing control circuits, and manually operable means for selectively moving said contact pins from their retracted positions to either of their advanced positions.

24. In an apparatus of the character described, a reproducer unit adapted to receive therein a master card for sensing purposes, said unit comprising a casing, a cylindrical sleeve disposed within the casing, an electrically conductive card cylinder disposed with said sleeve and rotatable therein, there being a card receiving opening in the casing, card clamping means carried by the drum and movable into register with said opening whereby a card may be secured by the clamp to said drum and upon subsequent rotation of the drum the card will be drawn into the casing between the drum and sleeve, there being an opening in said sleeve, a plurality of sensing brushes disposed within the casing and projecting through said opening and bearing against said drum, an electrical common ring for said drum, and electrical output circuits for each of said sensing brushes.

EUGENE A. FORD.